United States Patent
Jones et al.

(10) Patent No.: US 9,058,578 B2
(45) Date of Patent: Jun. 16, 2015

(54) SYSTEMS AND METHODS FOR BATTERY REMEDIATION IN CONNECTION WITH AN ELECTRIC POWERED MOBIEL THING (EPMT)

(76) Inventors: Martin Kelly Jones, Vancouver (CA); Scott Andrew Horstemeyer, Atlanta, GA (US)

( * ) Notice: Subject to any disclaimer, the term of this patent is extended or adjusted under 35 U.S.C. 154(b) by 280 days.

(21) Appl. No.: 13/333,159

(22) Filed: Dec. 21, 2011

(65) Prior Publication Data

US 2012/0166240 A1    Jun. 28, 2012

Related U.S. Application Data

(60) Provisional application No. 61/427,158, filed on Dec. 24, 2010, provisional application No. 61/444,297, filed on Feb. 18, 2011.

(51) Int. Cl.
G07F 19/00 (2006.01)
G06Q 20/00 (2012.01)
(Continued)

(52) U.S. Cl.
CPC ............ *G06Q 10/0631* (2013.01); *G06Q 20/24* (2013.01); *B60L 11/1818* (2013.01); *B60L 11/1846* (2013.01); *B60L 11/1848* (2013.01); *B60L 11/1857* (2013.01); *B60L 11/1861* (2013.01); *B60L 2230/12* (2013.01); *B60L 2230/16* (2013.01); *B60L 2240/547* (2013.01); *B60L 2240/549* (2013.01); *B60L 2240/622* (2013.01); *B60L 2240/70* (2013.01); *B60L 3/0046* (2013.01); *Y02T 10/7088* (2013.01); *Y02T 10/7044* (2013.01); *Y02T 10/7005* (2013.01); *Y02T 10/705* (2013.01); *Y02T 90/16* (2013.01); *Y02T 90/162* (2013.01); *Y02T 90/163* (2013.01); *Y02T 90/169* (2013.01); (Continued)

(58) Field of Classification Search
USPC .......................................................... 705/34
See application file for complete search history.

(56) References Cited

U.S. PATENT DOCUMENTS 4,335,337 A    6/1982  Okamatsu et al.
4,929,931 A    5/1990  McCuen
(Continued)

OTHER PUBLICATIONS

Grifantini, Kristina "Finding a Parking Space Online", Technology Review published by MIT, Jul. 24, 2008, located at http://www.technologyreview.com/web/21123/?mod=related.
(Continued)

*Primary Examiner* — Ashford S Hayles
(74) *Attorney, Agent, or Firm* — Thomas | Horstemeyer, LLP

(57) ABSTRACT

The present disclosure provides, among other things, various systems and methods for battery remediation in connection with electric powered mobile things (EPMTs). A representative method, among others, can be summarized by the following steps: monitoring electric power capacity (EPC) associated with locomotion of the EPMT; monitoring travel data relating to the EPMT; engaging in a communication session with a remote host computer system (H-CS) based upon the EPC monitoring; requesting assistance of a battery remediation station (BRS) during the communication session; communicating location information relating to the EPMT during the communication session so that the BRS can visit and remediate (recharge, repair, or replace) a battery associated with the EPMT. Upon receiving this information, the H-CS can contact and dispatch the BRS to visit the EPMT. A representative system, among others, comprises an EPMT-CS that is programmed or designed to perform the foregoing steps.

28 Claims, 29 Drawing Sheets

(51) Int. Cl.
| | |
|---|---|
| *G06Q 30/00* | (2012.01) |
| *H02J 7/00* | (2006.01) |
| *G06Q 10/06* | (2012.01) |
| *G06Q 20/24* | (2012.01) |
| *B60L 11/18* | (2006.01) |
| *B60L 3/00* | (2006.01) |

(52) U.S. Cl.
CPC ............ *Y02T10/7291* (2013.01); *Y02T 90/121* (2013.01); *Y02T 90/14* (2013.01); *Y02T 90/128* (2013.01); *Y04S 30/14* (2013.01)

(56) References Cited

U.S. PATENT DOCUMENTS

| | | | |
|---|---|---|---|
| 5,477,936 | A | 12/1995 | Sugioka et al. |
| 5,583,751 | A | 12/1996 | Nakazawa et al. |
| 5,646,534 | A | 7/1997 | Kopera |
| 5,712,568 | A | 1/1998 | Flohr et al. |
| 5,765,656 | A | 6/1998 | Weaver |
| 5,808,469 | A | 9/1998 | Kopera |
| 6,054,818 | A | 4/2000 | Tabata et al. |
| 6,633,165 | B2 | 10/2003 | Bertness |
| 6,639,409 | B2 | 10/2003 | Morimoto et al. |
| 6,850,037 | B2 | 2/2005 | Bertness |
| 7,643,951 | B2 | 1/2010 | Stewart |
| 8,364,388 | B2* | 1/2013 | Naito et al. .................. 701/533 |
| 8,412,454 | B2* | 4/2013 | Hyde et al. .................. 701/425 |
| 2002/0016655 | A1* | 2/2002 | Joao .............................. 701/35 |
| 2006/0129290 | A1* | 6/2006 | Zimmerman et al. .......... 701/29 |
| 2007/0061069 | A1* | 3/2007 | Christensen ................. 701/209 |
| 2007/0068596 | A1* | 3/2007 | Corless et al. .................. 141/94 |
| 2007/0216407 | A1 | 9/2007 | Yamaguchi |
| 2007/0280462 | A1* | 12/2007 | Neece ...................... 379/201.01 |
| 2008/0014908 | A1* | 1/2008 | Vasant ....................... 455/414.1 |
| 2009/0036091 | A1* | 2/2009 | Ball et al. ................... 455/404.1 |
| 2009/0093236 | A1* | 4/2009 | Balan et al. ................... 455/411 |
| 2009/0144150 | A1* | 6/2009 | Sakakibara et al. ............ 705/14 |
| 2009/0144622 | A1* | 6/2009 | Evans et al. ................... 715/706 |
| 2009/0177350 | A1* | 7/2009 | Williams et al. ................ 701/29 |
| 2009/0278545 | A1 | 11/2009 | Magana et al. |
| 2009/0313077 | A1* | 12/2009 | Wheeler, IV ..................... 705/9 |
| 2010/0094496 | A1* | 4/2010 | Hershkovitz et al. ........... 701/22 |
| 2010/0141203 | A1* | 6/2010 | Graziano et al. .............. 320/109 |
| 2010/0241542 | A1* | 9/2010 | Pinkusevich et al. ........... 705/34 |
| 2010/0262566 | A1* | 10/2010 | Yamamoto .................... 705/412 |
| 2011/0025267 | A1* | 2/2011 | Kamen et al. ................. 320/109 |
| 2011/0029358 | A1* | 2/2011 | Hyde et al. ................... 705/14.1 |
| 2011/0071932 | A1* | 3/2011 | Agassi et al. ................... 705/34 |
| 2011/0191186 | A1* | 8/2011 | Levy et al. ................. 705/14.58 |
| 2011/0204847 | A1* | 8/2011 | Turner .......................... 320/109 |
| 2011/0227531 | A1* | 9/2011 | Rajakaruna ................... 320/109 |
| 2011/0288700 | A1* | 11/2011 | Pebbles .......................... 701/22 |
| 2012/0005031 | A1* | 1/2012 | Jammer .......................... 705/16 |
| 2012/0010894 | A1* | 1/2012 | Jammer ......................... 705/1.1 |
| 2012/0029759 | A1* | 2/2012 | Suh et al. ........................ 701/29 |
| 2012/0041675 | A1* | 2/2012 | Juliver et al. ................. 701/465 |
| 2012/0041804 | A1* | 2/2012 | Sahinoglu et al. ........... 705/14.1 |
| 2012/0109763 | A1* | 5/2012 | Laughner ........................ 705/17 |

OTHER PUBLICATIONS

E-Gizmo Magnetic Car Sensor, Hardware Manual, Rev. 1r0, 2009 e-Gizmo Mechatronix Central.

Kallfelz, A., et al., Battery Monitoring Considerations for Hybrid Vehicles and Other battery Ssytems with Dynamic Duty Loads, Battery Power Products & Technology, May/Jun. 2006, vol. 10, Issue 3, www.BatteryPowerOnline.com.

"Analog Devices Introduces Lithium-ion Battery Monitoring and Protection System for Energy, Industrial and Automotive Applications", www.analog.com/en/power-management/battery-management/ad8280/products/3_5 . . . , Mar. 5, 2010.

Amajor, M., et al., "Real Time Automotive Battery Monitoring System", San Jose State University, Electrical Engineering, EE198B Senior Project Report, Fall 2008.

"Analog Devices Advances Automotive Battery Monitoring with Highly Integrated Mixed-Signal IC", www.analog.com/en/press-release/Oct_16_2006_ADI_Adv_Auto_Battery_Monitoring . . . , Oct. 16, 2006.

"Charge Monitor for 12V Lead Acid Battery", Cars & Motorcycle Circuits, Electronics Zone, located at http://www.electronic-circuits-diagrams.com/carimages/carscktl.shtml, printed Feb. 18, 2011.

"Battery Monitoring", located at http://homepages/which.net/~paul.hills/Circuits/BatteryMonitor/BatteryMonitor.html, V1.01 Jul. 29, 2004.

Kennedy, Peter, Monitoring Battery Capacity, Peter Kennedy Yacht Services, Marine Electrical Systems, http://www.pkys.com/Amp_Hour_Meters.htm, printed Feb. 18, 2011.

Maryanka, Y., et al., "The Vehicle Power Line as a Redundant Channel for CAN Communication", Presentation at SA E 2005 congress.

"Power Line Communication", found at Wikipedia, http://en.wikipedia.org/wiki/Power_line_communication, printed May 11, 2011.

Canete-Corripio, F. J., et al., "Indoor Power-Lien Communications: Channel Modelling and Measurements", Dpt. Ingenieria de Comunicaciones. E.T.S.I. Telecomunicacion, Universidad de Malaga, 2000 (found at www.plc.uma.es/articulos/ISPLC_2000_publicado_bis.pdf ).

Thesis paper on Power Line Communications located at www.enersearch.com/ . . . /publications/thesises/PowerlineCom.pdf , 1998.

* cited by examiner

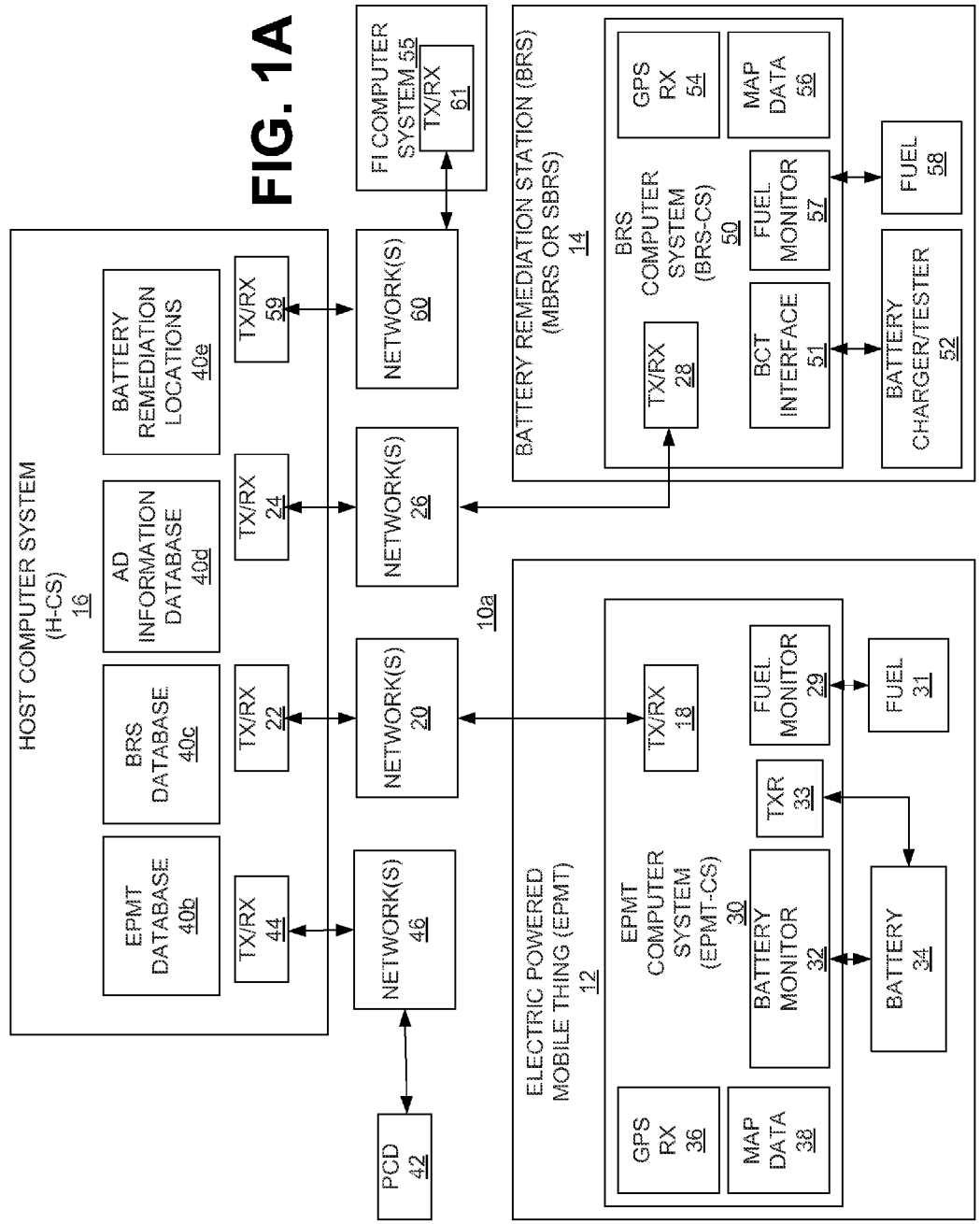

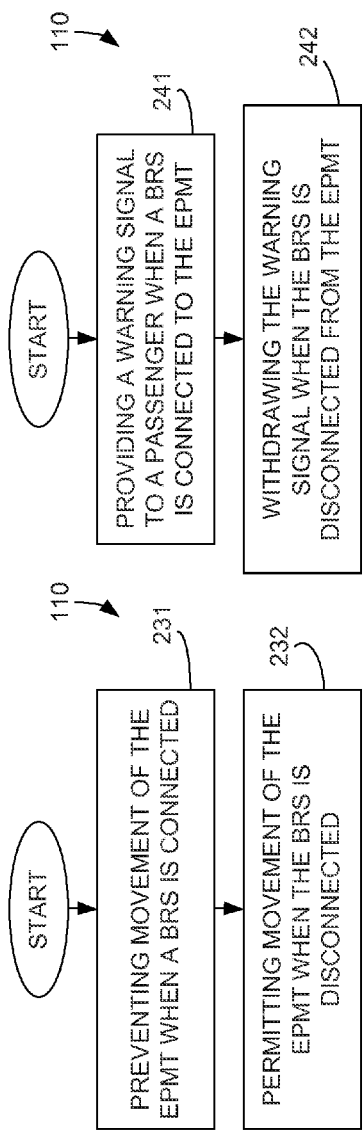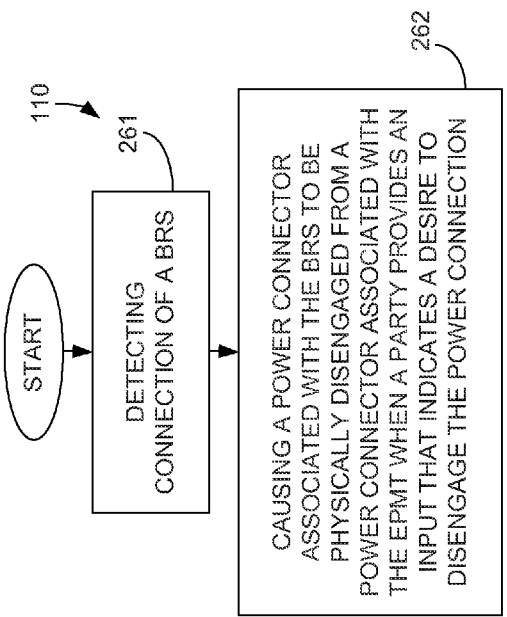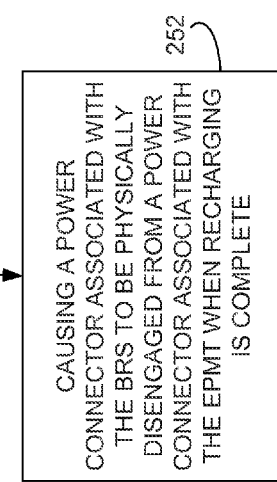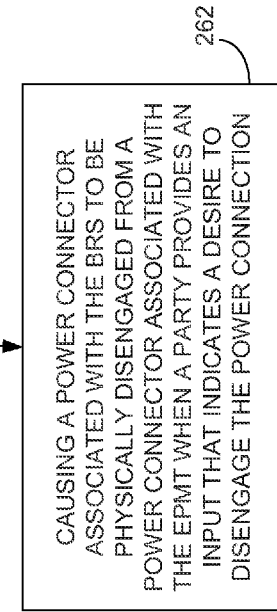

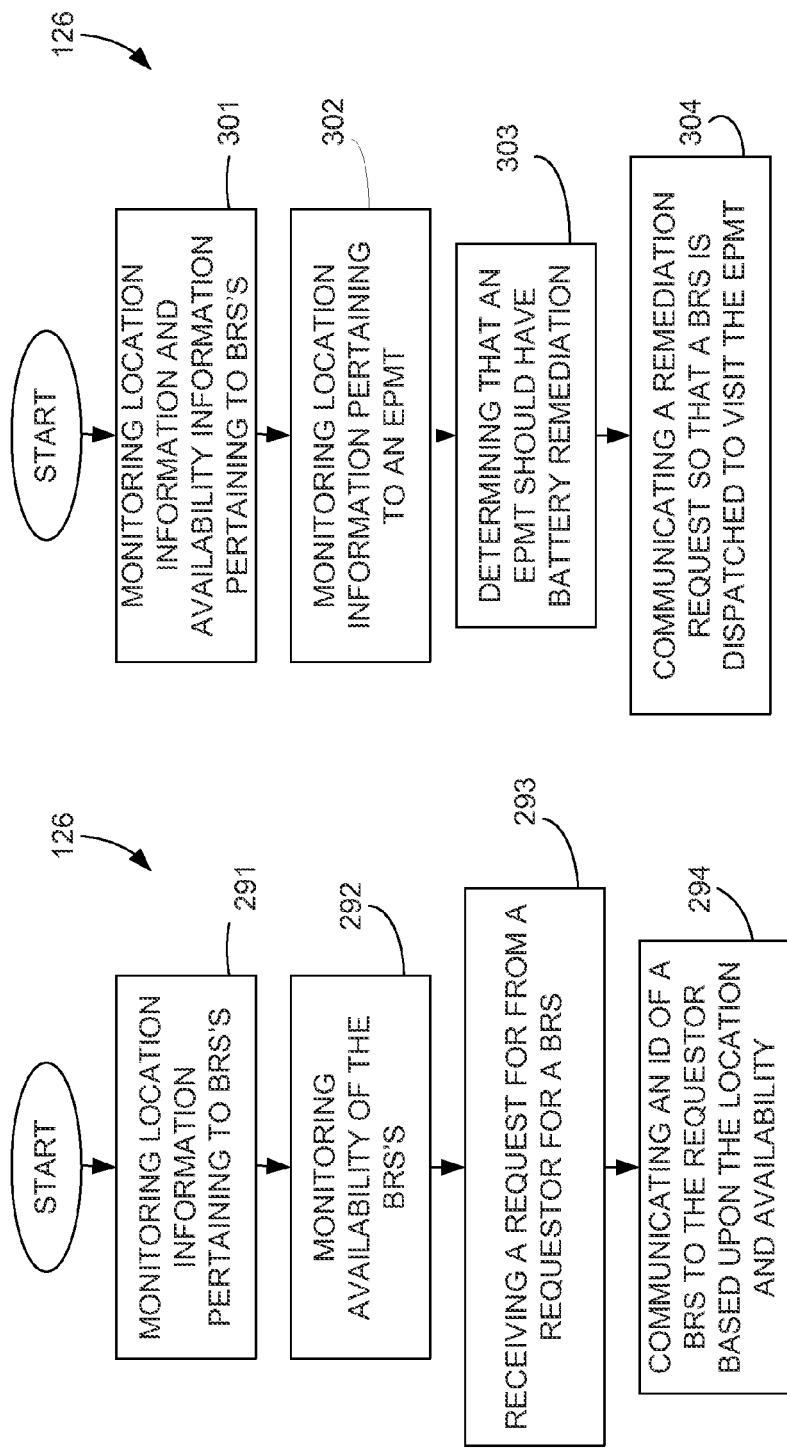

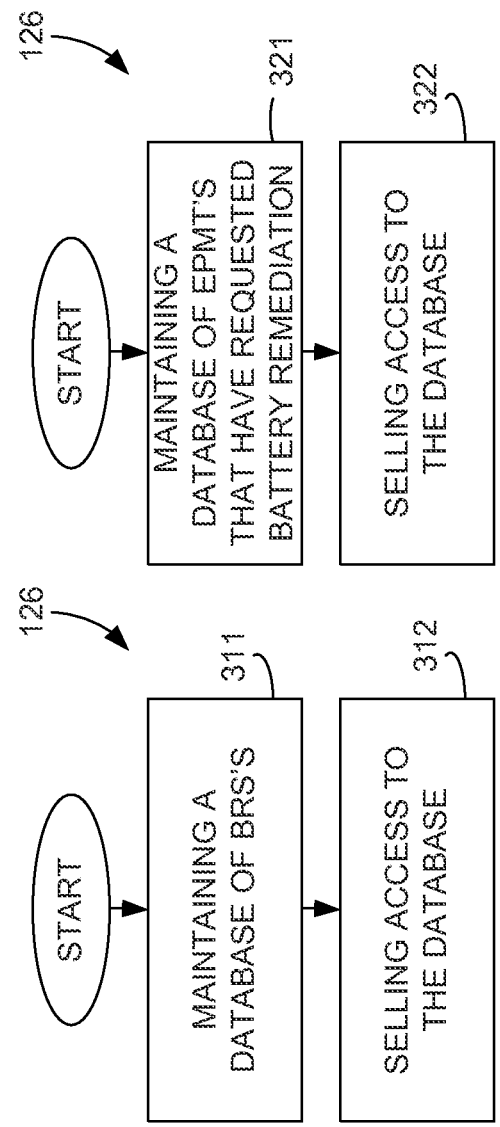

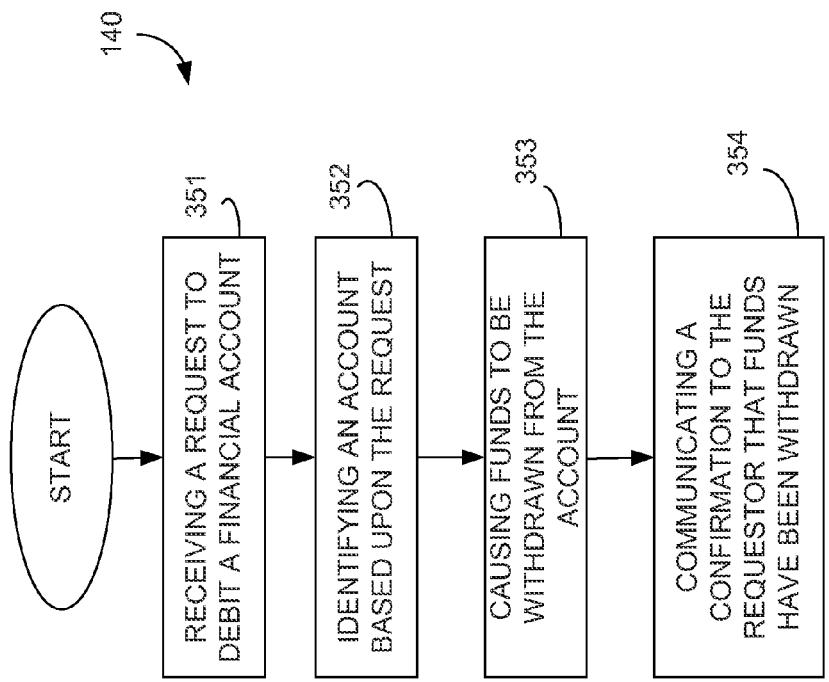

SYSTEMS AND METHODS FOR BATTERY REMEDIATION IN CONNECTION WITH AN ELECTRIC POWERED MOBIEL THING (EPMT)

CLAIM OF PRIORITY

This application claims priority to and the benefit of the following provisional applications: Ser. No. 61/427,158 filed on Dec. 24, 2010; and Ser. No. 61/444,297 filed on Feb. 18, 2011, both of which are incorporated herein by reference in their entirety.

BACKGROUND OF THE INVENTION

Electric powered mobile things (EPMTs), for example but not limited to, motor vehicles, boats, trains, and planes, etc., are becoming more popular in our society. There is a need for improved systems and methods for supporting an extensive deployment of such EPMTs, for example, improved systems and methods for battery remediation of EPMT's.

SUMMARY OF THE INVENTION

The present disclosure provides, among other things, various systems and methods relating to battery remediation (recharging, replacement, and/or repair) in connection with electric powered mobile things (EPMTs).

The present disclosure provides computer based systems and methods associated with an electric powered mobile thing (EPMT). A representative method, among others, can be summarized by the following steps: monitoring electric power capacity (EPC) associated with locomotion of the EPMT; monitoring travel data relating to the EPMT; engaging in a communication session with a remote host computer system (H-CS) based upon the EPC monitoring; requesting assistance of a battery remediation station (BRS) during the communication session; communicating location information relating to the EPMT during the communication session so that the BRS can visit and remediate (recharge, repair, or replace) a battery associated with the EPMT. Upon receiving this information, the host computer system (H-CS) can contact and dispatch the BRS to visit the EPMT. A representative system, among others, comprises an EPMT computer system (EPMT-CS) that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

Another representative method, among others, that can be implemented by an EPMT can be summarized by the following steps: monitoring EPC associated with locomotion of the EPMT; monitoring travel data relating to the EPMT 12; engaging in a communication session with the H-CS based upon the EPC monitoring; requesting assistance of the a BRS during the communication session; and receiving location data relating to one or more SBRSs during the communication session so that the EPMT can visit an SBRS and have remediated the battery associated with the EPMT. The H-CS monitors the locations of BRSs. Another representative system, among others, comprises a computer system that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

Another representative method, among others, that can be implemented by an EPMT can be summarized by the following steps: monitoring EPC associated with locomotion of the EPMT; monitoring remaining paid parking time; engaging in a communication session with a remote computer system based upon the electric power monitoring and the remaining paid parking time monitoring; requesting assistance of a BRS during the communication session; communicating location information relating to the EPMT during the communication session so that the BRS can visit and remediate a battery associated with the EPMT. Another representative system, among others, comprises a computer system that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

Another representative method, among others, that can be implemented by an EPMT can be summarized by the following steps: receiving a travel itinerary; monitoring EPC associated with the EPMT; initiating a notification message indicative of the sufficiency of EPC for the travel itinerary. Another representative system, among others, comprises a computer system that is programmed or designed to perform the foregoing steps. Another representative system, among others, comprises a system with a means for performing each of the foregoing steps. Yet another representative system among others, comprises a nontransitory computer readable medium having code for performing each of the foregoing steps.

Another representative method, among others, that can be implemented by an EPMT can be summarized by the following steps: preventing movement of the EPMT when a BRS is connected and permitting movement of the EPMT when the BRS is disconnected. A representative system, among others, comprises a computer system residing on the EPMT that is programmed or designed to perform the foregoing steps. Another representative system, among others, comprises a system with a means for performing each of the foregoing steps. Yet another representative system among others, comprises a nontransitory computer readable medium having code for performing each of the foregoing steps.

Another representative method, among others, that can be implemented by an EPMT can be summarized by the following steps: providing a warning signal to an EPMT passenger when a BRS is connected to the EPMT and withdrawing the warning signal when the BRS is disconnected from the EPMT. A representative system, among others, comprises a computer system that is programmed or designed to perform the foregoing steps. Another representative system, among others, comprises a system with a means for performing each of the foregoing steps. Yet another representative system among others, comprises a nontransitory computer readable medium having code for performing each of the foregoing steps.

Another representative method, among others, that can be implemented by an EPMT can be summarized by the following steps: detecting connection of a BRS and causing a power connector associated with the BRS to be physically disengaged from a power connector associated with the EPMT when battery recharging is complete. A representative system, among others, comprises a computer system that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

Another representative method, among others, that can be implemented by an EPMT can be summarized by the following steps: detecting connection of a BRS; and causing a power connector associated with the BRS to be physically disengaged from a power connector associated with the EPMT when a party provides an input that indicates a desire to disengage the power connection. Another representative system, among others, comprises a computer system that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

The present disclosure provides host computer systems (H-CSs) and methods for monitoring EPMTs and/or BRSs. A representative method, among others, can be summarized by the following steps: monitoring travel data associated with one or more BRSs; engaging in an EPMT communication session with a party or a computer system associated with an EPMT; receiving an EPMT recharge request relating to the EPMT during the communication session; engaging in a BRS communication session with a party or computer system associated with the BRS; communicating a BRS recharge request to the BRS during the BRS communication session. A representative system, among others, comprises a computer system that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

Another representative method, among others, that can be implemented by the H-CS can be summarized by the following steps: storing location data and current EPC data pertaining to EPMTs, determining that an EPMT should undergo battery remediation, and communicating a battery remediation request so that one or more BRSs are dispatched to visit the EPMT. A representative system, among others, comprises a computer system that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

Another representative method, among others, that can be implemented by an H-CS can be summarized by the following steps: monitoring location information pertaining to battery remediation stations (BRSs); monitoring availability of the BRSs; receiving a request from a requestor for a BRS; communicating an identification of one or more of the BRSs to the requestor. A representative system, among others, comprises a computer system that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

Another representative method, among others, that can be implemented by an H-CS can be summarized by the following steps: monitoring location information and availability information pertaining to BRSs; determining that an EPMT should undergo battery remediation; and communicating a battery remediation request so that a BRS is dispatched to visit the EPMT. The requestor can be, for example but not limited to, another computer system that monitors EPMTs and EPCs pertaining to the EPMTs, an EPMT, a PCD, etc. A representative system, among others, comprises a computer system that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

Another representative method, among others, that can be implemented by an H-CS can be summarized by the following steps: maintaining a database that tracks information pertaining to BRSs and selling access to information in the database. A representative system, among others, comprises a computer system that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

Another representative method, among others, that can be implemented by an H-CS can be summarized by the following steps: maintaining a database that tracks information pertaining to EPMTs and selling access to information in the database. A representative system, among others, comprises a computer system that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

Another representative method, among others, that can be implemented by an H-CS can be summarized by the following steps: receiving advertisement information (e.g., for a restaurant) associated with a business having a BRS; receiving a request for battery remediation from an EPMT; and communicating a location of the BRS and the advertisement information to the EPMT. A representative system, among others, comprises a computer system that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

The present disclosure provides systems and methods for monetarily charging for use of parking lot spaces. One such method, among others, can be summarized by the following steps: detecting that a mobile thing (MT), for example but not limited to, an EPMT or other motor vehicle, resides in a parking space; receiving information from the MT; identifying an account based upon the information; and for debiting a parking fee from the account. A representative system, among others, comprises a parking lot computer system (PL-CS) that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

The present disclosure provides systems and methods for taxing by governments. One such method, among others, can be summarized by the following steps: receiving ID information pertaining to a BRS and imposing a government tax on the BRS 14. The tax may be a flat fee for a time period, may be based upon the number or nature of a battery remediations, etc. A representative system, among others, is a government computer system (G-CS) that is programmed or designed to perform the foregoing steps. Another representative system, among others, comprises a system with a means for performing each of the foregoing steps. Yet another representative system, among others, comprises a nontransitory computer readable medium having code for performing each of the foregoing steps.

The present disclosure provides systems and methods for a personal communications device (PCD) to assist an EPMT party in finding a suitable BRS. One such method, among others, can be summarized by the following steps: communicating with a database having location information and availability information pertaining to BRSs; and displaying the location information and the availability information pertaining to the BRSs on a screen. A representative system, among others, comprises a software program stored on a computer readable medium of a PCD that causes performance of the foregoing steps. Another representative system, among others, comprises a system with a means for performing each of the foregoing steps. Yet another representative system, among others, comprises a nontransitory computer readable medium having code for performing each of the foregoing steps.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1A is a block diagram of a first embodiment of an electric powered mobile thing (EPMT) battery remediation system.

FIG. 10A is a flow chart of a second set of embodiments of the EPMT control software of FIG. 2 associated with the EPMT-CS.

FIG. 13 is a flow chart of a fifth set of embodiments of EPMT control software of FIG. 2 associated with the EPMT-CS.

FIG. 14 is a flow chart of a sixth set of embodiments of EPMT control software of FIG. 2 associated with the EPMT-CS.

FIG. 15 is a flow chart of an seventh set of embodiments of EPMT control software of FIG. 2 associated with the EPMT-CS.

FIG. 16 is a flow chart of a eighth set of embodiments of EPMT control software of FIG. 2 associated with the EPMT-CS.

FIG. 21 is a flow chart of a third set of embodiments of BRS control software of FIG. 3 associated with the BRS-CS.

FIG. 22 is a flow chart of a fourth set of embodiments of BRS control software of FIG. 3 associated with the BRS-CS.

FIG. 23 is a flow chart of a fifth set of embodiments of BRS control software of FIG. 3 associated with the BRS-CS.

FIG. 24 is a flow chart of a sixth set of embodiments of BRS control software of FIG. 3 associated with the BRS-CS.

FIG. 29 is a flow chart of a first set of embodiments of FI-CS control software of FIG. 5.

DETAILED DESCRIPTION

Figure 1B:
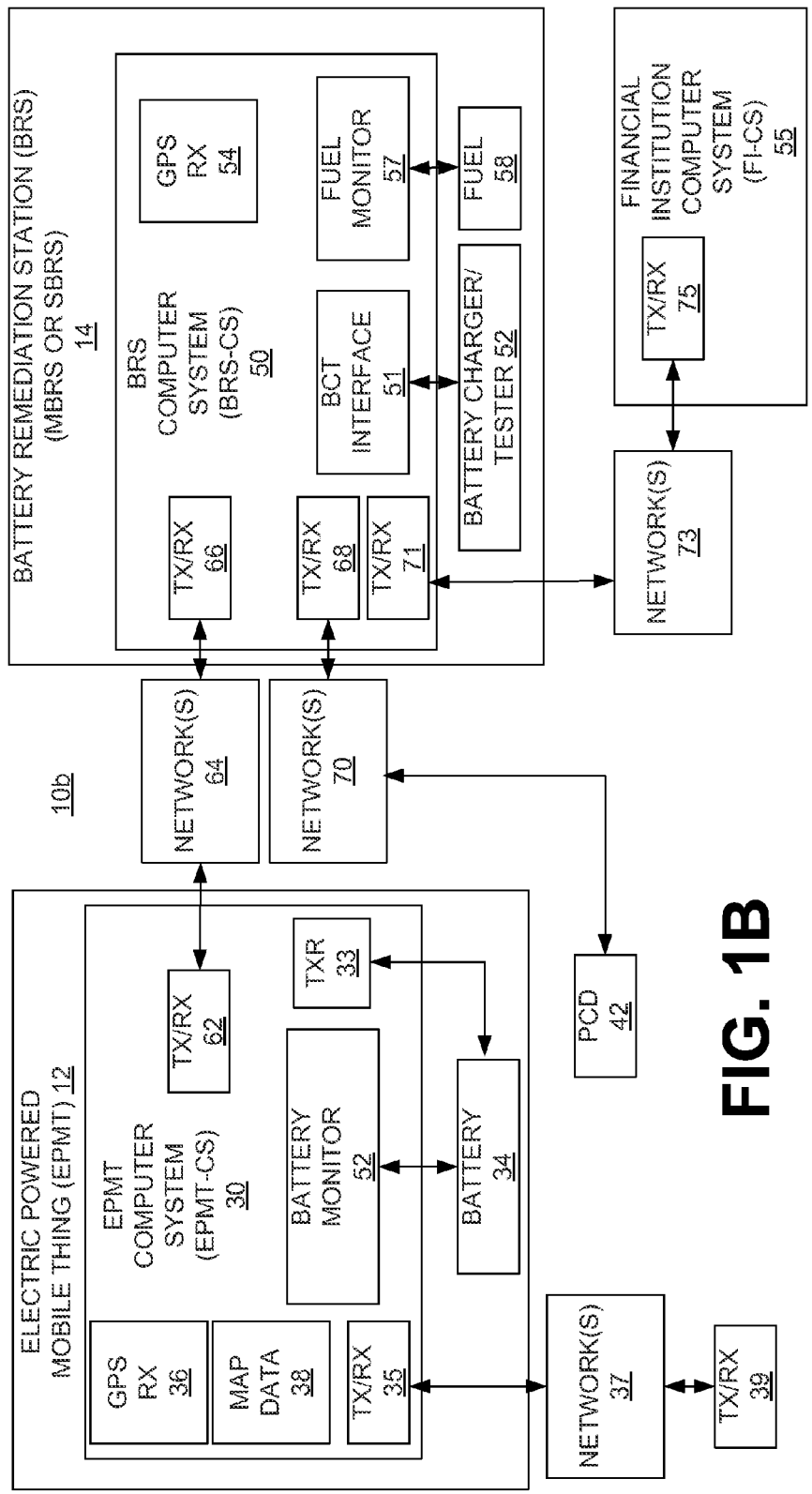
FIG. 1B is a block diagram of a second embodiment of the EPMT battery remediation system.

The present disclosure provides, among other things, various systems and methods relating to battery remediation in connection with electric powered mobile things (EPMTs), such as battery recharging, repairing, and/or replacing one or more batteries associated with the EPMTs.

A. EPMT Battery Remediation System

1. First Embodiment

FIG. 1A is a block diagram of a first embodiment of an EPMT battery remediation system and is denoted by reference numeral 10a. In general, the EPMT battery remediation system 10a includes one or more but preferably a plurality of EPMTs 12, one or more but preferably a plurality of battery remediation stations (BRSs) 14, and one or more host computer systems (H-CSs) 16. Only one of each of the foregoing are shown in FIG. 1A and will be described hereafter for simplicity. In operation, the H-CS 16 receives a request from an EPMT 12 and dispatches a mobile BRS (MBRS) 14 to visit and remediate (recharge, repair, and/or replace) one or more batteries 34 associated with the EPMT 12, or in an alternative embodiment, advises the EPMT 12 of one or more locations associated with one or more stationary BRSs (SBRSs) 14 so that the EPMT 12 can visit and receive remediation from an SBRS 14.

The EPMT 12 and the H-CS 16 can communicate with each other via an EPMT transceiver (TX/RX) 18, one or more networks 20, and an H-CS transceiver (TX/RX) 22. The networks 18 can include one or more of any suitable networks, for example but not limited to, a wireless, wired, analog, digital, packetized, nonpacketized, cellular, Internet, etc. The design of the TX/RXs 18, 22 to be utilized depends upon the type of network 18 that is utilized. Furthermore, the H-CS 16 and the BRS 14 can communicate with each other via a H-CS TX/RX 24, one or more networks 26, and TX/RX 28. The networks 26 can include one or more of any suitable networks, for example but not limited to, a wireless, wired, analog, digital, packetized, nonpacketized, cellular, Internet, etc. The design of the TX/RXs 24, 28 to be utilized depends upon the type of network 26 that is utilized. Many options are commercially available.

In some embodiments, a username and password security scheme can be utilized in connection with initiation of communication sessions among the EPMT 12, H-CS, and BRS 14. This can occur machine to machine, person to machine, or person to person, depending upon the embodiment to be practiced.

The EPMT 12 includes an EPMT computer system (EPMT-CS) 30. This EPMT-CS 30 can be implemented as a separate unit, as part of an existing computer system associated with the EPMT 12, or as a distributed system involving several computers. With a battery monitor 32, the EPMT-CS 30 measures and/or tests one or more electrical aspects or characteristics (power, energy, voltage, current, etc.) of one or more batteries 34 to assist in determining whether or not a recharge, repair, or replacement is needed. The battery monitor 32 take many of a number of possible different architectures. Nonlimiting examples of possible implementations are described in the following: U.S. Patent Application Publication 2009/0278545; U.S. Pat. No. 6,639,409; U.S. Pat. No. 5,712,568; U.S. Pat. No. 5,808,469; U.S. Pat. No. 5,646,534; and U.S. Pat. No. 4,929,931; all of the foregoing of which are incorporated herein by reference. Furthermore, see "Battery Monitoring Considerations for Hybrid Vehicles and Other Battery Systems With Dynamic Duty Loads," Battery Power Products & Technology, May/June 2006, Vol. 10, Issue 3, which is incorporated herein by reference. The aforementioned document describes voltage profiling, columb-counting, and ohmic capacity measurement techniques that can be employed in the design of the battery monitor 32. Moreover, the battery monitor 32 can be an amp hour meter that counts the rate and time of current flow from the battery 34 being discharged and does the same when the battery 34 is being charged back up, as described in Peter Kennedy, "Monitoring Battery Capacity," http://www.pkys.com/Amp_Hour_Meters.htm, which is incorporated herein by reference. Finally, the battery monitor 32 may employ an automotive battery monitor from the ADuC703x family of monitors that are commercially available from Analog Devices, Inc., U.S.A. or a Model AD8280 Li-ion battery safety monitor that is commercially available from Analog Devices, Inc., U.S.A, which is designed for monitoring Lithium-ion batteries (growing in popularity as energy storing reservoirs for high voltage energy).

Note that the batteries 34 may be associated with a high voltage circuitry associated with locomotion of the EPMT 12, sometimes referred to as "traction batteries," with low voltage circuitry associated with control or some other EPMT function, or both.

Optionally, the EMPT computer system 30 may be equipped with one or more other transducers (TXRs) 33 for monitoring, measuring, and/or testing one or more other chemical, mechanical, and/or temperature characteristics of the battery 34 to assist in determining whether or not the battery 34 should be recharged, repaired, or replaced.

Optionally, the EPMT-CS 30 may be designed to include or have access to a GPS receiver (GPS RX) 36 so that the EPMT and/or BRS location can be determined and map data 38 so that the EPMT location can be displayed on a screen-rendered map, in accordance with other embodiments of the invention as will be described later in this document.

The H-CS 16 can be implemented as a separate unit, as part of an existing computer system, or as a distributed system involving several computers.

Optionally, the H-CS 16 may be designed to include or have access to databases 40b-40e for implementing other embodiments of the invention as will be described later in this document.

Optionally, the H-CS 16 may be designed to communicate with one or more personal communications devices (PCDs) 42 via TX/RX 44 and one or more networks 46. The networks 46 can include one or more of any suitable networks, for example but not limited to, a wireless, wired, analog, digital, packetized, nonpacketized, cellular, Internet, etc. The design of the TX/RX 44 to be utilized depends upon the type of network 46 that is utilized. Many options are commercially available.

The PCD 42 is generally a communications device that can be personally associated with a party and enable point-to-point communications between the H-CS 16 and the party. Nonlimiting examples of PCDs 42 are as follows: a personal computer (PC) capable of displaying a notification through e-mail or some other communications software, a television, a wireless (e.g., cellular, satellite, etc.) or non-wireless telephone, a pager, a personal data assistant, a vehicle navigation System (VNS) in a motor vehicle, a radio receiver or transceiver, or any other device capable of notifying the user with some type of user perceptible emission. Many, although not all, PCDs 42 are transportable. Furthermore, a plurality of PCDs 42 may exist in some applications, so that the H-CS 16 can simultaneously or substantially concurrently notify a plurality of parties having respective PCDs 42 of remediation status or other information.

A battery remediation station computer system (BRS-CS) 50 can be implemented as a separate unit, as part of an existing computer system, or as a distributed system involving several computers. The BRS 14 includes a BRS-CS 50 that monitors a battery charger/tester 52 by way of a battery charger/tester (BCT) interface 51. The BCT interface is merely an interface that can convert computer control signals from the local interface 104 into higher voltage control signals for the battery charger/tester 52. In some embodiments, the battery charger/tester 52 has a control port that can directly interface with the local interface 104 (without the need for the BCT interface 51). The battery charger/tester 52 is used to recharge the battery 34 associated with the EPMT 12 and/or to test the battery 34 in order to determine if the battery 34 should be recharged, repaired, or replaced. The battery charger/tester 52 can be implemented as one or more devices, such as a battery charger and a separate battery tester.

Sophisticated charger/testers 52 are commercially available that monitor battery voltage, current flow, and battery temperature to minimize charging time. Such a charger/tester 52 send as much current as it can without raising battery temperature too much. Less sophisticated charger/testors 52 monitor voltage or current only and make certain assumptions about average battery characteristics. A charger/tester 52 like this might, for example, apply maximum current to the battery 34 up through 80 percent of its capacity, and then cut the current back to some preset level for the final 20 percent to avoid overheating the battery 34.

In some embodiments, the charger/testor 52 is merely a device that recharges the EPMT battery 34, and the BRS-CS 50 monitors recharging progress of the battery 34 by communicating with the EPMT-CS 30 (e.g., via TX/RX 62, network(s) 64, and TX/RX 66), which in turn monitors battery charging via the EPMT battery monitor 32. The EPMT control software 110 can be designed to make the determination as to when the recharging is complete, or it can be designed to communicate data to the BRS control software 120, which makes the decision based upon the data. As a nonlimiting example of the latter, when the EPMT battery monitor 32 is an amp hour meter, the EPMT control software 110 may be designed to provide historical discharge data that has been recorded in memory 102 to the BRS control software 120 as well as current recharge data indicative of recharge progress, so that the BRS control software 120 can make a decision on when the EPMT battery 34 is fully charged.

The EPMT-CS 30 and the BRS-CS 50 may be designed to communicate historical and recharge data, as described previously, as well as other information, for example but not limited to, authentication or verification information, identity information, monetary charges, etc., over a communication channel on the power recharging connections. As examples, the communication channel can be designed in accordance with the HomePlug AV or IEEE P1901 standards, both of which are incorporated herein by reference.

Optionally, the BRS-CS 50 may be designed to include or have access to a GPS receiver (GPS RX) 54 so that the BRS location can be determined and map data 56 so that the BRS and/or EPMT location can be displayed on a map, in accordance with other embodiments of the invention as will be described later in this document.

Optionally, the BRS 14 may be designed to carry fuel 58 for, in addition to battery remediation the EPMT 12, providing fuel to the EPMT 12, in accordance with other embodiments of the invention as will be described later in this document. For example, the EPMT 12 may be a hybrid vehicle that uses both electricity and fuel for locomotion or for other purposes. In this case, the MRS computer system 50 includes a fuel monitor 57 for monitoring a level or amount of fuel that can be dispensed to the EPMT 12, which information can be communicated to the H-CS 16 and used for example by the H-CS 16 to select an appropriate BRS 14. The fuel can be, for example but not limited to, a fossil fuel, gasoline, propane, hydrogen, oil, etc.

Optionally, the H-CS 16 can be designed to communicate with a computer system 55 of a financial institution (FI), for example but not limited to, a bank, a credit card company, a Pay Pal service, a credit card processor, a company that gives credit, a company that can debit a financial account, etc., so that the H-CS 16 can charge a fee or costs to a financial account for, e.g., the dispatch of the BRS 14, access to a database 40b-40e, battery recharging, batteries, fuel, etc. As shown in FIG. 1A, the H-CS 16 communicates with the FI-CS 55 via a H-CS TX/RX 59, one or more networks 60, and FI-CS TX/RX 61. The networks 60 can include one or more of any suitable networks, for example but not limited to, a wireless, wired, analog, digital, packetized, nonpacketized, cellular, Internet, etc. The design of the TX/RXs 59, 61 to be utilized depends upon the type of network 60 that is utilized. Many options are commercially available.

The networks 20, 26, 46, 60 may be the same one or more networks or different one or more networks, the latter of which is shown in FIG. 1A.

2. Second Embodiment

FIG. 1B is a block diagram of a second embodiment of an EPMT battery remediation system and is denoted by reference numeral 10b. In general, the EPMT battery remediation system 10b includes one or more but preferably a plurality of EPMTs 12 and one or more but preferably a plurality of BRSs 14 (MBRSs and/or SBRSs). Only one of each of the foregoing are shown in FIG. 1A and will be described hereafter for simplicity. In operation, an MBRS 14 receives a request from an EPMT 12 and the MBRS 14 visits and remediates (recharges, repairs, and/or replaces) one or more batteries 34 associated with the EPMT 12, or in alternative embodiment, an SBRS 14 receives a request from an EPMT 12, and the EPMT 12 and SBRS 14 schedule a battery remediation at the SBRS 14. In the latter scenario, the SBRS-CS 50 may be designed with program code to advise the EPMT 12 of the SBRC location, availability, etc.

The EPMT 12 and the BRS 14 can communicate with each other via an EPMT transceiver (TX/RX) 62, one or more networks 64, and a H-CS transceiver (TX/RX) 66. The networks 64 can include one or more of any suitable networks, for example but not limited to, a wireless, wired, analog, digital, packetized, nonpacketized, cellular, Internet, etc. The design of the TX/RXs 62, 66 to be utilized depends upon the type of network 64 that is utilized.

The EPMT 12 includes an EPMT-CS 30. This EPMT-CS 30 can be implemented as a separate unit, as part of an existing computer system associated with the EPMT 12, or as a distributed system involving several computers. With a battery monitor 32, the EPMT-CS 30 monitors one or more batteries 34.

Optionally, the EPMT-CS 30 may be designed to include or have access to a GPS RX 36 so that the EPMT and/or BRS location can be determined and map data 38 so that the EPMT location can be displayed on a map, in accordance with other embodiments of the invention as will be described later in this document.

Optionally, the EPMT 12 may be designed to communicate with one or more PCDs 39 via TX/RX 35 and one or more networks 37, in accordance with other embodiments of the invention as will be described later in this document. The networks 37 can include one or more of any suitable networks, for example but not limited to, a wireless, wired, analog, digital, packetized, nonpacketized, cellular, Internet, etc. The design of the TX/RX 35 to be utilized depends upon the type of network 37 that is utilized.

Optionally, the BRS may be designed to include or have access to databases 40b-40e (FIG. 1) associated with the H-CS 16 or with another remote computer system for implementing other embodiments of the invention as will be described later in this document.

Optionally, the BRS 14 may be designed to communicate with one or more PCDs 42 via TX/RX 68 and one or more networks 70. The networks 70 can include one or more of any suitable networks, for example but not limited to, a wireless, wired, analog, digital, packetized, nonpacketized, cellular, Internet, etc. The design of the TX/RX 68 to be utilized depends upon the type of network 46 that is utilized.

The BRS 14 includes a BRS-CS 50 that monitors a battery charger/tester 52. The battery charger/tester 52 is used to recharge and/or test a battery 34 associated with the EPMT 12.

Optionally, the BRS-CS 50 may be designed to include or have access to a GPS RX 54 so that the BRS location can be determined and include or have access to map data 56 so that the BRS and/or EPMT location can be displayed on a map, in accordance with other embodiments of the invention as will be described later in this document.

Optionally, the BRS 14 may be designed to carry fuel 58 and have a fuel monitor 57 for, in addition to providing battery remediation in connection with the EPMT 12, providing fuel to the EPMT 12, in accordance with other embodiments of the invention as will be described later in this document. The EPMT 12 may be for example a hybrid vehicle that uses both electricity and fuel for locomotion or for other purposes.

The networks 37, 64, 70 may be the same one or more networks or different one or more networks.

Optionally, the BRS-CS 50 can be designed to communicate with a computer system 55 of a financial institution (FI), for example but not limited to, a bank, a credit card company, a Pay Pal service, a company that gives credit, a company that can debit a financial account, etc., so that the BRS 14 can, among other things, charge a fee or costs to a financial account for, e.g., the dispatch of the BRS 14, battery recharging, batteries, fuel, etc. As shown in FIG. 1B, the BRS 14 communicates with the FI-CS 55 via a BRS-CS TX/RX 71, one or more networks 73, and FI-CS TX/RX 75. The networks 73 can include one or more of any suitable networks, for example but not limited to, a wireless, wired, analog, digital, packetized, nonpacketized, cellular, Internet, etc. The design of the TX/RXs 71, 75 to be utilized depends upon the type of network 73 that is utilized. Many options are commercially available.

2. Third Embodiment

Figure 1C:
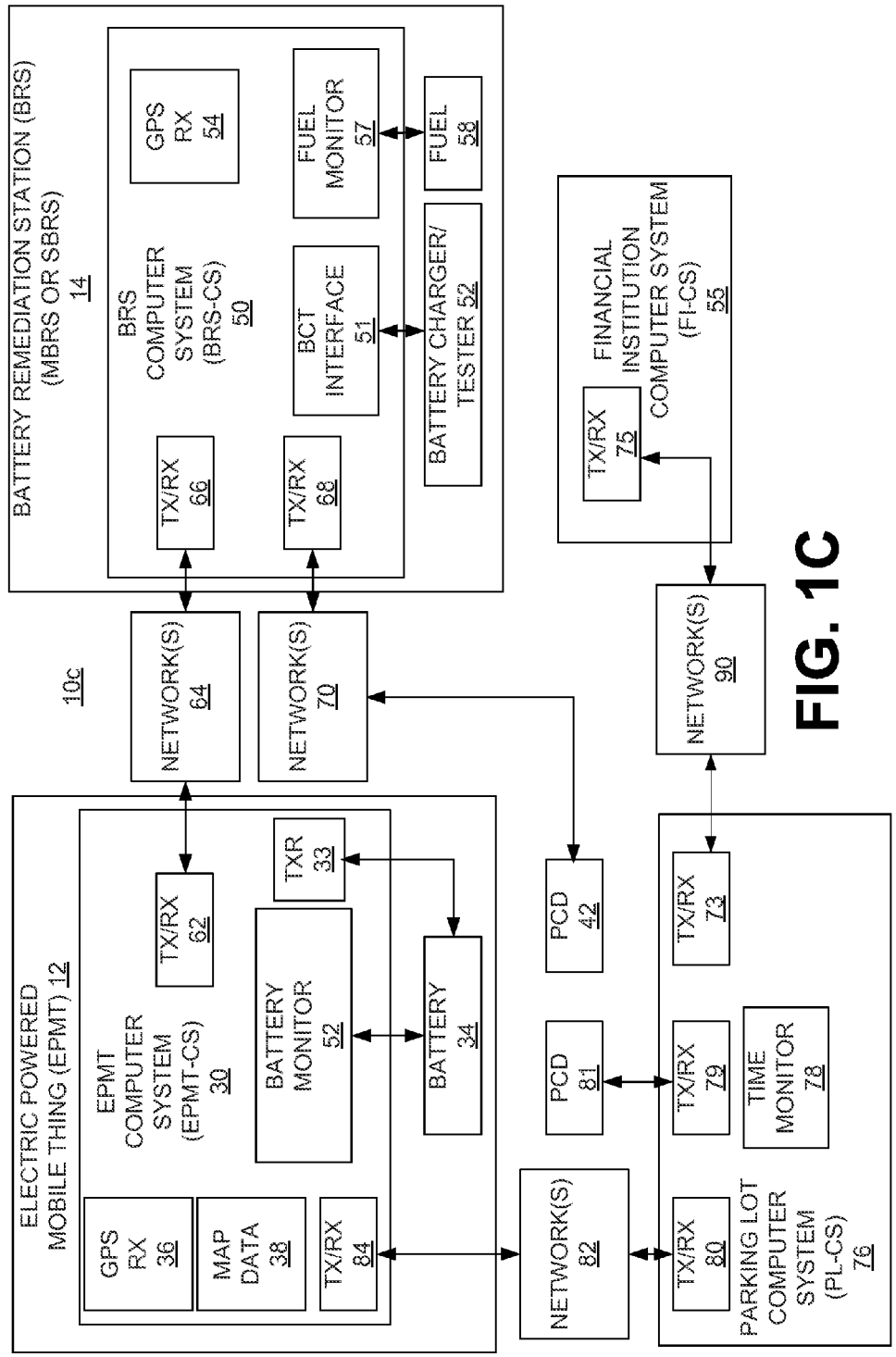
FIG. 1C is a block diagram of a third embodiment of the EPMT battery remediation system.

FIG. 1C is a block diagram of a third embodiment of an EPMT battery remediation system and is denoted by reference numeral 10c.

The EPMT battery remediation system 10c includes a parking lot computer system (PL-CS) 76 that is designed to, among other things, monitor parking spaces, to communicate with an EPMT 12, to monitor parking time or some other equivalent indicia with time monitor 78, and to monetarily charge, directly or indirectly, for the parking time. This PL-CS 76 can be implemented as a separate unit, as part of an existing computer system, or as a distributed system involving several computers.

The PL-CS 76 and the EMPT computer system 30 communicate with each other via TX/RX 80, one or more networks 82, and TX/RX 84. The networks 82 can include one or more of any suitable networks, for example but not limited to, a wireless, wired, analog, digital, packetized, nonpacketized, cellular, Internet, etc. The design of the TX/RXs 80, 84 to be utilized depends upon the type of network 46 that is utilized. Many options are commercially available.

Optionally, in the EPMT battery remediation system 10c, the PL-CS 76 and an FI-CS 55 can communicate so that, for example, the PL-CS 76 can have a financial account debited for parking fees. The PL-CS 76 and an FI-CS 55 can communicate with each other via a PL-CS TX/RX 88, a one or more networks 90, and an FI-CS TX/RX 75. The networks 90 can include one or more of any suitable networks, for example but not limited to, a wireless, wired, analog, digital, packetized, nonpacketized, cellular, Internet, etc. The design of the TX/RXs 88, 75 to be utilized depends upon the type of network 90 that is utilized. Many options are commercially available.

B. EPMT Computer System (EPMT-CS)

Figure 2:
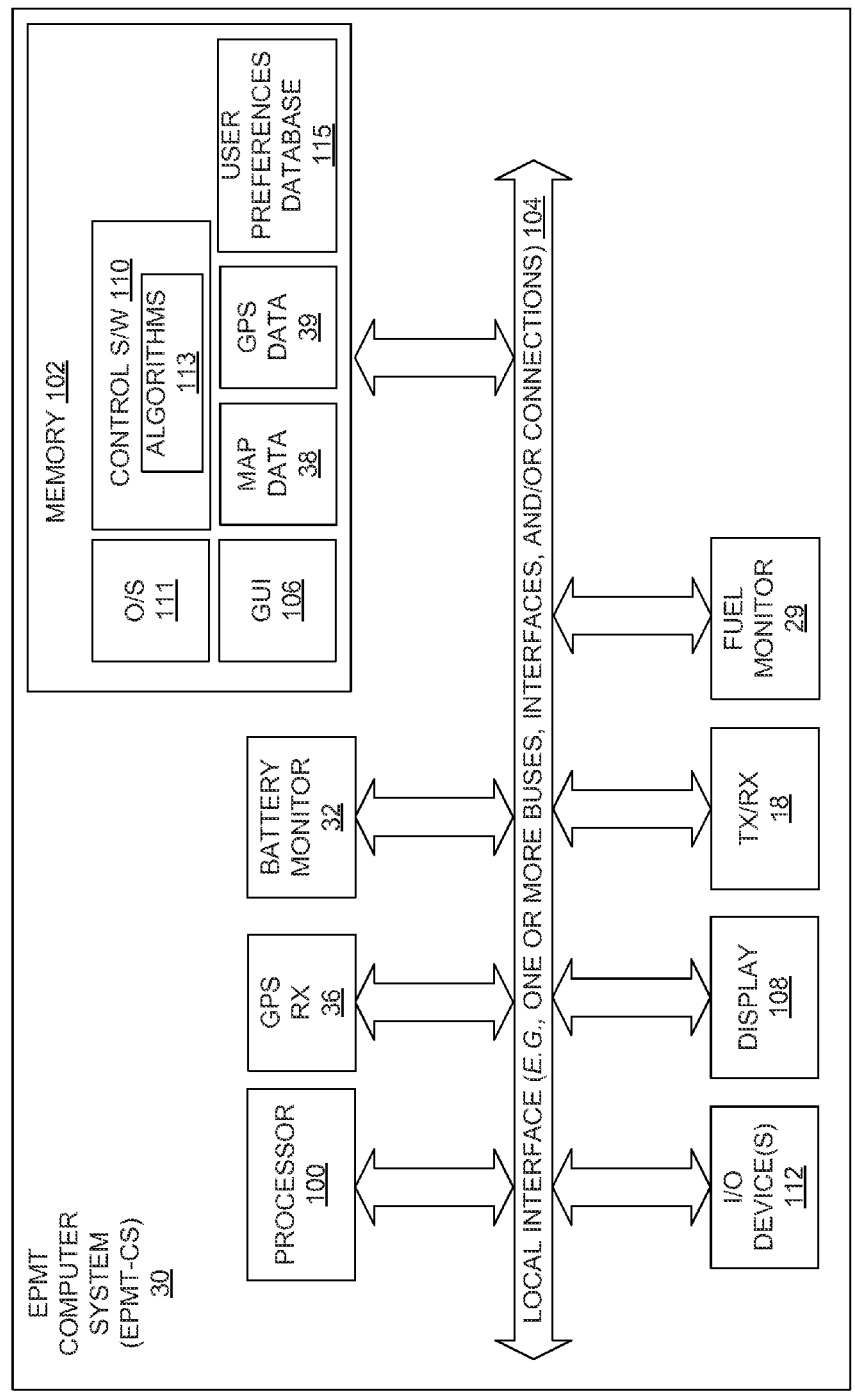
FIG. 2 is a block diagram of the EPMT computer system (EPMT-CS) of FIGS. 1A-1C.

An example of the architecture of the EPMT-CS 30 (FIGS. 1A-1C) is shown in FIG. 2 and will be described immediately hereafter. Note that much of this discussion is equally applicable to the architectures of the BRS-CS 50 (FIG. 3), the H-CS 16 (FIG. 4), the PL-CS 76 (FIG. 5), the FI-CS 55 (FIG. 6), and the government computer system (G-CS) 131 (FIG. 7), as will be apparent by use of the same reference numerals in the figures.

Generally, in terms of hardware architecture, as shown in FIG. 2, the EPMT-CS 30 includes a processor 100, a memory 102, and other input and/or output (I/O) devices (or peripherals) that are communicatively coupled via a local interface 104. The local interface 104 can be, for example but not limited to, one or more buses or other wired or wireless connections, as is known in the art. The local interface 104 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 100 is a hardware device for executing software, particularly that stored in memory 102. The processor 100 can be any custom made or commercially available processor, a central processing unit (CPU), an auxiliary processor among several processors associated with the computer 30, a semiconductor based microprocessor (in the form of a microchip or chip set), a macroprocessor, or generally any device for executing software instructions.

The memory 102 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 102 may incorporate electronic, magnetic, optical, and/or other types of storage media. Note that the memory 102 can have a distributed architecture, where various components are situated remote from one another, but can be accessed by the processor 100.

The software in memory 102 may include one or more separate programs, each of which comprises an ordered listing of executable instructions for implementing logical functions. In the example of FIG. 2, the software in the memory 102 includes the map data 38, a graphical user interface (GUI) 106 for generating and driving display screens and exchanging other information with the display 108, control software 110 for controlling the EPMT-CS 30, algorithms 113 situated in the control software 110 for use in connection with triggering events, a suitable operating system (O/S) 111, and an EPMT user preferences database 115 for storing preferences that are preset by a party associated with the EPMT 12. The O/S 111 essentially controls the execution of other computer programs, such as the control software 110 and GUI 106, and provides scheduling, input-output control, file and data management, memory management, and communication control and related services.

The I/O devices 112 may include input devices, for example but not limited to, a keypad, keyboard, finger pad, mouse, scanner, microphone, etc. Furthermore, the I/O devices may also include output devices, for example but not limited to, a printer, display, speaker, etc. Finally, the I/O devices 112 may further include devices that communicate both inputs and outputs, for instance but not limited to, a modulator/demodulator (modem; for accessing another device, system, or network), a radio frequency (RF) or other transceiver (TX/RX), a telephonic interface, a bridge, a router, etc.

In this example, the I/O devices 112 include the TX/RX 18, the battery monitor 32, the GPS RX 36, the display 108, and perhaps one or more other I/O devices 112.

When the EPMT-CS 30 is in operation, the processor 100 is configured to execute software stored within the memory 102, to communicate data to and from the memory 102, and to generally control operations of the EPMT-CS 30 pursuant to the software. The control software 110 and the O/S 111, in whole or in part, but typically the latter, are read by the processor 100, perhaps buffered within the processor 100, and then executed.

The control software 110 (as well as any other software of the present disclosure) can be stored on any non-transitory computer readable medium for use by or in connection with any computer related system or method. In the context of this document, a computer readable medium is an electronic, magnetic, optical, or other physical device or means that can contain or store a computer program for use by or in connection with a computer related system or method. The control software 110 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be anything that can store the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In some embodiments, the EPMT-CS 30 may be designed to interface with a local or on-board vehicle navigation system (VNS) to receive GPS data 39, map data 38, and/or other information.

C. BRS Computer System (EPMT-CS)

An example of the architecture of the BRS-CS 50 (FIGS. 1A-1C) is shown in detail in FIG. 3 and will be described immediately hereafter.

Figure 3:
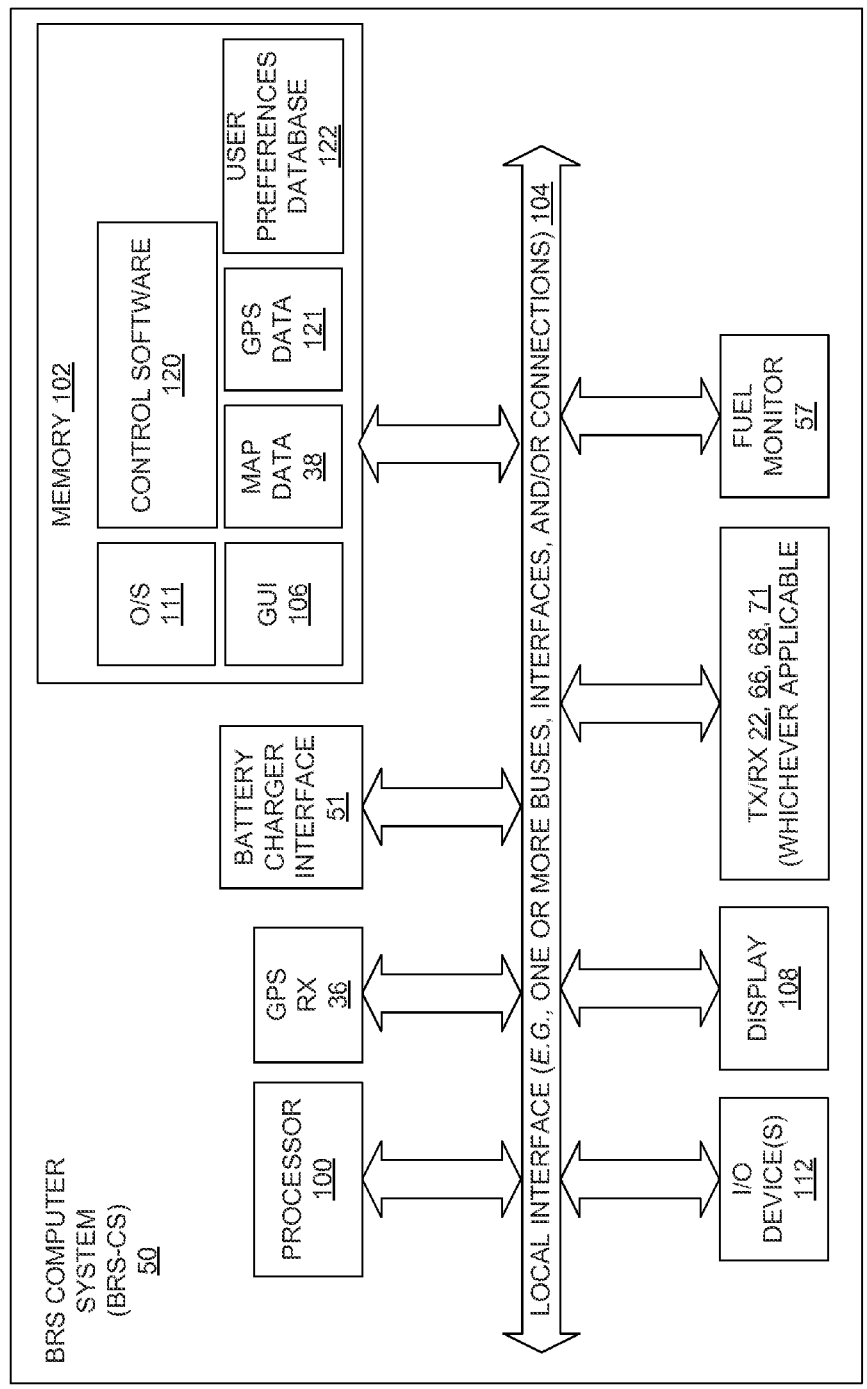
FIG. 3 is a block diagram of the BRS computer system (BRS-CS) of FIGS. 1A-1C.

Generally, in terms of hardware architecture, as shown in FIG. 3, the BRS-CS 50 includes a processor 100, a memory 102, and other input and/or output (I/O) devices (or peripherals) that are communicatively coupled via a local interface 104. The processor 100 executes software in the memory 102, as previously described.

In the example of FIG. 3, the software in the memory 102 includes the map data 56, a GUI 106 for generating and driving display screens and exchanging other information with the display 108, control software 120 for controlling the BRS-CS 50, GPS data 121, a suitable operating system (O/S) 111, and a BRS user preferences database 122 for storing preferences that can be preset by a party associated with the BRS 14. The I/O devices include the GPS RX 36, the battery interface 51, the display 108, TX/RXs 28, 66, 68, 71 (whichever applicable), and perhaps one or more other I/O devices 112.

When the EPMT-CS 30 is in operation, the processor 100 is configured to execute software stored within the memory 102, to communicate data to and from the memory 102, and to generally control operations of the BRS-CS 50 pursuant to the software. The control software 120 and the O/S 111, in whole or in part, but typically the latter, are read by the processor 100, perhaps buffered within the processor 100, and then executed.

The control software 120 can be stored on any computer readable medium for use by or in connection with any computer related system or method.

E. Parking Lot Computer System (PL-CS)

An example of the architecture of the PL-CS 76 (FIGS. 1A-1C) is shown in detail in FIG. 5 and will be described immediately hereafter.

Figure 5:
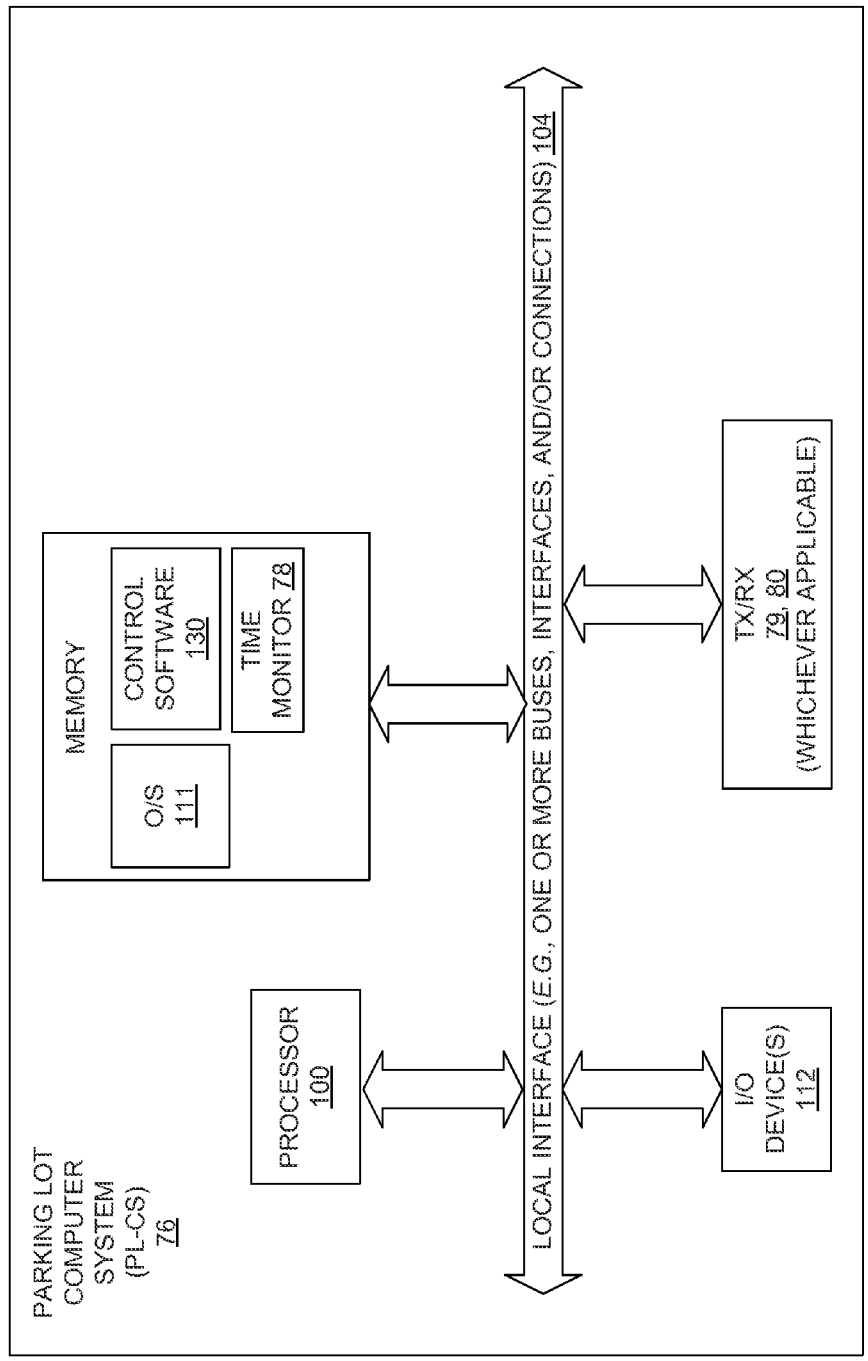
FIG. 5 is a block diagram of the parking lot computer system (PL-CS) of FIG. 1C.

Generally, in terms of hardware architecture, as shown in FIG. 5, the PL-CS 76 includes a processor 100 and a memory 102 that are communicatively coupled via a local interface 104. The processor 100 executes software in the memory 102, as previously described. The I/O devices include the TX/RX 80, and perhaps one or more other I/O devices 112.

In the example of FIG. 5, the software in the memory 102 includes the time monitor 78, PL-CS control software 130 for controlling the PL-CS 76, and a suitable operating system (O/S) 111.

When the PL-CS 76 is in operation, the processor 100 is configured to execute software stored within the memory 102, to communicate data to and from the memory 102, and to generally control operations of the PL-CS 76 pursuant to the software. The PL-CS control software 130 and the O/S 111, in whole or in part, but typically the latter, are read by the processor 100, perhaps buffered within the processor 100, and then executed.

The PL-CS control software 130 can be stored on any computer readable medium for use by or in connection with any computer related system or method.

E. Financial Institution Computer System (FI-CS)

An example of the architecture of the financial institution computer system (R-CS) 55 (FIGS. 1B-1C) is shown in detail in FIG. 6 and will be described immediately hereafter.

Figure 6:
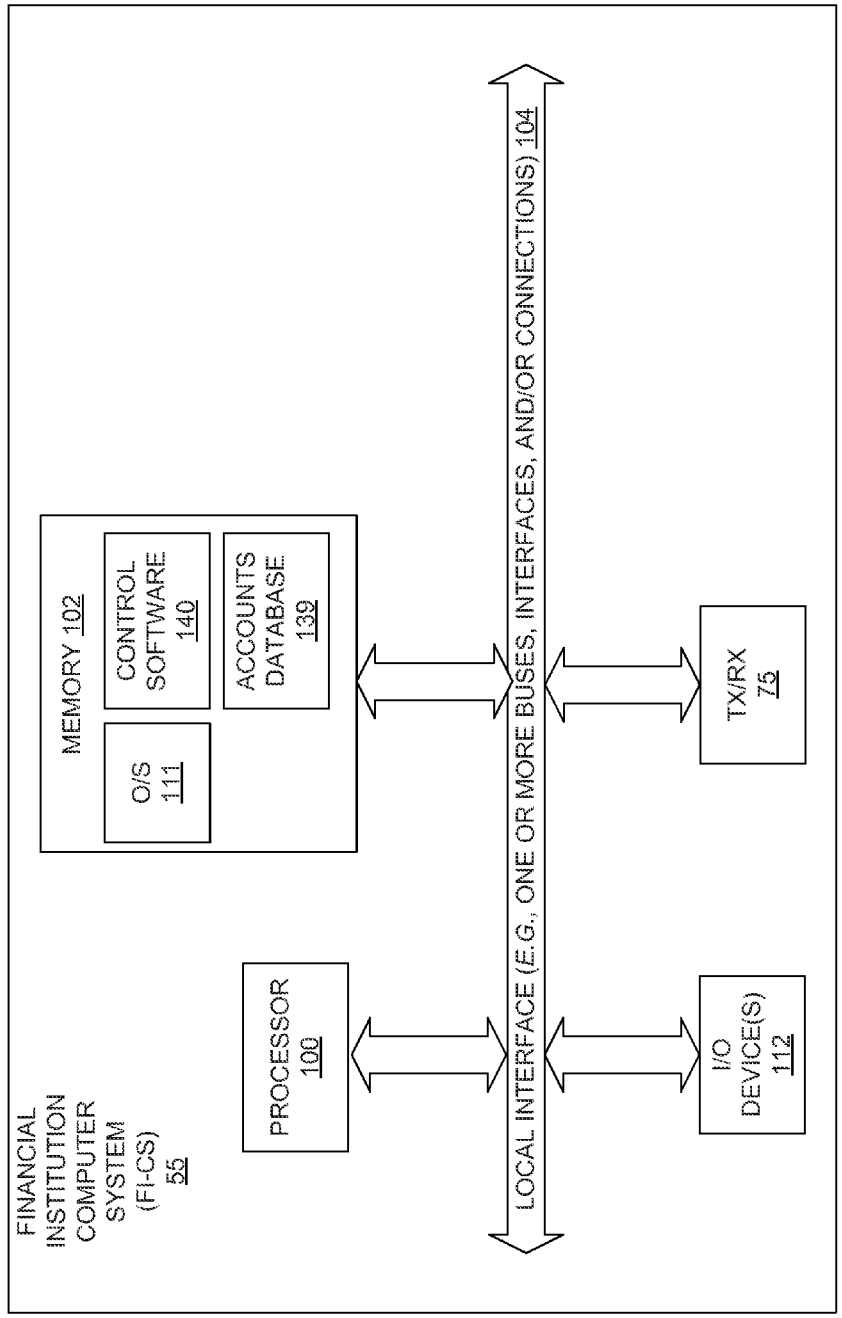
FIG. 6 is a block diagram of the financial institution computer system (FI-CS) of FIG. 1C.

Generally, in terms of hardware architecture, as shown in FIG. 6, the FI-CS 55 includes a processor 100, a memory 102, a TX/RX 75, and perhaps other input and/or output (I/O) devices 112 (or peripherals) that are communicatively coupled via a local interface 104. The processor 100 executes software in the memory 102, as previously described.

In the example of FIG. 6, the software in the memory 102 includes control software 140, an accounts database 139 having data in connection with monetary accounts, and a suitable operating system (O/S) 111. The I/O devices include the TX/RX 75, and perhaps one or more other I/O devices 112.

When the FI-CS 55 is in operation, the processor 100 is configured to execute software stored within the memory 102, to communicate data to and from the memory 102, and to generally control operations of the PL-CS 76 pursuant to the software. The control software 140 and the O/S 111, in whole or in part, but typically the latter, are read by the processor 100, perhaps buffered within the processor 100, and then executed.

The FI-CS control software 140 can be stored on any computer readable medium for use by or in connection with any computer related system or method.

F. Government Computer System (G-CS)

An example of the architecture of a government computer system (G-CS) 131 is shown in detail in FIG. 7 and will be described immediately hereafter. The G-CS 131 can be used in connection with embodiments that will be described hereinafter and that involve taxing battery remediation activities.

Figure 7:
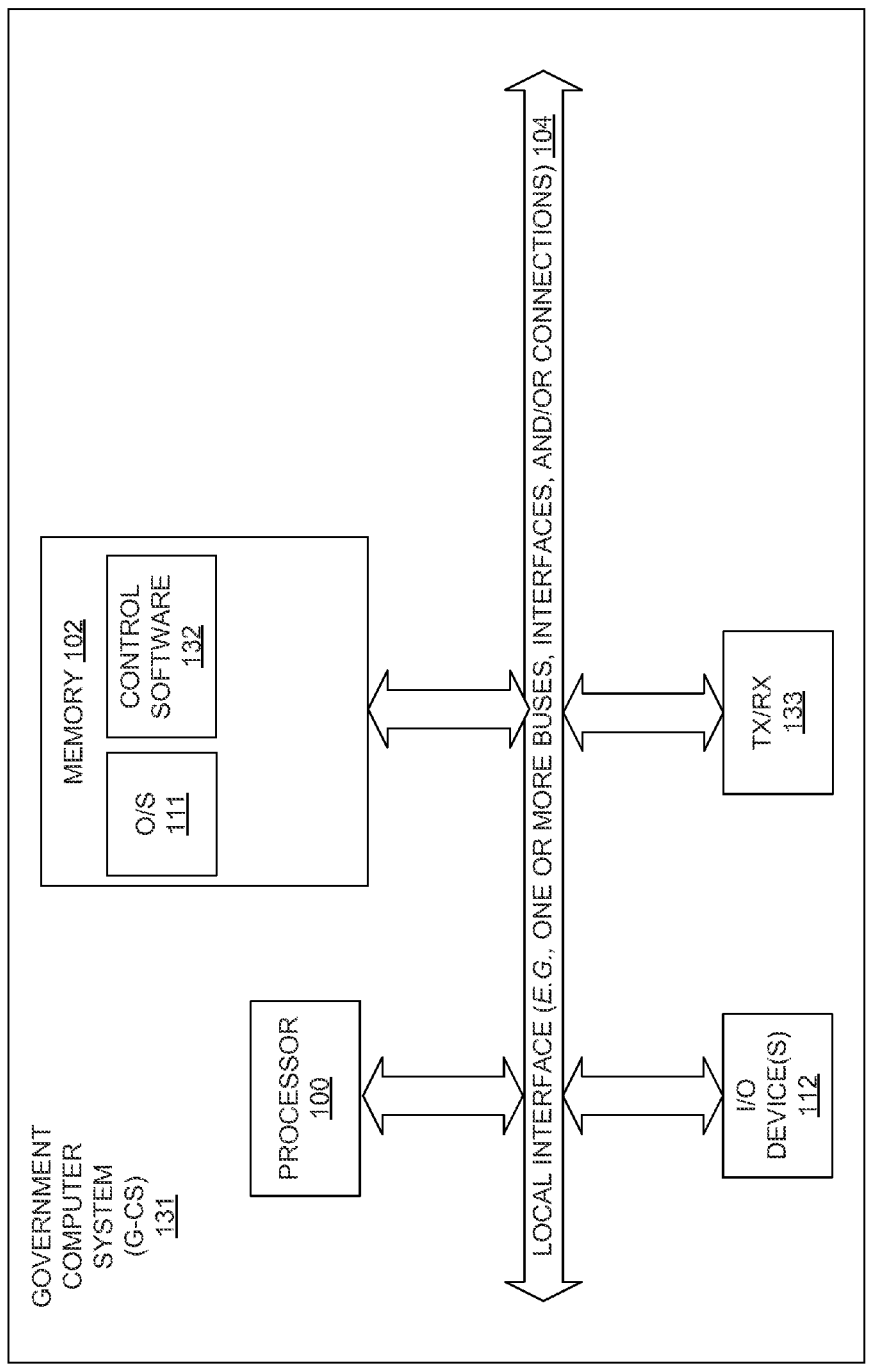
FIG. 7 is a block diagram of a government computer system (G-CS) that is capable of imposing a government tax on BRSs and/or BRS activities.

Generally, in terms of hardware architecture, as shown in FIG. 7, the G-CS 131 includes a processor 100, a memory 102, a TX/RX 133, and other input and/or output (I/O) devices 112 (or peripherals) that are communicatively coupled via a local interface 104. The processor 100 executes software in the memory 102, as previously described. In the example of FIG. 7, the software in the memory 102 includes control software 132, and a suitable operating system (O/S) 111.

When the G-CS 131 is in operation, the processor 100 is configured to execute software stored within the memory 102, to communicate data to and from the memory 102, and to generally control operations of the G-CS 131 pursuant to the software. The control software 132 and the O/S 111, in whole or in part, but typically the latter, are read by the processor 100, perhaps buffered within the processor 100, and then executed.

The control software 132 can be stored on any computer readable medium for use by or in connection with any computer related system or method.

G. EPMT Database

Figure 8:
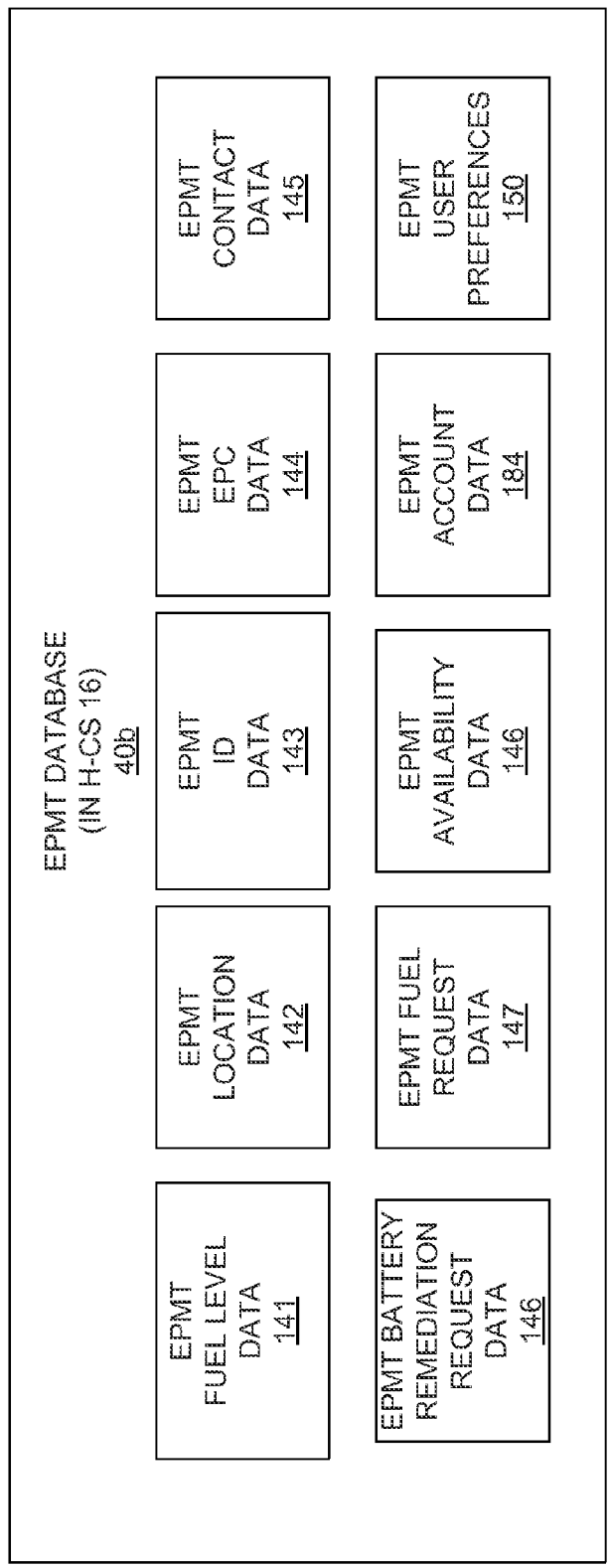
FIG. 8 is a block diagram of the EPMT database of FIGS. 1A and 2.

FIG. 8 is a block diagram of the EPMT database 40*b* (FIG. 1A) situated in the H-CS 16. The EPMT database 40*b* is preferably a relational database and can include, as nonlimiting examples, the following relating to one or more EPMTs: EPMT fuel level data 141, EPMT location data 142, EPMT ID data 143, EPMT EPC data 144, EPMT contact data 145, EPMT battery remediation request data 146, EPMT fuel request data 147, EPMT availability data 146, EPMT account data 184, and EPMT user preferences 150. The data stored in the EPMT database 40*b* depends upon which embodiment of the present disclosure that is being implemented.

H. BRS Database

Figure 9:
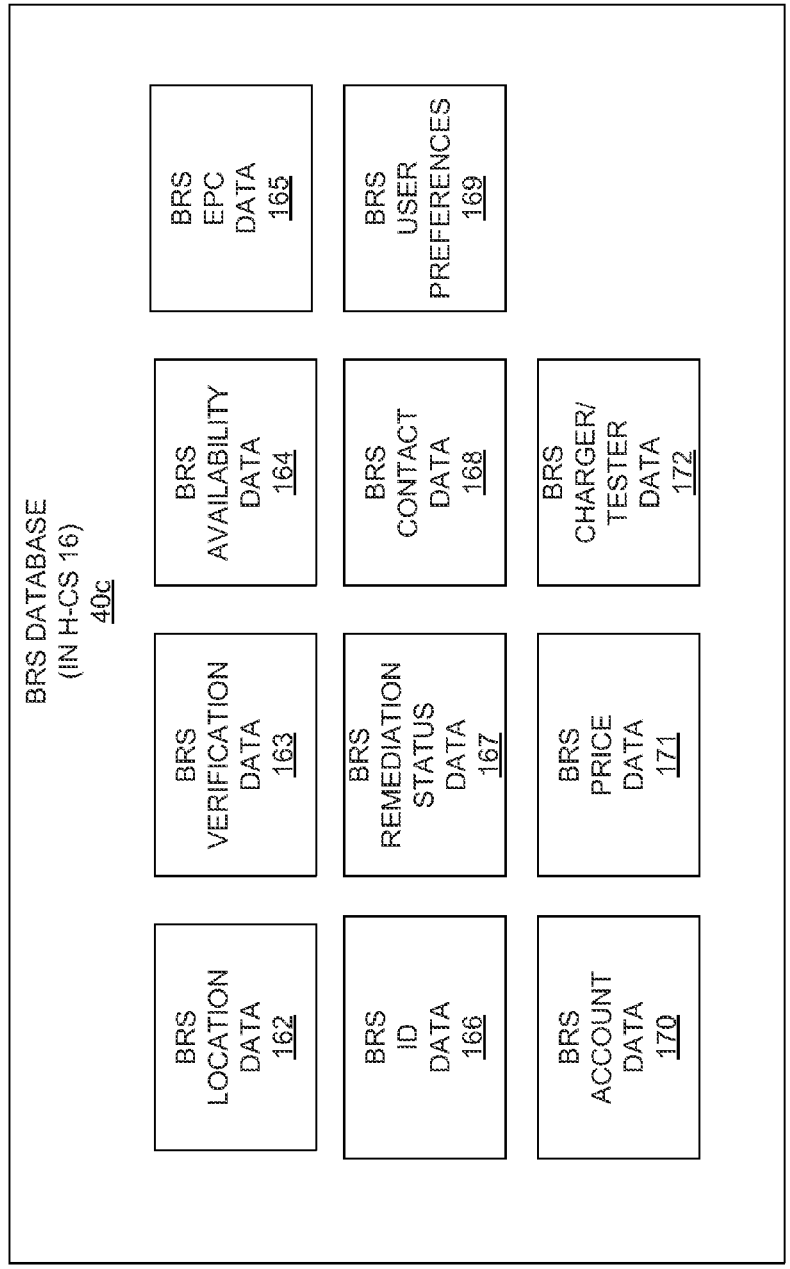
FIG. 9 is a block diagram of the BRS database of FIGS. 1A and 3.

FIG. 9 is a block diagram of the BRS database 40*c* (FIG. 1A) situated in the H-CS 16. The BRS database 40*c* is preferably a relational database and can include, as nonlimiting examples, the following in connection with one or more BRSs 14: BRS location data 162, BRS verification data 163, BRS availability data 164, BRS EPC data 165, BRS ID data 166, BRS remediation status data 167, BRS contact data 168, BRS user preferences 169, and BRS account data 170. The data stored in the BRS database 40*c* depends upon which embodiment of the present disclosure that is being implemented.

I. Control Methodology and Software for EPMT-CS

1. First Set of Embodiments

Figure 10:
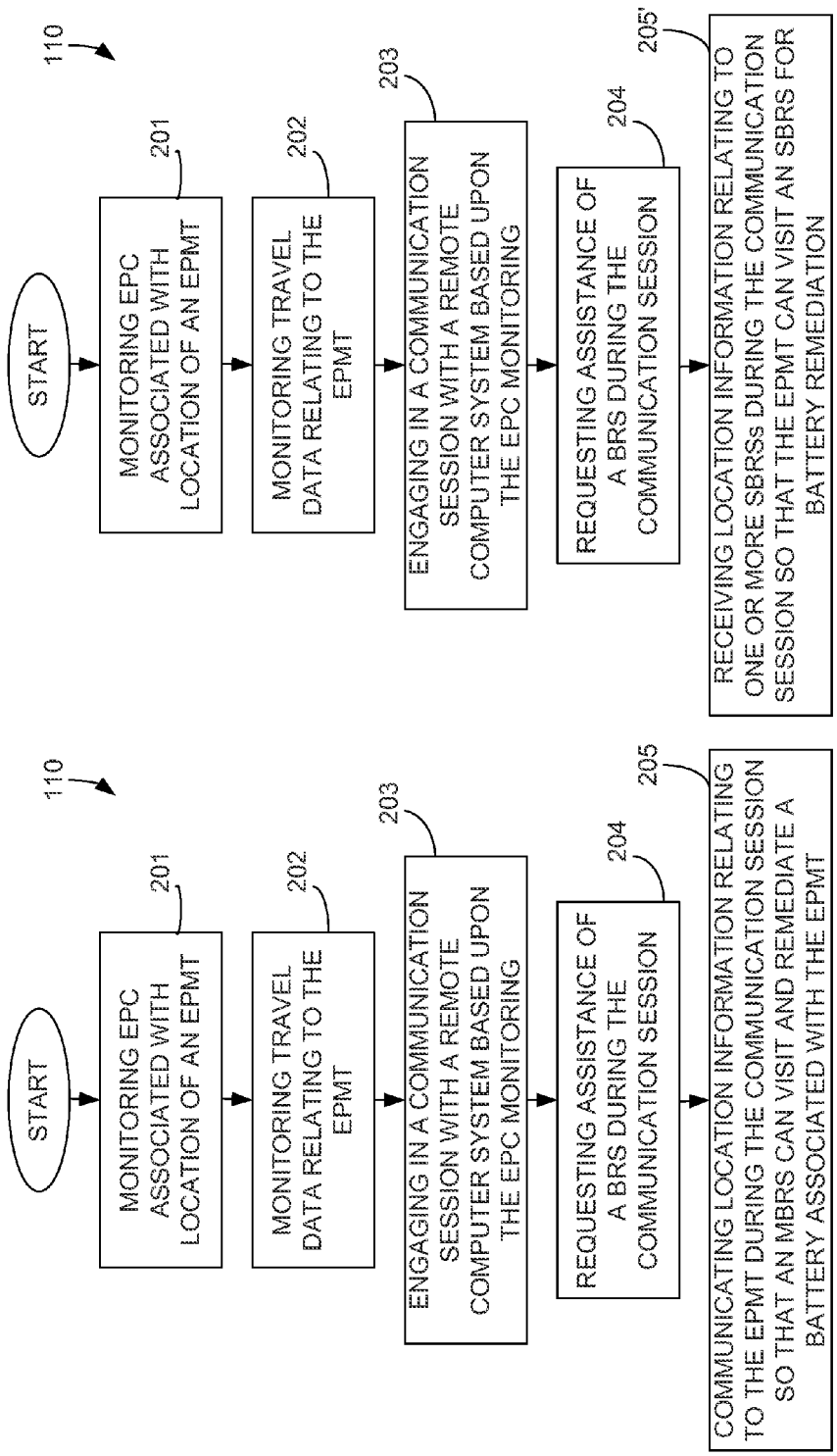
FIG. 10 is a flow chart of a first set of embodiments of EPMT control software of FIG. 2 associated with the EPMT-CS.

A first set of embodiments of the EPMT control software 110 (FIG. 2) will now be described with reference to FIG. 10. In this first set, the EPMT control software 110 (FIG. 2) includes at least the following program code (or logic): program code 201 for monitoring electric power capacity (EPC) associated with locomotion of the EPMT 12; program code 202 for monitoring travel data relating to the EPMT 12; program code 203 for engaging in a communication session with the H-CS 16 based upon the EPC monitoring; program code 204 for requesting assistance of the BRS 14 during the communication session; and program code 205 for communicating location data relating to the EPMT 12 based upon the travel data during the communication session so that the BRS 14 can visit and recharge a battery 34 associated with the EPMT 12. Upon receiving this data, the H-CS 16 can contact and dispatch the BRS 14 to visit the EPMT 12 for battery remediation. In preferred embodiments, the H-CS control software 126 (FIG. 4) is designed with program code that accesses the BRS database 40*c* having data pertaining to one or more BRSs 14 and that identifies a particular BRS 14 to visit the EPMT 12.

In some embodiments, the battery remediation request may specify the specific type of remediation that is requested: recharge, repair, or replacement. In fact, a party can specify a user preference involving battery remediation. For example, the party might specify that, when battery remediation needs to be requested based upon the measured EPC, then always request a replacement as opposed to recharging or repair. As another example, the party might specify that, when battery remediation needs to be requested based upon the measured EPC, then never request repair.

The EPC is generally the ability of the battery 34 to perform. The EPC can be monitored by one or more of the following, as examples: measuring an amount of electric power or energy that is currently stored in the battery 34, is currently being consumed by the battery 34, or that has already been consumed by the battery 34, measuring voltage associated with the battery 34, measuring current sourced from a battery 34, measuring a fluid level associated with the battery 34, measuring acidity of a fluid associated with a battery, measuring temperature of the battery 34, or measuring build up of material on battery plates, etc. Algorithms 113 can be employed in the EPMT control software 110 that considers or correlates more than one of the foregoing when determining whether or not to request battery remediation.

More specifically, the EPC can be monitored by periodically measuring power output from a battery 34 with a commercially available power meter. The power levels are monitored and compared with one or more predefined thresholds that are preset in the user preferences database 115 of the EPMT 12 or that are preset by the user and stored in the EPMT database 40b (FIG. 8). As a simple example, the algorithm 113 implemented in the EPMT software 110 may be as follows: when the measured power level is below a predefined threshold, then battery remediation should be requested.

The EPMT control software 110 can also be designed with algorithms 113 to monitor a rate at which power decreases over time and to use this rate independently or in combination with other data about the battery 34 to make a determination as to whether or not battery remediation should be requested.

In some embodiments, the EPC is monitored by periodically measuring energy expended by the battery 34. A power meter is used to measure power output from the battery 34. The power measurements are converted to energy measurements, as power is equal to energy per unit of time. A determination can be made as to whether or not battery remediation should be requested based upon energy measurements and a predefined threshold. The threshold can be preset in user preferences database 115 of the EPMT 12 or can be preset by the user and stored as user preferences 150 in the EPMT database 40b (FIG. 7). The algorithm 113 implemented in the EPMT software 110 could be as follows, as a simple example: when the expended energy exceeds a predefined percentage of the known energy that can be supplied by the battery 34, then battery remediation should be requested.

The EPMT control software 110 can also be designed with algorithms 113 to monitor a rate at which energy decreases over time and to use this rate independently or in combination with other data about the battery 34 to make a determination as to whether or not battery remediation should be requested.

In some embodiments, the EPC is monitored by periodically measuring voltage on the battery 34 with a commercially available voltage meter and periodically measuring current sourced from the battery with a commercially available current meter. A determination can be made by the EPMT control software 110 as to whether or not battery remediation should be requested based upon the measured voltage and current. The algorithm 113 implemented in the EPMT software 110 could be as follows, as a simple example: when the voltage from the battery 34 drops below a predefined threshold X and when the sourced current exceeds a predefined threshold Y during the battery drop, then battery remediation should be requested. The thresholds X, Y can be preset in the user preferences database 115 of the EPMT 12 or can be preset by the user and stored as EPMT user preferences in EPMT database 40b (FIG. 8).

The EPMT control software 110 can also be designed with algorithms 113 to monitor a rate at which voltage and/or current decreases over time and to use this information independently or in combination with other information about the battery 34 to make a determination as to whether or not battery remediation should be requested.

The EPMT-CS 30 may further be designed to detect when a battery 34 or part thereof associated with the EPMT 12 should be repaired or replaced because it is defective. For example, a commercially available transducer 33 can be implemented on the EPMT 12 to measure a fluid level associated with the battery 34. When the fluid level is inadequate, as detected by the transducer 33, the EPMT control software 110 may be designed with program code that causes initiation of the battery remediation request. In some embodiments, the user can predefine a user preference 150 (FIG. 7) that specifies: when battery fluid is low, initiate the BRS request and the type of battery remediation will be repair.

As another example, a commercially available transducer 33 can be implemented on the EPMT 12 to measure acidity of a fluid associated with the battery 34. When the acidity level is inadequate, as detected by the transducer 33, the EPMT control software 110 may be designed with program code that causes initiation of the battery remediation request. In some embodiments, the user can predefine a user preference 150 (FIG. 7) that specifies: when fluid acidity is inadequate, initiate the BRS request and the type of battery remediation will be replacement.

As yet another example, a commercially available transducer 33 can be implemented on the EPMT 12 to measure build up of material on one or more battery plates associated with the battery 34. When the build up level is unacceptable, as detected by the transducer 33, the EPMT control software 110 may be designed with program code that causes initiation of the battery remediation request. In some embodiments, the user can predefine a user preference 150 (FIG. 7) that specifies: when build up on plates is unacceptable, initiate the BRS request and the type of battery remediation will be replacement.

The EPMT control software 110 may be designed with program code to periodically measure EPC to create a list of periodic measurements and determine whether or not to initiate a notification message based upon the periodic measurements and one or more non-measured but known battery characteristics, including but not limited to, battery type, number of battery cells, battery age, whether a reserve battery exists, etc. Many different algorithms 113 can be employed to make the decision on whether or not to engage in a communication session with the remote computer system. For example, one algorithm 113 might be as follows: when the battery is over 4 years old and when the rate of change of voltage is greater than X and the distance to be traveled is greater than Y, then initiate the notification message. In some designs, the user can predefine X and Y as user preferences 150 in EPMT database 40b. As another example of another algorithm 113, the algorithm 113 might be as follows: when EPC is below a predefined threshold and when the EPMT has a reserve battery with adequate EPC, then do not initiate the notification message.

The travel data is preferably location information but may be, for example but not limited to, one or a combination of the following: location information, geographical region information, geographical coordinates, a distance traveled along a known route, a time period that corresponds to a distance along a known route, knowledge that the EPMT 12 has passed through certain checkpoints, etc. As with other embodiments in this disclosure, the travel data may or may not be derived from GPS data received with the GPS RX 36 associated with the EPMT 12. In the preferred embodiments, sensor 36 is a GPS sensor(s), although other types of positioning systems (having components that are local to and/or remote from the EPMT 12) and/or sensors are also possible. For example, other types of positioning systems that may be used include, but are not limited to, GLONASS, LORAN, Shoran, Decca, TACAN, radar, traffic system monitoring, a system for monitoring vehicle stops along a route, or any other of numerous possible tracking systems or combinations thereof.

The control software 110 may be designed with program code that will, during the communication session, cause a time or time period that the EPMT 12 is available or is not available for battery remediation to be communicated from the EPMT-CS 30 to the H-CS 16.

The EPMT 12 control software 110 may be designed with program code that will, during the communication session, cause one or more of the following to be communicated from the EPMT-CS 110 to the H-CS 16: a type of vehicle, a license plate number, a VIN, driver license information, a location of power port, an amount of recharge, a type of battery, whether a battery is stationary or removable, a type of connection port, a number of previous recharges, a condition of battery 34 and/or battery cells, a number of batteries, a speed of battery remediation, a list of one or more acceptable specific types of BRSs 14, billing information, credit card information, bank account charge information (e.g., bank account number and bank routing number), a length of authorized recharge, control port information, power port information, a maximum monetary charge limit, a minimum acceptable recharge amount or minimum acceptable time that is available from the BRS, etc.

The EPMT control software 110 may be further designed with program code that requests a BRS 14 that results in a least expensive cost during the communication session. The H-CS 16 may maintain price information pertaining to various BRSs 14 in BRS database 40c (FIG. 1A). In this embodiment, the BRS control software 120 (FIG. 3) may be designed to access the BRS database 40c, select the least expensive BRS 14, and then communicate with the selected BRS 14. In another embodiment, the BRS control software 120 may be designed to communicate with a plurality of BRSs 14 in order to obtain quotes, select the least expensive BRS 14, and then communicate with the selected BRS 14.

The EPMT control software may be further designed with program code that requests a BRS 14 that is closest, i.e., in closer proximity to the EPMT 12 as compared to one or more other BRSs 14.

The EPMT control software 110 may be designed with program code that provides a user interface that enables a party to predefine the power level that, once achieved, will cause the EPMT control software 110 to engage in the communication session with the H-CS 16. In one embodiment, among others, the GUI 106 (FIG. 2) drives one or more appropriate screens to the user via display 108 and receives one or more inputs from the user via I/O devices 108 that predefine or select the power level.

The EPMT control software 110 may be designed with program code that provides a user interface that enables a party to predefine a time or time period when the EPMT 12 is available for battery remediation. In one embodiment, among others, the GUI 106 (FIG. 2) drives one or more appropriate screens to the user via display 108 and receives one or more inputs from the user via I/O devices 108 that predefine or select the time or time period.

The EPMT control software 110 may be designed with program code that provides a user interface that enables a party to input verification information that is communicated to the H-CS 16 for verifying that the assistance request is from an authorized source. This verification information is then communicated by the H-CS 16 to the BRS 14 that will visit the EPMT 12. A party associated with the BRS 14 can present this verification information to the user or EPMT-CS 30 of the EPMT 12. The verification information could be any of the following (a nonexhaustive list): a code, a password, etc.

The EPMT control software 110 may be designed with program code that causes verification information to be communicated to the remote computer system from the EPMT-CS 30. The verification information or a derivative thereof is ultimately communicated by the BRS-CS 50 to the EPMT-CS 30 to verify that the BRS 14 has engaged the appropriate EPMT 12 or to verify that the EPMT 12 has engaged the appropriate BRS 14. The verification information can be communicated wirelessly (e.g., a Bluetooth connection, RF connection, etc.) or via a wired connection that is established between the computer systems 30, 50 once the BRS 14 is in close proximity to the EPMT 12. The verification information could be any of the following (a nonexhaustive list): a code, a password, an identification such as the name of the battery remediation requestor, a work order, a vehicle identification number (VIN), an image of the EPMT 12, a driver's license picture of a party associated with the EPMT 12, a credit card or debit card number, etc.

The EPMT control software 110 may be further designed to engage in a communication session with one or more PCDs 39 (FIG. 1B) associated with a party when battery remediation is completed, or alternatively, a predefined time period before battery remediation is completed. The battery monitor 32 (FIG. 1A-1C) can be used to determine if the battery 34 has sufficient electric charge. Charge is electrical energy stored in the battery 34. If the battery 34 is being recharged and the design of the EPMT control software 110 calls for an advance notification of recharge completion, then the progression of recharge can be monitored and a suitable algorithm 113 can be employed to predict when the battery 34 will have a full charge based upon the rate of increase of battery charge, which can be determined by battery charge measurements over time.

The user can predefine user preferences to control: whether or not one or more PCDs 39 is contacted, the telephone number associated with a PCD 39, the predefined time period before completion of battery recharging, etc. The EPMT control software 110 accesses these user preferences in user preferences database 115 and operates accordingly.

The EPMT control software 110 may be further designed to initiate a communication with a PCD 39 associated with a party when the BRS-CS 50 has communicated with the EPMT-CS 30. This feature would be useful when a party leaves the EPMT 12 before the BRS 14 arrives, so that the user knows that battery remediation is underway.

The EPMT control software 110 may be designed to generate a user interface that enables a party to indicate a desire to receive a notification communication when the BRS 14 has arrived or has completed battery remediation and to predefine a communication method for the notification communication.

A vehicle navigation system (VNS) having a GPS RX 36 and user interface screen may be designed to implement the functionality and operation of the EPMT-CS 30.

The BRS 14 may be additionally equipped with a fuel tank for transporting fuel 58 (FIGS. 1A-1C). In the case of a hybrid EPMT 12, wherein the EPMT 12 consumes both fuel and electricity, the EPMT may be designed to monitor fuel capacity associated with the EPMT 12 and to communicate fuel capacity information during the communication session with the H-CS 16 and/or the BRS-CS 14, whichever is applicable.

The EPMT control software 110 may be designed with program code that generates a user interface that enables a party associated with the EPMT 12 to receive a message indicating a need for a recharge and to enable the party to input permission for requesting assistance from the BRS 14.

Verification information may be communicated from the remote computer system (H-CS 16 or BRS-CS 50) to the EPMT-CS 30 that enables a party associated with the EPMT 12 to verify that an arriving BRS 14 was dispatched from the authorized source. The verification information may be anything, including but not limited to, a selected or predefined code, a link to a website that provides work order information, an image of the BRS or its driver, a video of the BRS, etc.

The remote computer system (H-CS 16 or BRS-CS 50) that is contacted by the EPMT 12 may be designed to enable a party to cancel, confirm, or modify an order.

The EPMT software 110 may be further designed with program code that receives advertisement information pertaining to a business, for example but not limited to, a restaurant, having a BRS 14 from the remote computer system and causes the advertisement information to be displayed on a display 108 associated with the EPMT 12 along with an indication that a BRS resides at or near the business. This type of advertising could be powerful, as it enables an EPMT driver to acquire battery remediation, such as recharging, while at a business. As an example, the business information can be stored in advertisement information database 40*d* of H-CS 16 and communicated by the H-CS 16 to the EPMT-CS 30 during the communication session. In some embodiments, EPMT-CS 30 is implemented as part of a VNS and the BRSs 14 are displayed on a navigation screen on display 108 along with the advertisement information.

The battery remediation request may include or may be accompanied by a request to implement recharging at a particular speed. There are many different types of battery chargers 52. Different BRSs 14 may carry different charger/testers 52 that recharge batteries 34 at different rates. The H-CS 16 can store and access this battery charger/tester data 172 in BRS database 40*c* (FIG. 9). When a specific speed request is made by an EPMT 12, then the H-CS 16 can access the battery charger/tester data 172 and make a selection of an appropriate BRS 14 to visit and recharge the EPMT 12.

2. Second Set of Embodiments

A second set of embodiments of the EPMT control software 110 (FIG. 2) will now be described with reference to FIG. 10A. In this second set, the EPMT control software 110 (FIG. 2) includes at least the following program code (or logic): program code 201 for monitoring EPC associated with locomotion of the EPMT 12; program code 202 for monitoring travel data relating to the EPMT 12; program code 203 for engaging in a communication session with the H-CS 16 based upon the EPC monitoring; program code 204 for requesting assistance of the BRS 14 during the communication session; and program code 205' for receiving location data relating to one or more SBRSs 14 during the communication session so that the EPMT 12 can visit an SBRS 14 and have remediated the battery 34 associated with the EPMT 12. The H-CS 16 monitors the locations 162 of BRSs 14 in BRS database 40*c* (FIG. 9). In preferred embodiments, the H-CS control software 126 (FIG. 4) is designed with program code that accesses the BRS database 40*c* having data pertaining to one or more SBRSs 14 and identifies one or more SBRSs 14 that are with a predefined proximity of the EPMT 12 that is requesting battery remediation.

In some embodiments, the EPMT control software 110 is designed with program code that causes the locations of the one or more SBRSs 14 to be displayed on a map that is rendered on EPMT display 108 (FIG. 2) with the assistance of the GUI 106 and map data 39. When more than one SBRS 14 is displayed, the EPMT party can select which SBRS 14 to visit.

In some embodiments, other BRS information is communicated by the H-CS 16 to the EPMT-CS 30, for example but not limited to, any data in the BRS database 40*c*, such as SBRS availability data 164 (a time or time period when available, unavailable or available, etc.), SBRS verification data 163, SBRS contact data 168, etc. Furthermore, any of the foregoing data can be displayed on the EPMT display 108.

The control software 110 may be designed with program code that will, during the communication session, cause one or more of the following to be communicated from the EPMT-CS 110 to the H-CS 16: a type of vehicle, a license plate number, a VIN, driver license information, a location of power port, an amount of recharge, a type of battery, whether a battery is stationary or removable, a type of connection port, a number of previous recharges, a condition of battery and/or battery cells, a number of batteries, a speed of battery remediation, a list of one or more acceptable specific types of BRSs, billing information, credit card information, bank account charge information, a length of authorized recharge, control port information, power port information, a maximum monetary charge limit, a minimum acceptable recharge amount or minimum acceptable time that is available from the BRS, etc.

The EPMT control software 110 may be further designed with program code that requests an SBRS 14 that results in a least expensive cost during the communication session. The H-CS 16 may maintain price data 171 pertaining to various SBRSs 14 in BRS database 40*c* (FIG. 1A). In this embodiment, the BRS control software 120 (FIG. 3) may be designed to access the price data 171 in the BRS database 40*c*, select the least expensive SBRS 14, and then communicate the location of the selected SBRS 14 along with the SBRS ID to the EPMT-CS 30. In another embodiment, the BRS control software 120 may be designed to communicate with a plurality of SBRSs 14 in order to obtain quotes, select the least expensive SBRS 14, and then communicate the location of the selected BRS 14 to the EPMT-CS 30.

The EPMT control software may be further designed with program code that requests an SBRS 14 that is closest, i.e., in closer proximity to the EPMT 12 as compared to one or more other SBRSs 14. A party associated with the EPMT 12 can preset this in the EPMT user preference database 115.

The EPMT control software 110 may be designed with program code that provides a user interface that enables a party to input verification information that is communicated to the H-CS 16 for verifying that the assistance request is from an authorized source or that the EPMT 12 has visited the correct SBRS 14. This verification information is communicated by the H-CS 16 to the SBRS 14 that will be visited by the EPMT 12. A party associated with the SBRS 14 can present this verification information to the EPMT party or input such information into EPMT-CS 30 of the EPMT 12. The verification information could be any of the following (a nonexhaustive list): a code, a password, etc.

The EPMT control software 110 may be further designed to engage in a communication session with one or more PCDs 39 (FIG. 1B) associated with a party when battery remediation is completed, or alternatively, a predefined time period before battery remediation is completed. The battery monitor 32 (FIG. 1A-1C) can be used to determine if the battery 34 has a full charge.

The user can predefine user preferences in EPMT user preferences database 115 to control, for example but not limited to: whether or not one or more PCDs 39 is contacted, the telephone number associated with a PCD 39, the predefined time period before completion of battery recharging, etc. The EPMT control software 110 accesses these user preferences in user preferences database 115 and operates accordingly.

The EPMT control software 110 may be further designed to initiate a communication with a PCD 39 associated with a party when the BRS-CS 50 has communicated with the EPMT-CS 30. This feature would be useful when a party leaves the EPMT 12 at an unattended SBRS 14, so that the user knows that battery remediation is underway.

The EPMT control software 110 may be designed to generate a user interface that enables a party to indicate a desire to receive a notification communication when the SBRS 14 has completed battery remediation and to predefine a communication method for the notification communication. These items can be preset in the EPMT user preferences database 115 or in the EPMT database 40b (in the H-CS 16).

A VNS having a GPS RX 36 and user interface screen may be designed to implement the functionality and operation of the EPMT-CS 30.

The BRS 14 may be additionally equipped with a fuel tank for transporting fuel 58 (FIGS. 1A-1C). In the case of a hybrid EPMT 12, wherein the EPMT 12 consumes both fuel and electricity, the EPMT may be designed to monitor fuel capacity associated with the EPMT 12 and to communicate fuel capacity information during the communication session with the H-CS 16 and/or the BRS-CS 14, whichever is applicable.

Verification information may be communicated from the remote computer system (H-CS 16 or BRS-CS 50) to the EPMT-CS 30 that enables a party associated with the EPMT 12 to verify that an SBRS 14 is the correct one. The verification information may be anything, including but not limited to, a selected or predefined code, a link to a website that provides work order information, an image of the SBRS 14, a video of the SBRS 14, etc.

The remote computer system (H-CS 16 or BRS-CS 50) that is contacted by the EPMT 12 may be designed to enable a party to cancel, confirm, or modify an order in, for example, a subsequent communication session.

The EPMT software 110 may be further designed with program code that receives advertisement information associated with a business (e.g., a restaurant) associated having a BRS 14 from the remote computer system and causes the advertisement information to be displayed on a display 108 associated with the EPMT 12 along with an indication that a SBRS 14 resides at or near the business. This type of advertising could be powerful, as it enables an EPMT driver to acquire battery remediation, such as recharging, while at a business. As an example, the advertisement information can be stored in advertisement information database 40d of H-CS 16 and communicated by the H-CS 16 to the EPMT-CS 30 during the communication session. In some embodiments, EPMT-CS 30 is implemented as part of a VNS and the SBRSs 14 are displayed on a navigation screen on display 108 along with the restaurant information.

3. Third Set of Embodiments

Figure 11:
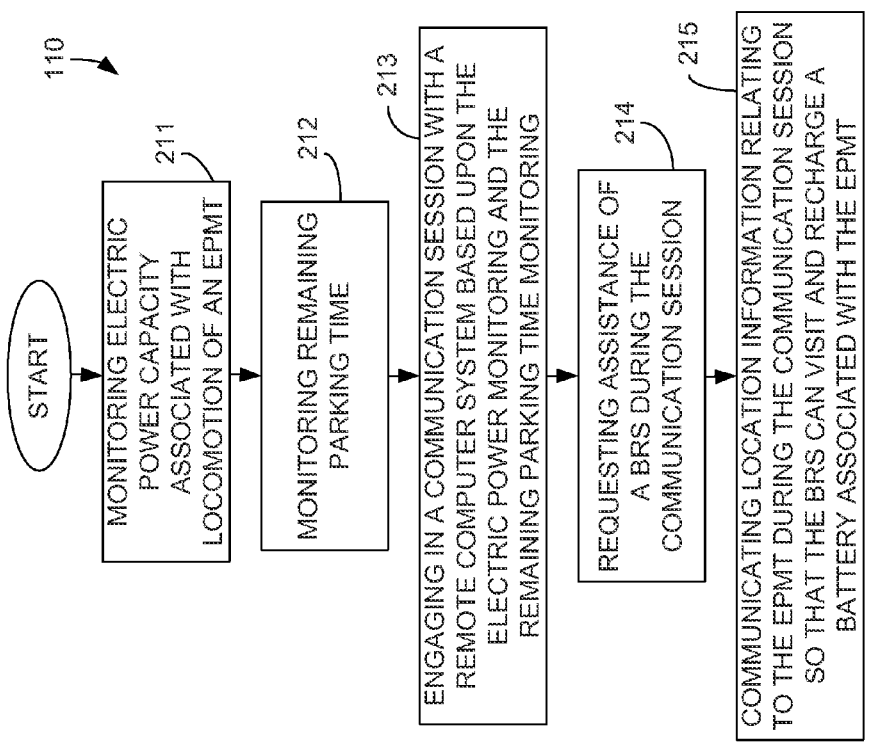
FIG. 11 is a flow chart of a third set of embodiments of EPMT control software of FIG. 2 associated with the EPMT-CS.

A third set of embodiments of the EPMT control software 110 (FIG. 2) will now be described with reference to FIG. 11. In this third set, the EPMT control software 110 (FIG. 2) includes at least the following program code (or logic): program code 211 for monitoring EPC associated with locomotion of the EPMT 12; program code 212 for monitoring remaining paid parking time; program code 213 for engaging in a communication session with a remote computer system (for example, the H-CS 16, BRS-CS 50, and/or PL-CS 76) based upon the EPC monitoring and the remaining paid parking time monitoring; program code 214 for requesting assistance of a BRS 14 during the communication session; program code 215 for communicating location data relating to the EPMT 12 during the communication session so that the BRS 14 can visit and remediate one or more batteries associated with the EPMT 12.

In some embodiments, the EPMT control software 110 may be designed to enable a user to predefine, for example, by input or selection, user preferences that are used to determine if or when the EPMT-CS 30 engages in the communication session with the remote computer system. The user preferences can be stored in the user preferences database 115 (FIG. 2). As an example, a user preference might be specified by the user as follows: when EPC is below fifty percent (50%) and the remaining paid parking time is greater than 3 hours, then engage in a communication session with the BRS (because there would be sufficient time for a BRS to be dispatched and to remediate a battery). Numerous other examples are possible.

The user preferences can be stored in the user preferences database 115 (FIG. 2) and accessed by the EPMT control software 110. In one example, among others, the GUI 106 (FIG. 2) drives one or more appropriate screens to the user via display 108 and receives one or more inputs from the user via I/O devices 108 that predefine the user preferences.

In some embodiments, the EPMT control software 110 receives or derives the location data from information communicated from a remote PL-CS 76 (FIG. 1C) to the EPMT-CS 30 of the EPMT 12.

In some embodiments, the EPMT control software 110 receives or derives the remaining parking time from information communicated from the remote PL-CS 76 (FIG. 1C) to the EPMT-CS 30 of the EPMT 12.

In some embodiments, the EPMT control software 110 may be designed to cause payment of parking time by communicating with the PL-CS 76 (FIG. 1C) and giving authorization to the PL-CS 76 to debit an account. In some of these embodiments, the user may predefine a user preference in user preferences database 115 that enables/disables this function to happen automatically, that causes the EPMT-CS 30 to request a confirmation (of a desire to make payment, of an amount, etc.) before any payment is made, etc.

5. Fourth Set of Embodiments

Figure 12:
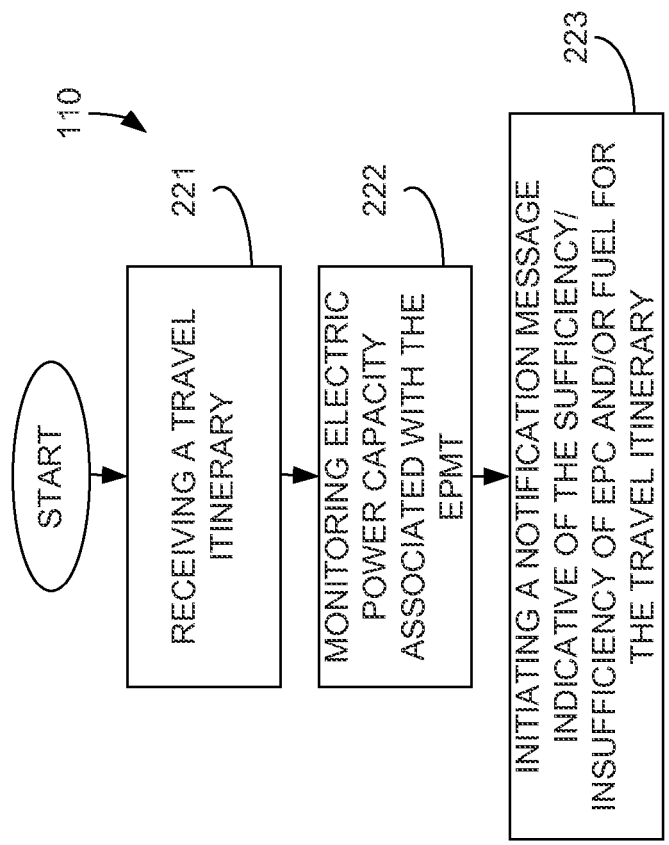
FIG. 12 is a flow chart of a fourth set of embodiments of EPMT control software of FIG. 2 associated with the EPMT-CS.

A fourth set of embodiments of the EPMT control software 110 (FIG. 2) will now be described with reference to FIG. 12. In this fourth set, the EPMT control software 110 (FIG. 2) includes at least the following program code (or logic): program code 221 for receiving a travel itinerary; program code 222 for monitoring EPC associated with the EPMT 12 via battery monitor 32; and program code 223 for initiating a notification message indicative of the sufficiency of EPC for the travel itinerary via display 108 and/or other I/O devices 112. The message may indicate one or more of the following, as examples: that the EPC is insufficient, that the EPC is sufficient, that the EPC is questionable, a percentage of EPC that is available or expended, etc.

First, note that this method can be implemented in the EPMT-CS 30, in the H-CS 16, or in some other remote computer system, provided that the remote computer system is provided with the travel itinerary and EPC information. The travel itinerary can be input by the user via an I/O device 112. In some designs, the GUI 106 generates a graphical user interface screen that enables a party to input the travel itinerary. In yet other designs, the EPMT-CS 30 is part of a commercially available VNS, which would already have systems for enabling the user to input a destination and for determining a travel itinerary based upon the current location of the EPMT 12 (as determined from the GPS data 39) and the input destination location.

The EPMT control software 110 (FIG. 2) of the EPMT-CS 30 may be further designed with program code to: receive GPS data 39 from GPS RX 36 associated with the EPMT 12, the GPS data indicative of a location of the GPS RX 36; analyze stored map data 38; and determine whether to initiate the notification message based upon the GPS data, the map data 38, and the EPC.

The EPMT control software 110 of the EPMT-CS 30 (FIG. 2) may be designed so that the notification message may be any one or more of the following, as nonlimiting examples: a visible message communicated to a party via an I/O device 112 or display 108, an audible message communicated to the party via an I/O device 112, a notification communication to a PCD via TX/RX 18, a light signal via an I/O device 112, a voice via an I/O device 112, a notification communication to a BRS 14 via TX/RX 62 and network 64, a notification communication to a remote computer system (e.g., H-CS 16 via TX/RX 18 and network 20) that engages in a communication session with a BRS 14 (e.g., via TX/RX 24 and network 26), a screen that is driven to an on-board display 108 by GUI 106, etc.

In some embodiments, the EPMT control software 110 may be designed with program code to advise the user of the location of one or more MBRSs 14 and/or stationary battery remediation stations (SBRSs) 14. This can been done via voice with commercially available voice generation software and a speaker (as an I/O device 112). This can also be accomplished by displaying the one or more MBRSs 14 and/or SBRSs 14 on a map. In some of these embodiments, the GUI 106 retrieves map data 38 and GPS data 39, renders a map showing the current location of the EPMT 12 as well as the locations of the MBRSs 14 and/or SBRSs 14, and causes the map to be displayed on display 108. When implemented as part of a VNS in the EPMT 12, other navigation features can be added, including for example but not limited to, an ability to have the user input a selection of the desired MBRS 14 or SBRS 14 and to have the VNS generate a travel itinerary for the EPMT 12 to travel to the desired MBRS 14 or SBRS 14.

The EPMT control software 110 of the EPMT-CS 30 may be designed with program code to generate a user interface that enables a party to select one of the MBRSs 14 or SBRSs 14 and to communicate a recharge request to the BRS-CS 50 that is associated with the selected MBRS 14 or SBRS 14. This can be accomplished via TXX 62, network 64, and TX/RX 66, as shown in FIG. 1B.

The EPMT system may be designed with program code to provide information indicating a level of EPC needed to travel to the MBRSs 14 and/or SBRSs 14. This information can be computed and displayed on a map in association with the MBRSs 14 and/or SBRSs 14 so as to assist a user in determining which to select for battery remediation. This information can also be computed and communicated to the user after a selection has already been made. As an example, the EPMT control software 110 can be designed to determine a level of power needed to travel to an MBRS 14 or an SBRS 14 by determining the distance to be traveled and multiplying the distance by the average ratio of EPC/distance associated with the EMPT 12. The average ratio of EPC/distance can be tracked and easily generated by monitoring EPC and distances traveled over time.

The EPMT control software 110 may be designed with program code to provide a notification message indicative of the sufficiency of currently available EPC to travel to each of the MBRSs 14 and/or SBRSs 14. For example, in the case where the MBRSs 14 and/or SBRSs 14 are displayed on a map via display 108, the EPMT control software 110 can be designed to compute the EPC needed to travel to each, to compare these EPC values with the currently available EPC associated with the EPMT 12 to determine which MBRSs 14 and/or SBRSs 14 can be traveled to safety without running out of EPC, to highlight those MBRSs 14 and/or SBRSs 14 that can be reached safely, and to highlight in a different manner those MBRSs 14 and/or SBRSs 14 that cannot be reached safely. The highlighting could be implemented, for example, by colors, i.e., showing the former in green and the latter in red.

The EPMT control software 110 may be designed with program code to provide a user interface that enables a party to identify a user preference 150 indicating a type of battery remediation station (BRS) to view on a screen-rendered map, so that the party can make a more educated decision on which BRS to choose. For example, the type may be any one or more of the following: MBRS 14, SBRS 14, a BRS 14 having fuel in addition to battery remediation capabilities, a BRS 14 having replacement batteries, a BRS 14 that is capable of repairing a battery 34, a BRS 14 that monetarily charges less than a predefined amount or rate for battery remediation service, a BRS 14 with a specific type of charging equipment or charging port, all BRSs 14 within a predefined proximity of the EPMT 12, etc.

The travel itinerary may include or be defined by, as an example, a start location, a stop location, and a path to be traveled therebetween. In this example, the EPMT control software 110 may be designed with program code to determine a travel distance based upon the travel itinerary; determine a rate at which EPC is consumed by the EPMT 12; and determine whether or not to initiate the notification message based upon the distance, the rate, and the EPC.

In some embodiments, the EPMT-CS 30 is implemented remote from the EPMT 12 while the battery monitor 32 and the transducers 33 are situated on the EPMT 12 and a communication device is provided on the EPMT 12 for communicating sensor signals to a TX/RX associated with the remote EPMT-CS 30.

The EPMT control software 110 may be designed with program code to periodically measure EPC to create a list of periodic measurements and determine whether or not to initiate a notification message based upon the periodic measurements and one or more known battery characteristics, including but not limited to, battery type, number of battery cells, battery age, whether an unused or adequate reserve battery 34 exists, manufacturer, etc. Many different algorithms 113 can be employed to make the decision on whether or not the notification message should be initiated. For example, one algorithm might be as follows: when the battery 34 is over 4 years old and when the rate of change of voltage is greater than X and the distance to be traveled is greater than Y, then initiate the notification message. In some designs, the user can predefine X and Y as user preferences in EPMT user preferences database 115 (FIG. 2). As another example of another algorithm 113, the algorithm 113 might be as follows: when EPC is insufficient for the travel itinerary and the EPMT 12 has an adequate reserve battery 34, then do not initiate the notification message.

The EPMT control software 110 may be designed with program code to determine or access an identification (ID) associated with the EPMT 12 and/or battery 34 and access the non-measured but known battery characteristics in a database (local or remote) with the identification. The database can be stored in the EPMT-CS memory 102, in the H-CS memory 102, or in another remote computer system that can be accessed. As example, the EPMT ID and/or battery ID may be input into the EPMT-CS 30 by the user and stored in EPMT-CS memory 102. As another example, the battery ID may be determined by reading an electronic radio frequency identification (RFID) tag, bar code, quick response (QR) code, etc., associated with the battery 34 with a corresponding reader associated with the EPMT-CS 30.

The EPMT control software 110 may be designed with program code that measures EPC samples (or levels) over time, mathematically extrapolates a future trend based upon the samples; and determines whether or not to initiate the notification message based upon the future trend and a predefined minimum threshold. Moreover, the predefined minimum threshold may be preset or may be predefined by the user in user preferences database 115.

The EPMT control software 110 may be designed with program code that generates a user interface that enables a party to select whether or not a notification communication will be initiated to a PCD 39 (FIG. 1B) via TX/RX 35 and network 37 when recharging is complete or when the battery 34 has achieved a predefined threshold of EPC. The battery monitor 52 can measure when battery charging is complete or when the battery has achieved a predefined threshold of EPC. The notification communication can involve communication of a voice or text message, if desired, that indicates, one or more of the following: battery remediation is complete, battery remediation status, recharge progress, length of remaining time needed, an indication there is enough EPC to reach destination on the travel itinerary, etc.

The EPMT control software 110 may be designed with program code that generates a user interface enabling the party to select a communication method for contacting the party. The communication method may include a designation of a specific communication device, an email address, a telephone number to call, etc.

The EPMT control software 110 may be further designed with program code to detect that a BRS, such as the MBRS 14 or an SBRS 14, is physically connected to the EPMT 12 and prevent the EPMT 12 from moving while the BRS is physically connected. This arrangement will prevent the EPMT driver from driving the EPMT 12 away while it is connected to the BRS, thereby preventing damage to the EPMT 12 and/or the BRS. As an example, the EPMT 12 may be equipped with positive and negative battery terminal switches that are actuated prior to recharging the battery to electrically isolate the battery from the remainder of the EPMT electrical system so that the EPMT electrical system is in no way harmed by the recharging process. There are commercially available switches that can be employed to send a suitable control signal to the EPMT-CS 30 that would enable the EPMT control software 110 to detect when recharging is in process, and therefore when the BRS is physically connected to the battery 34 of the EPMT 12. As another example, the a switch may be installed on the EPMT 12 that is to be actuated by the BRS operator when recharging is started and is completed to send an appropriate signal to the EPMT control software 110.

The EPMT control software 110 may be further designed with program code to detect that a BRS is physically connected to the EPMT 12 and to provide a warning message while the BRS is physically connected. This could help prevent the EPMT driver from trying to drive the EPMT 12 away while it is connected to the BRS, thereby preventing damage to the EPMT 12 and/or the BRS. As an example, the warning message can be a screen driven to display 108 by GUI 106 (FIG. 2). As another example, the warning message can be a periodic audible message that is output from an I/O device 112 while there is physical connection.

The EPMT control software 110 may be further designed with program code to monitor fuel capacity associated with the EPMT 12 and initiate a notification message indicative of the sufficiency of fuel capacity for the travel itinerary. The EPMT 12 may be a mobile thing that consumes both electricity and fuel, such as but not limited to, a hybrid motor vehicle. Using a suitable algorithm 113, the control software 110 can determine whether or not the EPMT 12 has sufficient EPC, sufficient fuel, or a sufficient amount of both EPC and fuel for the travel itinerary, and can base the decision on whether or not to initiate the notification message one or more of these determinations. Historical data pertaining to distances traveled by the EPMT and EPC/fuel consumed over those distances can be stored in the EPMT-CS memory 102. An example of one algorithm 113 performs the following: computes an average amount of EPC consumed per unit of distance, computes an average amount of fuel consumed per unit of distance, multiplies the foregoing average amounts by the distance to be traveled to generate a requisite EPC and a requisite fuel for the travel itinerary, measures the EPC with battery monitor 32 and measures the fuel 31 with fuel monitor 29, and compares the requisite EPC and the requisite fuel with the measured EPC and measured fuel, respectively, in order to determine whether or not a notification message is initiated. The notification message may indicate whether EPC, fuel, or both are sufficient or insufficient for the travel itinerary.

6. Fifth Set of Embodiments

A fifth set of embodiments of the EPMT control software 110 (FIG. 2) will now be described with reference to FIG. 13. The fifth set of embodiments essentially disable locomotion of an EPMT 12 while the EPMT 12 is connected to a BRS for recharging the battery 34 of the EPMT 12 in order to prevent damage or harm to the EPMT 12 and the BRS in a case when the EPMT driver attempts to depart from the recharging scene while the power ports are still physically connected. In this fourth set, the EPMT control software 110 (FIG. 2) includes at least the following program code (or logic): program code 231 for preventing movement of the EPMT 12 when a BRS is connected and program code 232 for permitting movement of the EPMT 12 when the BRS is disconnected.

The EPMT control software 110 can detect connection and disconnection of the BRS and EPMT 12 in a number of ways. First, a recharging power port associated with the EPMT 12 may be designed with a door, and an electrical switch is associated with the door so that when the door is opened and closed, the switch is actuated. In this embodiment, the switch is an I/O device 112 (FIG. 2), and the EPMT control software 110 monitors the switch and determines connection and disconnection based upon the status of the switch.

In another embodiment, the EPMT control software 110 can detect connection and disconnection of the BRS and EPMT 12 via a manual switch. The manual switch is made available on the EPMT 12 that can be accessed and actuated by a party associated with the BRS 14. The BRS party actuates the switch just before BRS recharging equipment is connected to the EPMT 12 and actuates the switch when the recharging equipment has been disengaged from the EPMT 12. The manual switch is monitored with the EPMT control software 110 as an I/O device 112.

In another embodiment, the EPMT control software 110 can detect connection and disconnection of the BRS and EPMT 12 via a communication between the EPMT-CS 30 and the BRS-CS 50. In some embodiments, the EPMT 12 is equipped with a control port that enables the BRS-CS 50 to connect to for wired communications between the EPMT-CS 30 and the BRS-CS 50. The EPMT-CS 30 can monitor when the BRS-CS 50 is connected and disconnected to this control port to thereby detect when recharging equipment is engaged and disengaged between the EPMT 12 and the BRS 14.

In another embodiment, the EPMT control software 110 can detect connection and disconnection of the BRS and EPMT 12 via wireless communications between the EPMT-CS 30 and the BRS-CS 50. The wireless communications take place via TX/RX 62, network 64, and TX/RX 66 (FIG. 1B). The BRS control software 120 (FIG. 3) monitors recharging and advises the EPMT control software 110 when the recharging commences and when the recharging terminates. The EPMT control software 110 detects connection and disconnection based upon the foregoing information.

Permitting and preventing movement of the EPMT 12 can be implemented by program code 231 and 232, respectively, of FIG. 13 in a number of ways. A switch can be placed somewhere in the locomotion power plant associated with the EPMT 12 to alternatively permit and prevent power being provided to one or more electric motors that move the EPMT 12. The switch can be situated near the battery 34 or elsewhere. The switch is controlled by the EPMT control software 110, as an I/O device 112.

In other embodiments, the EPMT-CS 30 can be electrically interfaced with the ignition switch of the EPMT 12, so that the ignition switch is essentially an I/O device 112. In these embodiments, the program code 231, 232 is designed to prevent and permit operation or functioning of the EPMT ignition switch.

7. Sixth Set of Embodiments

A sixth set of embodiments of the EPMT control software 110 (FIG. 2) will now be described with reference to FIG. 14. The sixth set of embodiments provide a warning to a party associated with the EPMT 12 while the EPMT 12 is physically connected to a BRS in order to prevent damage or harm to the EPMT 12 and the BRS. In this fifth set, the EPMT control software 110 (FIG. 2) includes at least the following program code (or logic): program code 241 for providing a warning signal to an EPMT passenger when a BRS is connected to the EPMT 12; and withdrawing the warning signal when the BRS is disconnected from the EPMT 12. Connection and disconnected can be detected by the EPMT control software 110 as described in the previous section of this disclosure. The warning signal can be provided via the display 108 and/or some other I/O device 112. The GUI 106 may be employed to render appropriate screens on display 108, if desired.

8. Seventh Set of Embodiments

An eighth set of embodiments of the EPMT control software 110 (FIG. 2) will now be described with reference to FIG. 15. In the eighth set of embodiments, the EPMT control software 110 causes physical disconnection of the power ports associated with the EPMT 12 and BRS after recharging, so as to protect the EPMT 12 and the BRS 14 from damage or harm that might be caused by the driver of the EPMT 12 attempting to depart the recharging scene while the power ports are still physically connected. In this sixth set, the EPMT control software 110 (FIG. 2) includes at least the following program code (or logic): program code 251 for detecting connection of a BRS and program code 252 for causing a power connector associated with the BRS to be physically disengaged from a power connector associated with the EPMT 12 when battery recharging is complete.

Figure 15A:
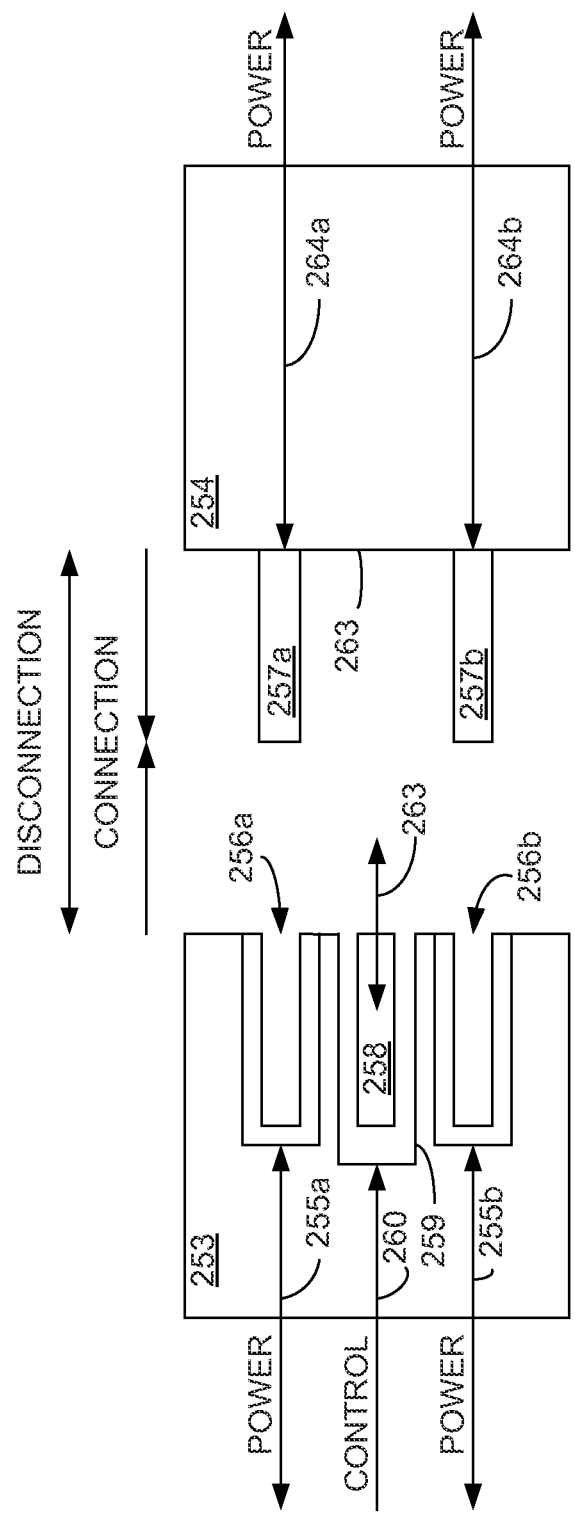
FIG. 15A is a diagram of an EPMT power connector that connects and disconnects with a BRS power connector for recharging an EPMT battery with a BRS recharger.

Embodiments for detecting when the power ports, or power connectors, of the EPMT 12 and the BRS 14 are connected and disconnected have been previously described in this disclosure. Furthermore, there are many ways in which the power connectors can be physically disengaged. FIG. 15A illustrates one embodiment, among other possible embodiments.

As shown in FIG. 15A, an EPMT power connector 253 associated with the EPMT 12 is designed to engage and disengage with a BRS power connector 254 associated with the BRS 14 for the purpose of recharging the battery 34 of the EPMT 12. The EPMT power connector 253*a* has wired connections 255*a*, 255*b* that are connected, directly or indirectly, to the terminals of battery 34. The EPMT power connector 253 has metalized female slots 256*a*, 256*b* for receiving elongated metallized male prongs 257*a*, 257*b*, respectively, when the connectors 253, 254 are engaged. In the preferred embodiments, the male prongs 257*a*, 257*b* and the female slots 256*a*, 256*b* are cylindrical or spade-like in shape. The prongs 257*a*, 257*b* of the MRS connector 254 are connected to a DC power source via power connections 264*a*, 264*b*, for recharging the battery 34.

An elongated metal plunger 258 is driven by a solenoid 259 that is controlled by a solenoid controller via a wired connection 260 (which is ultimately controlled by the EPMT control software 110). The solenoid controller is an I/O device 112 (FIG. 2) associated with the EPMT-CS 30. The solenoid 259 is designed to move back and forth as indicated by arrow 263. When the connectors 253, 254 are electrically connected and physically engaged, the plunger is situated as shown in FIG. 15A. When the EPMT control software 110 wishes to disengage the connectors 253, 254, then an appropriate control signal is communicated to the solenoid 259, which forces the plunger 258 outwardly against surface 263 of the BRS connector 254. This action causes the two connectors 253, 254 to separate from one another.

9. Eighth Set of Embodiments

A eighth set of embodiments of the EPMT control software 110 (FIG. 2) will now be described with reference to FIG. 16. In the eighth set of embodiments, the EPMT control software 110 causes physical disconnection of the power ports associated with the EPMT 12 and BRS after recharging, so as to protect the EPMT 12 and the BRS 14 from damage or harm that might be caused by the driver of the EPMT 12 attempting to depart the recharging scene while the power ports are still physically connected. In this seventh set, the EPMT control software 110 (FIG. 2) includes at least the following program code (or logic): program code 261 for detecting connection of a BRS; and program code 262 for causing a power connector associated with the BRS to be physically disengaged from a power connector associated with the EPMT 12 when a party provides an input that indicates a desire to disengage the power connection.

9. Ninth Set of Embodiments

Figure 17:
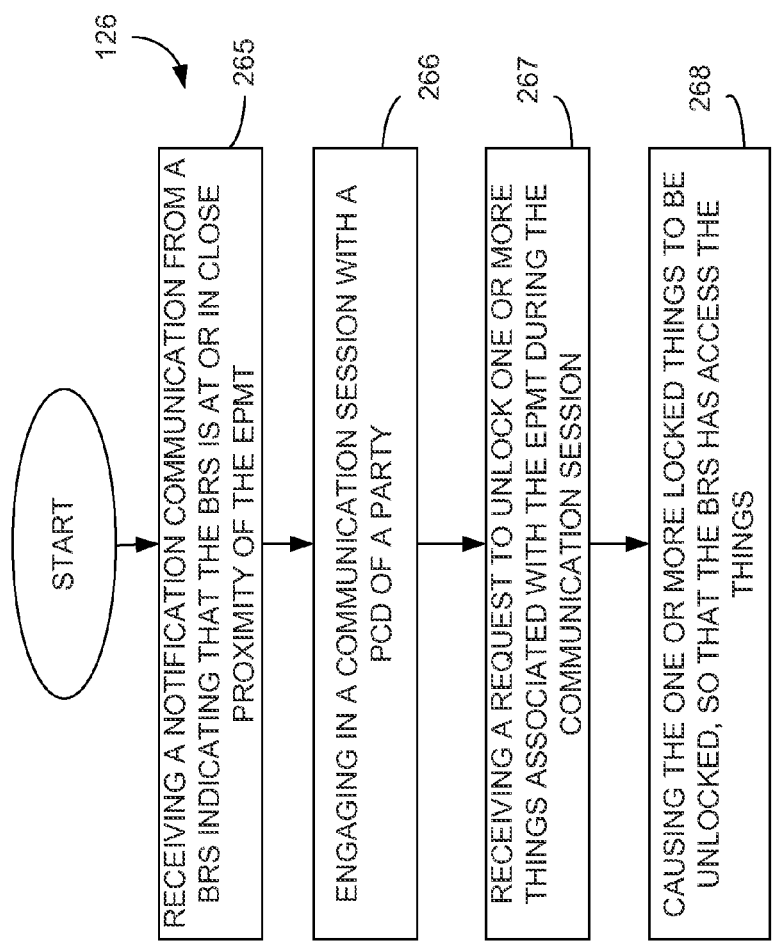
FIG. 17 is a flow chart of a ninth set of embodiments of EPMT control software of FIG. 2 associated with the EPMT-CS.

A ninth set of embodiments of the EPMT control software 110 (FIG. 2) will now be described with reference to FIG. 17. The ninth set of embodiments enables an EPMT party to leave the EPMT 12 without having a BRS 14 present or active. Some examples of when this would be desirable are as follows: when an MBRS 14 has been dispatched but has not yet arrived at the EPMT 12, when the EPMT 12 is at a location of an SBRS 12 but SBRS personnel are not currently available, or when the EPMT 12 is at a location of an SBRS 14 but its doors are not currently open for business.

In this ninth set of embodiments, the EPMT control software 110 (FIG. 2) includes at least the following program code (or logic): program code 265 for receiving a notification communication from a BRS 14 indicating that the BRS 14 is at or in close proximity of the EPMT 12 that has made a remediation request; program code 266 for engaging in a communication session with a PCD associated with a party; program code 267 for receiving a request to unlock one or more locked things associated with the EPMT 12 during the communication session; and program code 268 for causing the one or more locked things to be unlocked, so that the BRS 14 has access to the things.

The program code 265 can receive the notification communication from a BRS 14 via BRS-CS 50 communicating with EPMT-CS 30 via TX/RX 66, network 64, and TX/RX 62 (FIG. 1B). The notification communicating can be accompanied by verification data, which has previously been described, so that the EPMT-CS 30 can verify that the BRS 14 is the correct authorized BRS 14.

The program code 266 is designed to engage in a communication session with a PCD 42 associated with an EPMT related party via TX/RX 68 and network 70 (FIG. 1B). In some embodiments where the BRS 14 is dispatched by the H-CS 16, the contact data for the PCD 42 can be provided by the H-CS 16 to the BRS 14. The H-CS 16 accesses such EPMT contact data 145 in the EPMT database 16. In other embodiments where the BRS 14 receives a remediation request from the EPMT-CS 30 or a PCD 42 associated with an EPMT party, the contact data for the PCD 42 can be provided to the BRS-CS 50 when the remediation request is made. In yet other embodiments, the EPMT 12 or EPMT party may have an account with the BRS business entity, and the BRS-CS 50 can have the contact data for the PCD 42 stored, such as in user preferences database 122 (FIG. 3).

The program code 267 receives the request to unlock the one or more EPMT locked things from the PCD 42 via network 70 and TX/RX 68 (FIG. 1B). The request can be generated at the PCD 42 by any suitable communication method, for example, by keypad or keyboard entry of text, numbers, or letters, or by voice commands. In the former case, key tone decoder would be employed by the EPMT-CS 30, and in the latter case, a voice recognition system would be employed by the EPMT-CS 30, in order to recognize the signals being communicated by the PCD 42 to the EPMT-CS 50. Furthermore, the things that are locked and unlocked can be any of a number of possibilities, including but not limited to: a door associated with access to the interior of the EPMT 12, a door associated with accessing one or more batteries 34, a door to a compartment that houses one or more batteries 34, an electrically controlled mechanical mechanism for selectively preventing and permitting one or more batteries 34 to be removed and replaced from the EPMT 12, a door that prevents and permits access to a gasoline fill pipe, the ignition switch, the steering column, etc.

The program code 268 for causing the one or more of the locked things to be unlocked, so that the BRS 14 has access to the things, is designed to electrically interface with appropriate I/O devices 112 (FIG. 2) in order to accomplish the unlocking operation. For example, solenoid operated locking mechanisms can be associated with doors, etc., and operated by a solenoid controller (I/O device 112), which is in turn controlled by the program code 268 of the EPMT control software 110. As another example, an electrical switch can be connected to the ignition switch and actuated by an interface card (I/O device 112), which in turn is controlled by the program code 268 of the EPMT control software 110.

In some embodiments, the EPMT control software 110 can be designed with program code that receives, in addition to the unlock request, another request to disable an enabled alarm system associated with the EPMT 12 and that disables or turn off the alarm system in response to the additional request.

10. Tenth Set of Embodiments

Figure 18:
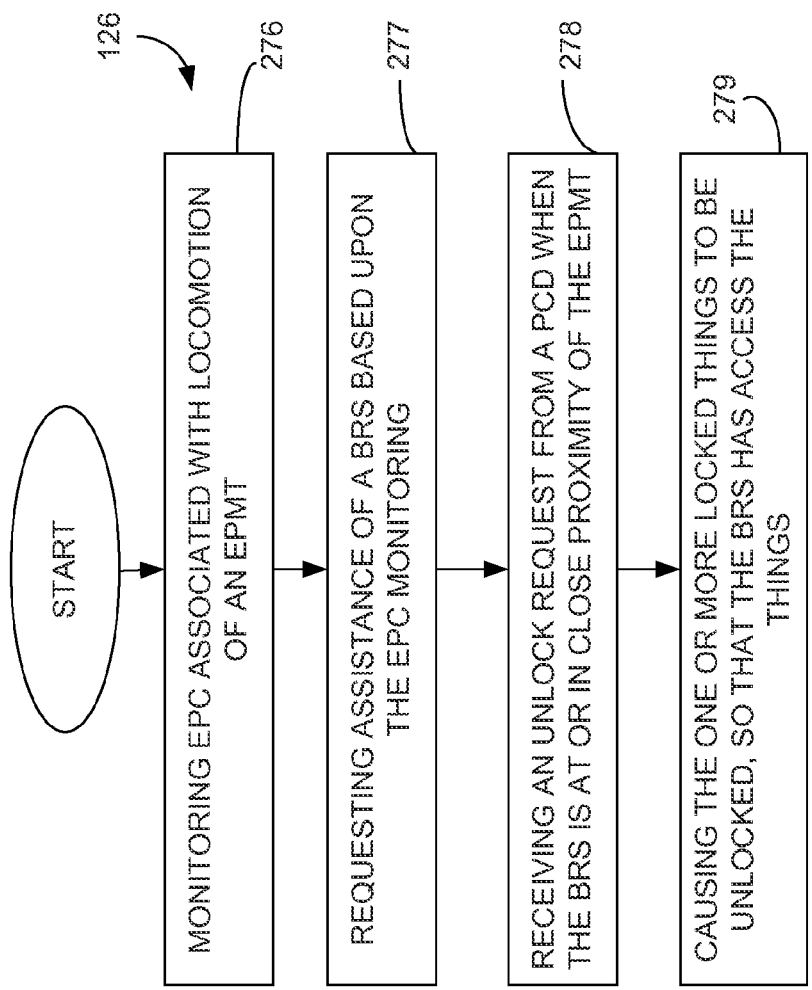
FIG. 18 is a flow chart of a tenth set of embodiments of EPMT control software of FIG. 2 associated with the EPMT-CS.

A tenth set of embodiments of the EPMT control software 110 (FIG. 2) will now be described with reference to FIG. 18. The tenth set of embodiments also enables an EPMT party to leave the EPMT 12 without having a BRS 14 present or active. In this tenth set of embodiments, the EPMT control software 110 (FIG. 2) includes at least the following program code (or logic): program code 276 for monitoring EPC associated with locomotion of an EPMT 12; program code 277 for requesting assistance of a BRS 14 based upon the EPC monitoring; program code 278 for receiving an unlock request from a PCD 42 when the BRS 14 is at or in close proximity of an EPMT 12; and program code 279 for causing the one or more locked things to be unlocked, so that the BRS 14 or a BRS party has access to the things.

J. Control Methodology and Software for Host Computer System (H-CS)

1. First Set of Embodiments

Figure 19:
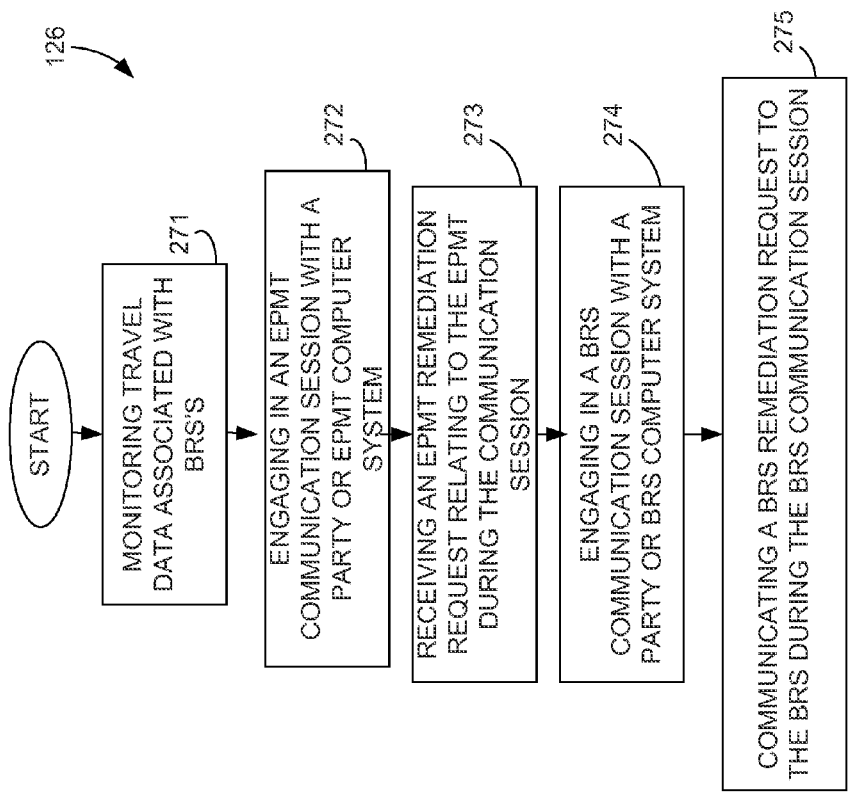
FIG. 19 is a flow chart of a first set of embodiments of BRS control software of FIG. 3 associated with the BRS-CS.

A first set of embodiments of the H-CS control software 126 (FIG. 4) will now be described with reference to FIG. 19. In this first set, the H-CS control software 120 (FIG. 4) includes at least the following program code (or logic): program code 271 for monitoring travel data associated with one or more BRSs 14; program code 272 for engaging in an EPMT communication session with a PCD of a party or the EPMT-CS 30 associated with the EPMT 12; program code 273 for receiving an EPMT battery remediation request relating to the EPMT 12 during the communication session; program code 274 for engaging in a BRS communication session with a PCD of a party or the BRS-CS 50 associated with the BRS 14; and program code 275 for communicating a BRS battery remediation request to the BRS 14 during the BRS communication session. In some embodiments, the H-CS control software 126 of the H-CS 16 is designed with program code to receive location data relating to the EPMT 12 during the communication session, and to communicate location particulars of the EPMT 12, equivalent to or derived from, the location data during the BRS communication session to a party associated with the BRS 14 via a PCD or, machine to machine, to the BRS-CS 50, so that the BRS 14 can find the EPMT 12. In other embodiments, the H-CS control software 126 is designed with program code that selects an acceptable battery remediation location and communicates this acceptable location to the EPMT 12 and the BRS 14.

The H-CS control software 126 of the H-CS 16 can be designed with program code to receive any of the following during the EPMT communication session, as a nonlimiting set of examples: a type of vehicle, a license plate number, a vehicle identification number (VIN), driver license information, a location of power port, an amount of recharge, a type of battery, whether a battery is stationary or removable, a type of connection port, a number of previous recharges, a condition of battery 34 and/or battery cells, a number of batteries 34, a speed of battery remediation, a list of one or more acceptable specific or types of BRSs 14, billing information, credit card information, bank account charge information, a length of authorized recharge, control port information, power port information, a maximum monetary charge limit, a minimum acceptable recharge amount or minimum acceptable time that is available from the BRS 14.

The H-CS control software 126 may be designed with program code to receive credit or debit card information from the user preferences database 115 (FIG. 2) of the EPMT-CS 30 or to access same in the EPMT database 40b (FIG. 8) of the H-CS 16 and to cause a debit to a credit or debit card account as payment for the recharge request or the battery remediation. As an example, a party associated with the EPMT 12 can preset a user preference in one of the foregoing databases 40b, 115 that indicates that when a battery remediation request is initiated, a particular credit card account should be charged for the dispatch of the BRS 14 or the battery remediation.

The H-CS control software 126 of the H-CS 16 may be designed with program code to communicate verification information to the party associated with the EPMT 12 via a party PCD or to the EPMT-CS 30 that enables the party or the EPMT-CS 30 to verify that the arriving BRS 14 is the correct authorized BRS 14. The verification information could be any of the following, as a nonexhaustive list of examples: a code, a password, an identification such as the name of the battery remediation requestor, a work order, a link to a computer system communicatively coupled to the Internet that provides information enabling verification, a vehicle identification number (VIN), an image of the BRS 14, a driver's license picture of a party associated with the BRS 14, an image of the dispatched BRS 14, a credit card or debit card number, etc. The verification information can be information that is communicated by the BRS party or BRS-CS 50 to the H-CS 16 and then to the EPMT party or the EPMT-CS 30. The verification information can also be information that is generated by the H-CS 16 itself.

The H-CS control software 126 of the H-CS 16 may be designed with program code to communicate verification information to a party associated with the BRS 14 via a PCD or to the BRS-CS 50 that enables the BRS party or the BRS-CS 50 to verify that the EPMT 12 that the arriving BRS 14 has encountered is the correct EMPT 12 that has requested battery remediation. In some embodiments, the verification information or a derivative thereof is communicated, machine to machine, by the BRS-CS 50 of the arriving BRS 14 to the EPMT-CS 30. The verification information can be communicated wirelessly (e.g., a Bluetooth connection, RF connection, etc.) or via a wired connection that is established between the computer systems 30, 50 once the BRS 14 is in close proximity to the EPMT 12. The verification information can be information that is communicated by the EPMT party or EPMT-CS 30 to the H-CS 16 and then to the BRS party or the BRS-CS 50. The verification information can be information that is generated by the H-CS 16 is then communicated by the H-CS 16 to both the EPMT 12 and the BRS 14. The verification information may include a work order number, a code, a VIN, a link to a computer system communicatively coupled to the Internet that provides information enabling verification, an image of the EPMT 12, a driver's license picture of a party associated with the EPMT 12, a credit card or debit card number, etc.

The H-CS control software 126 may be designed program code to receive BRS availability information from one or more BRSs 14 via TX/RX 28, network 26, and TX/RX 24; to store the BRS availability information or a derivative thereof in a BRS database 40c; to access the BRS database 40c, when appropriate, during or after the EPMT communication session; and to select the BRS 14 based at least in part upon the BRS availability information using a suitable algorithm 127. The availability information may be any of the following, as nonlimiting examples: whether or not a BRS 14 is available, when a BRS 14 is available, where a BRS 14 is available, etc. An example of a suitable algorithm 127 may be simply to select the BRS 14 that is currently available and is within an acceptable proximity of the EPMT 12.

Figure 4:
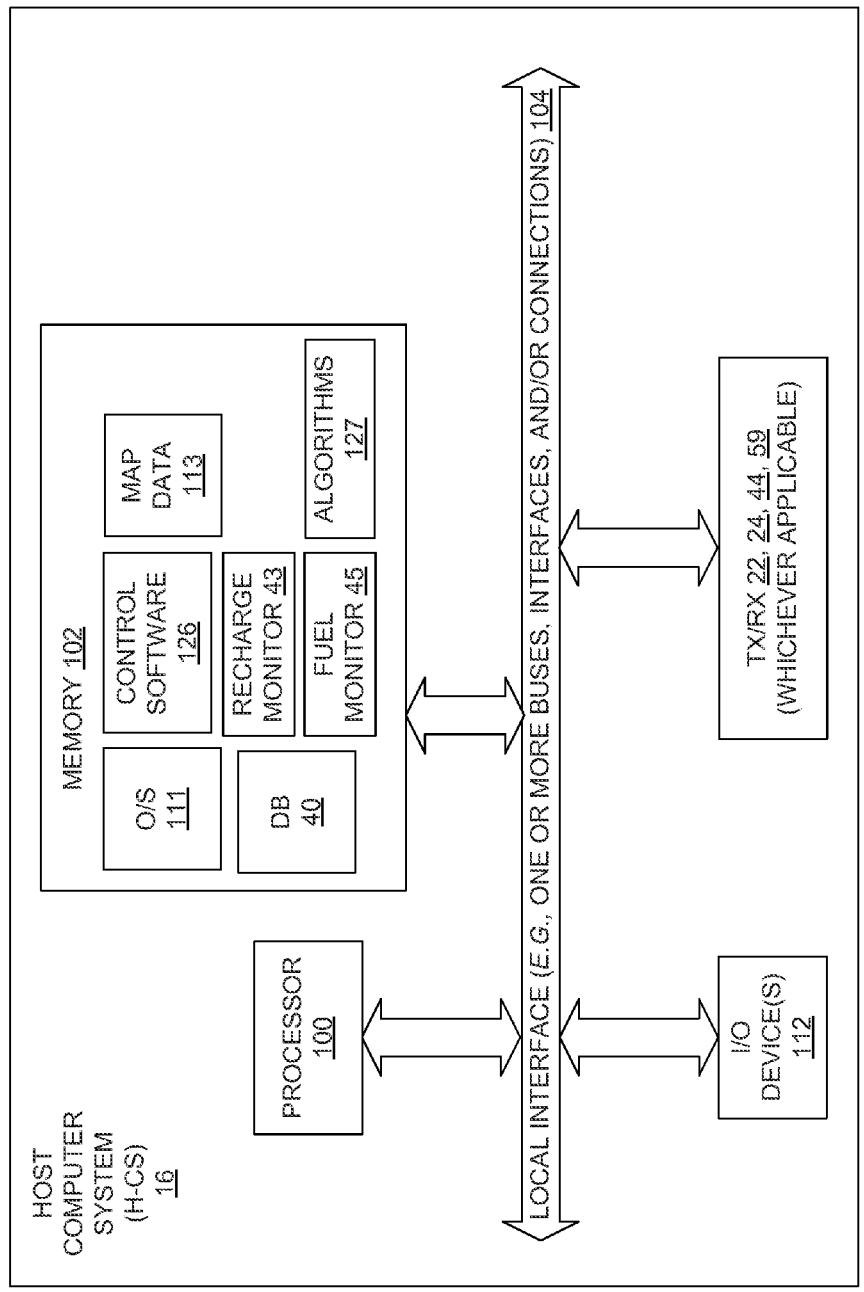
FIG. 4 is a block diagram of the host computer system (H-CS) of FIGS. 1A-1C.

The H-CS control software 126 may be designed with program code to receive travel or location data from one or more BRSs 14 via TX/RX 28, network 26, and TX/RX 24; store the data in the BRS database 40c; access the BRS database 40c during or after the EPMT communication session; and select an appropriate BRS 14 based at least in part upon the travel/location data with a suitable algorithm 127 (FIG. 4). As an example, the algorithm 127 may be simply to select the BRS 14 that is the closest in proximity to the EPMT 12. Another example would be to implement an algorithm 127 that selects the BRS 14 that is both available based upon the availability data and nearest in terms of proximity to the EPMT 12.

The H-CS control software 126 may be designed with program code to communicate control port and/or power port information associated with the EPMT 12 to a party associated with the BRS via a PCD or, machine to machine, to the BRS-CS 50, so that the BRS party or BRS-CS 50 can prepare for connection to these ports or can determine whether or not the MPRS 14 has the capability to perform battery remediation on the requesting EPMT 12. The control port and/or power port information can be stored in EPMT database 40b (FIG. 1A). The control port is an electrical interface enabling the BRS-CS 50 to communicate with the EPMT-CS 30. The power port is an electrical interface enabling the battery charger/tester 52 of the BRS 14 to electrical interface with the battery 34 of the EPMT 12. In some embodiments, the control port and/or power port information is input by the EPMT user into user preferences database 115 (FIG. 2) and then this data is communicated to the H-CS 16 and stored in EPMT database 40b (FIG. 1A).

The H-CS control software 126 may be designed with program code to communicate with a government computer system that communicates data relating to acceptable battery remediation practices. In some areas, governments might legislate acceptable battery remediation practices. For example, some governments might not permit repair of a battery 34, but only recharging or replacement. The H-CS control software 126 can be designed with program code to receive a battery remediation request from the EPMT control software 110, to determine what type of remediation is acceptable based upon where the EPMT 12 is located, and to dispatch a BRS that is appropriate based upon the acceptable battery remediation practices in that geographic region.

The H-CS control software 126 may be designed with program code to communicate one or more acceptable battery remediation locations in proximity of the EPMT 12 and the BRS 14. In some embodiments, the H-CS 16 stores acceptable battery remediation locations in database 40e (FIG. 1A), accesses these locations when a remediation request is received, selects one of the acceptable locations using a suitable algorithm 127, and communicates the selected location to both the EPMT-CS 30 and the BRS-CS 50, so that the EPMT 12 can meet the BRS 14 at the selected location. As an example, the algorithm 127 may be one that determines the current locations of the EPMT 12 and the BRS 14 using GPS data 39 (or a derivative thereof) and GPS data 121 (or a derivative thereof), determines the acceptable locations within a geographic region in which both the EPMT 12 and the BRS 14 currently reside, and selecting one of the acceptable locations in that region. As another example, the algorithm 127 may be one that determines the current locations of the EPMT 12 and the BRS 14, and then determines the acceptable location by selecting one that is generally at the midpoint between the EPMT 12 and the BRS 14.

The H-CS control software 126 may be designed with program code to receive a fuel request during the communication session from the EPMT-CS 30, to determine which BRSs 14 are carrying fuel 58 by accessing such stored data in BRS database 40c, to select an appropriate BRS 14 that is carrying fuel with a suitable algorithm 127, and to communicate a fuel request to the BRS-CS 50 of the selected BRS 14 along with the battery remediation request.

The H-CS control software 126 may be designed with program code to enable a party associated with the EPMT 12 to cancel, confirm, or modify a battery remediation request and/or fuel request, after such a request has been made. The EPMT control software 110 communicates with the H-CS control software 126 via TX/RX 18, network 20, and TX/RX 22. The communication session could be initiated by either the EPMT 12 (a party or EPMT-CS 30) or the H-CS 16. If the H-CS control software 126 detects a cancellation or modification, then the H-CS control software 126 can be designed with program code to contact the BRS-CS 50 via TX/RX 24, network 26, and TX/RX 28 and advise the BRS-CS 50 of the cancellation or modification. In the event that the currently scheduled BRS 14 cannot handle the battery and/or fuel remediation based upon a modification, the H-CS control software 126 can cancel the work order associated with the currently selected BRS 14 and select and communicate with another BRS 14 that can fulfill the modified request.

3. Second Set of Embodiments

Figure 20:
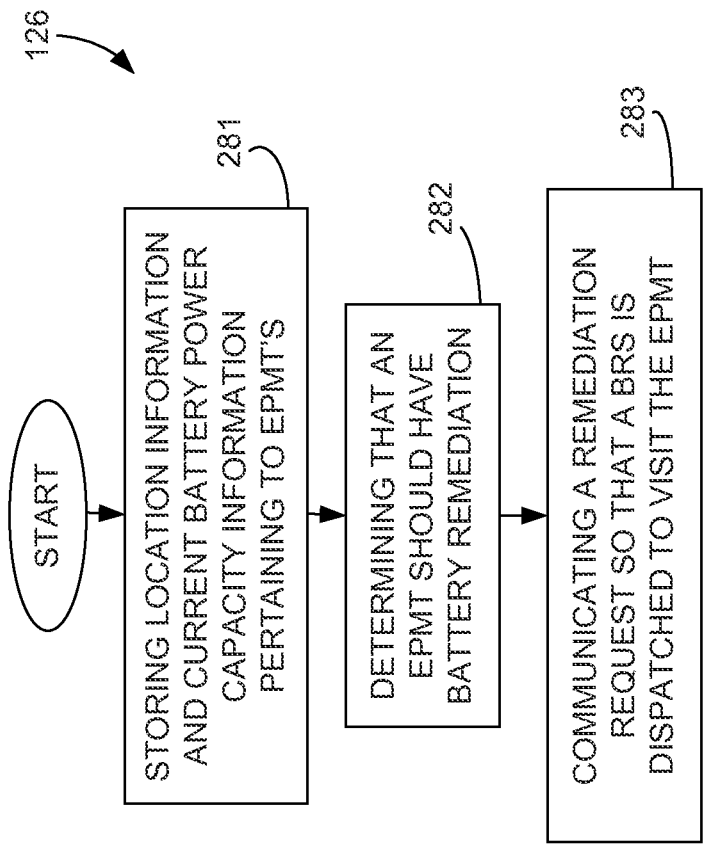
FIG. 20 is a flow chart of a second set of embodiments of BRS control software of FIG. 3 associated with the BRS-CS

A second set of embodiments of the H-CS control software 126 (FIG. 4) will now be described with reference to FIG. 20. In this second set, the H-CS control software 126 (FIG. 4) includes at least the following program code (or logic): program code 281 for storing location data 162 in BRS database 40c (FIG. 8) and current EPC data 165 pertaining to EPMTs 12 in BRS database 40c; and program code 282 for determining that an EPMT 12 should undergo battery remediation; and program code 283 for communicating a battery remediation request so that one or more BRSs 14 are dispatched to visit the EPMT 12. The remediation request could be a direct communication with a BRS 14 or a communication to another computer system that has the ability to contact the BRS 14 (for example, another computer system that tracks BRSs 14). Furthermore, more than one BRS 14 may be dispatched, for example but not limited to, in the case where an EPMT 12 needs both battery remediation in connection with battery 34 and fuel 31 and where a first BRS 14 with battery remediation capabilities is dispatched for the battery remediation and a second BRS 14 with available fuel 58 is dispatched for refueling the EPMT 12.

In some embodiments, the EPMT-CS 30 communicates location data and current EPC data to the H-CS 16 via TX/RX 18, network 20, and TX/RX 22. This is preferably, although not necessarily, performed on a periodic or intermittent basis, so that the H-CS 16 has the most up to date information. The program code 281 of the H-CS control software 126 stores and updates the location data 162 and EPC data 165 in the BRS database 40c, based upon the location/EPC data received from the EPMT-CS 30. The location/EPC data 162, 165 stored in the BRS database 40c may be the same as or a derivative of the data received from the EPMT-CS 30.

The program code 282 can determine when battery remediation takes place using any suitable algorithm 127. For example, the algorithm 127 may be as follows: when EPC is measured to be below a predefined threshold, then cause a battery remediation request to be communicated to a BRS 14. The predefined threshold can be (a) preset in the H-CS 16, (b) preset by an EPMT user and stored as user preferences 150 in the EPMT database 40b of the H-CS 16, or (c) preset by an EPMT user, stored in user preferences database 115 (FIG. 2) of the EPMT-CS 30, and communicated to the H-CS 16.

The H-CS control software 126 may be designed with program code to select a BRS 14 to dispatch from a plurality of available BRSs 14 based upon its proximity to the EPMT 12 that should be recharged. An example of an algorithm 127 would be: determine available BRSs 14 from availability data 164 and select the available BRS 14 that has the closest travel path in terms of distance to the EPMT 12 that needs battery remediation.

In some embodiments, the H-CS 16 may be designed to receive the location data, directly or indirectly, from a VNS associated with the EPMT. An indirect way may be by way of a remote computer system that receives location data from the VNS.

The H-CS 16 may be designed with program code to store one or more of the following information in connection with each EPMT 12, as nonlimiting examples: a type of vehicle, a license plate number, a VIN, driver's license information, a location of power port, an amount of recharge, a type of battery 34, whether a battery 34 is stationary or removable, a type of connection port, a number of previous recharges, a condition of battery and/or battery cells, a number of batteries, a speed of battery remediation, a list of one or more acceptable specific or types of BRSs 14, billing information, credit card information, bank account charge information, a length of authorized recharge, control port information, power port information, a maximum monetary charge limit, a minimum acceptable recharge amount or minimum acceptable time that is available from the BRS, etc. The program code may be designed to communicate any of the foregoing information in the recharge request that is communicated to the BRS 14.

The H-CS control software 126 may be designed with program code to determine that the EPMT 12 should be refueled and to communicate a refuel request so that a mobile refueling station or a BRS 14 with fuel 58 is dispatched to visit the EPMT 12. The EPMT control software 110, which monitors EPMT fuel levels with fuel monitor 29, may be designed to communicate fuel level data 141 to the H-CS control software 126. This fuel level data 141 can be stored in the EPMT database 40b (FIG. 7) and related to a specific EPMT 12. The program code associated with the H-CS control software 126 may be designed to initiate a refuel request with or without initiating a battery remediation request, depending upon the needs of the EPMT 12.

3. Third Set of Embodiments

A third set of embodiments of the H-CS control software 126 (FIG. 4) will now be described with reference to FIG. 21. In this third set, the H-CS control software 126 (FIG. 4) includes at least the following program code (or logic): program code 291 for monitoring location data 162 pertaining to BRSs 14; program code 292 for monitoring availability of the BRSs 14; program code 293 for receiving a request from a requestor for a BRS 14; and program code 294 for communicating ID data 166 of one or more of the BRSs 14 to the requestor based upon the location and availability data.

Location data is communicated from the BRS-CS 50 of the BRSs 14 to the H-CS 16. Location data includes any type of information that can be used to determine a specific location or geographic region in which the BRS 14 is situated or will be situated. Preferably, the location data is or is derived from the GPS data 121 (FIG. 13). This location data, or a derivative thereof, denoted by reference numeral 162 (FIG. 8), is stored and accessed in the BRS database 40*c* (FIG. 1, 8). The foregoing location data 162 is monitored by program code 281.

Availability data 164 associated with the BRSs 14 is also stored in the BRS database 40*c* and is accessed and monitored by program code 292 from the BRS database 40*c*, when needed. In some embodiments, the availability data is simply whether or not a particular BRS 14 is available to practice battery remediation.

In other embodiments, the availability data may include whether or not a particular BRS 14 is available to practice battery remediation on a specific type of EPMT 12 to be remediated. For example, the EPMT 12 may have a specific type of power connector that is not readily available to a particular BRS 14, and therefore, this BRS 14 is unavailable when this request relates to such an EPMT 12. As another example, the EPMT 12 may be a hybrid type motor vehicle that consumes both electric power and gasoline, and the request may be for a BRS 14 that carries both an electric charger 52 and fuel 58. Some BRSs 14 may be unavailable for this type of remediation request while others would be available.

The program code 293 is designed to receive a request for a BRS 14 from a requestor. The requestor can be any of the following examples: another computer system that monitors EPMTs 12 and EPCs pertaining to the EPMTs 12, an EPMT 12, a PCD 42 via network 46 and TX/RX 44, etc.

The program code 294 is designed to communicate ID data 166 of one or more of the BRSs 14 to the requestor based upon the location data 162 and availability data 164. The program code 294 accesses this ID data 166 in the BRS database 40*c*.

4. Fourth Set of Embodiments

A fourth set of embodiments of the H-CS control software 126 (FIG. 4) will now be described with reference to FIG. 22. In this fourth set, the H-CS control software 120 (FIG. 4) includes at least the following program code (or logic): program code 301 for monitoring location data 162 and availability data 164 pertaining to BRSs 14; program code 302 for monitoring location data 142 pertaining to one or more EPMTs 12; program code 303 for determining that an EPMT 12 should undergo battery remediation; and program code 304 for communicating a battery remediation request so that a BRS 14 is dispatched to visit the EPMT 12.

The program code 301 is designed to monitor location data 162 and availability data 164 pertaining to BRSs 14 in the BRS database 40*c* (FIG. 8). The location data 162 and the availability data 164, or a derivative thereof, is communicated by the BRSs 14 via TX/RX 28, network 26, and TX/RX 24 (FIG. 1). In other embodiments, the location data and/or the availability data can be received from a VNS or a PCD associated with each of the BRSs 14.

The program code 302 is designed to monitor location data 142 pertaining to one or more EPMTs 12. The location data 142, or a derivative thereof, is communicated by the one or more EPMTs 12 via TX/RX 18, network 20, and TX/RX 20 (FIG. 1).

The program code 303 is designed to determine whether or not an EPMT 12 should undergo battery remediation. This determination can be made based upon any of the following examples: a remediation request received from the EPMT-CS 30, a remediation request received from a PCD 42, a comparison of current EPC data 144 (FIG. 7) with a predefined threshold of acceptable EPC, a comparison of current fuel level data 141 (FIG. 7) with a predefined threshold of acceptable fuel level, etc. Moreover, the aforementioned thresholds can be present by the H-CS 16 or can be preset by a user as user preferences in EPMT database 40*b* (FIG. 1A, 8) and/or user preferences database 115 (FIG. 2).

The program code 304 is designed to communicate a battery remediation request so that a BRS 14 is dispatched to visit the EPMT 12. The request can be communicated to any of the following, as nonlimiting examples: a BRS-CS 50 of a BRS 14 via TX/RX 24, network 26, and TX/RX 28, a PCD 42 associated with or having access to a BRS 14 via TX/RX 44 and network 46, a remote computer system that tracks BRSs 14 and their availability, etc.

In some embodiments, the H-CS control software 126 may be further designed with program code to select a BRS 14 from a plurality to dispatch based upon its proximity to the EPMT 12 that should undergo batter remediation. To compute proximity, the program code accesses the EPMT ID data 143 and EPMT location data 142 in the EPMT database 40*b* (FIG. 7), accesses the BRS ID data 166 and BRS location data 162 in BRS database 40*c* (FIG. 8), and determines the distance between the EPMT and BRS locations. In other embodiments, the program code may further consider map data 113 in addition to the location data when determining the proximity by determining the pathways (e.g., roadways) that will be traveled by the MRS 14 to reach the EPMT 12.

In some embodiments, the H-CS control software 126 may be further designed with program code to select a BRS 14 from a plurality to dispatch based upon the fact the EPMT 12 may require both battery remediation and fuel. The program code can access the fuel level data 141, which has been communicated to the H-CS 16 by the EPMT 12. The program code may be designed to select a BRS 14 that can recharge and refuel.

5. Fifth Set of Embodiments

A fifth set of embodiments of the H-CS control software 126 (FIG. 4) will now be described with reference to FIG. 23. In essence, this fifth set of embodiments involves a computer based system designed to track one or more, but preferably a plurality of, BRSs 14 and/or information associated with them, and to sell the information. As an example, a party associated with an EPMT 12 may wish to purchase access to information in this BRS information in order to determine where the EPMT 12 can get access to battery remediation and/or refueling. As another example, a party may wish to visually view on a display map the locations of BRSs 14 (e.g., on a display associated with a VNS).

In this fifth set, the H-CS control software 120 (FIG. 4) includes at least the following program code (or logic): program code 311 for maintaining (storing, updating, and accessing) the BRS database 40*c* (FIG. 8) and program code 312 for selling access to information in the BRS database 40*c*.

In one embodiment, the BRS database includes at least BRS ID data 166, BRS contact data 168, and BRS location data 162. The program code 311 stores, updates, and accesses the foregoing data. An EPMT-CS 30, a PCD associated with the EPMT 12, or some other requestor communicates with the H-CS 16 and requests battery remediation, fuel, and/or BRS information (e.g., BRS locations, BRS contact data, etc.) from the BRS database 40*c*. The program code 311 is designed to provide an ID of one or more BRSs 14 to the requestor along with the applicable location data 162 and the contact data 168. In some embodiments, the location of the EPMT 12 is communicated with the request, and in this case, the program code 311 selects one or more BRSs 14 based upon their proximity to the EPMT 12.

In some embodiments, the program code 311 stores, updates, and accesses, in addition to BRS ID data 166, BRS contact data 168, and BRS location data 162, but also BRS availability data 164 in the BRS database 40c. The program code 311 is designed to provide an ID of one or more BRSs 14 of an available BRS 14 to the requestor along with the applicable location data 162 and the contact data 168. Further, in embodiments where the location of the EPMT 12 is communicated with the request, and the program code 311 can be designed to select one or more BRSs 14 that are available and that are within a predefined proximity of the EPMT 12.

In some embodiments, a user can pay in advance for the BRS information, and the BRS information is pushed from the H-CS 16 to the EPMT-CS 30. The EPMT-CS 30 can be designed with program code to display the BRS information on a display 108, for example, the BRS locations on a map in a predefined vicinity of the EPMT 12, BRS availability, etc.

The program code 312 is designed to sell access to the BRS information in the BRS database 40c. In some embodiments, a party can pay a monetary amount for a subscription that covers a certain time period. In other embodiments, the program code 312 is designed to monetarily charge a predefined amount for each distribution of BRS information to the requester. The charge can be levied upon a party or party's financial account associated with the EPMT 12 and/or the BRS 14.

In some embodiments, the program code 312 is designed to request monetary account data 184 from the requester and permission to debit one or more monetary accounts associated with a financial institution (e.g., credit card company, bank, etc.). Once the aforementioned data is received, the H-CS 16 can access and debit a payment(s) from the account via TX/RX 59, network 60, and TX/RX 61 of the FI-CS 61.

In some embodiments, the monetary account data 184 can be communicated by a party to the H-CS 16 in advance of the request and stored by the H-CS control software 126 in the user preferences 150 of the EPMT database 40b (FIG. 7), so that when a request occurs, the program code 312 can readily access the account data. In other embodiments, the account data is stored in EPMT user preferences database 115. When a request is made by the EPMT-CS 30, the account data is accessed in the EPMT user preferences database 115 and is communicated to the H-CS 16.

6. Sixth Set of Embodiments

A sixth set of embodiments of the H-CS control software 126 (FIG. 4) will now be described with reference to FIG. 24. In essence, this sixth set of embodiments involves a computer based system designed to track one or more, but preferably a plurality of, EPMTs 12 and/or information associated with them, and to sell the information. The information may include, for example but not limited to, a battery remediation request and/or a fuel request that has been received in connection with an EPMT 12. As an example, the operators BRSs 14 may be interested in purchasing this EPMT information to acquire the battery remediation and/or refueling work. In some embodiments, the H-CS software 126 may be designed to provide EPMT contact data of the EPMT 12 that has requested battery remediation and/or refueling when a BRS 12 is given access to the EPMT information.

In this sixth set, the H-CS control software 120 (FIG. 4) includes at least the following program code (or logic or code segments): program code 321 for maintaining (storing, updating, and accessing data) the EPMT database 40b with data pertaining to one or more EPMTs 12; and program code 322 selling access to the EPMT database 40b.

In one embodiment, the EPMT database 40b includes at least EPMT ID data 143, EPMT contact data 145, EPMT location data 142, and EPMT battery remediation request data 146. The program code 321 stores, updates, and accesses the foregoing data. A BRS-CS 50, a PCD associated with a BRS 14, or some other requestor communicates with the H-CS 16 and requests EPMT data from the EPMT database 40b, particularly, EPMT data concerning one or more EPMTs 12 that have requested battery remediation. The program code 321 is designed to provide an ID of one or more EPMTs 12 to the requestor along with the applicable location data 142 and the contact data 145. In some embodiments, the location of the BRS 14 is communicated with the request, and in this case, the program code 321 can be designed to select one or more EPMTs 12 for the BRS to service based upon their proximity to the BRS 14.

In another embodiment, the EPMT database 40b includes at least EPMT ID data 143, EPMT contact data 145, EPMT location data 142, EPMT battery remediation request data 146, and EPMT fuel request data. The program code 321 stores, updates, and accesses the foregoing data. A BRS-CS 50, a PCD associated with a BRS 14, or some other requestor communicates with the H-CS 16 and requests EPMT data from the EPMT database 40b, particularly, EPMT data concerning one or more EPMTs 12 that have requested battery remediation and one or more EPMTs 12 that have requested fuel 58. The program code 321 is designed to provide an ID of one or more EPMTs 12 to the requestor along with the applicable location data 142 and the contact data 145. In some embodiments, the location of the BRS 14 is communicated with the request, and in this case, the program code 321 can be designed to select one or more EPMTs 12 for the BRS to service based upon their proximity to the BRS 14.

In some embodiments, the program code 321 stores, updates, and accesses, in addition to EPMT ID data 143, EPMT contact data 145, and EPMT location data 142, EPMT battery remediation request data 146 (and/or EPMT fuel request data 147), but also EPMT availability data 146 preset by a user in user preferences 150 in the EPMT database 40b. Availability data 146 may include, for example but not limited to, a time period during a day when battery remediation (and/or refueling) is permitted, one or more locations or geographic regions where battery remediation (or refueling) is permitted, etc. The program code 321 is designed to provide an ID of one or more available EPMTs 12 to the requestor along with the applicable EPMT location data 142 and the EPMT contact data 145. Further, in embodiments where the location of the BRS 14 is communicated with the request, and the program code 321 can be further designed to select one or more EPMTs 12 that are available and that are within a predefined proximity of the BRS 14.

In some embodiments, a user can pay in advance for the EPMT information, and the EPMT information is automatically pushed from the H-CS 16 to the BRS-CS 50. The BRS-CS 50 can be designed with program code to display the EPMT information on a display 108 (FIG. 3), for example, the EPMT locations on a map in a predefined vicinity of the BRS 14, EPMT availability, etc.

The program code 322 is designed to sell access to the EPMT information in the EPMT database 40b. In some embodiments, a party can pay a monetary amount for a subscription that covers a certain time period. In other embodiments, the program code 322 is designed to monetarily charge a predefined amount for each distribution of EPMT information to the requester. The charge can be levied upon a party or party's financial account associated with the EPMT 12 and/or the BRS 14.

In some embodiments, the program code 322 is designed to request monetary account data 170 from the requester and permission to debit one or more monetary accounts associated with a financial institution (e.g., credit card company, bank, etc.). Once the aforementioned data is received, the H-CS 16 can access and debit a payment(s) from the account via TX/RX 59, network 60, and TX/RX 61 of the FI-CS 61.

In some embodiments, the monetary account data 170 can be communicated by a party to the H-CS 16 in advance of the request and stored by the H-CS control software 126 in the user preferences 169 of the BRS database 40c (FIG. 8), so that when a request occurs, the program code 312 can readily access the BRS account data 170. In other embodiments, the BRS account data 170 is stored in BRS user preferences database 122 (FIG. 3). When a request is made by the BRS-CS 50, the account data 170 is accessed in the BRS user preferences database 122 and is communicated to the H-CS 16.

7. Seventh Set of Embodiments

Figure 25:
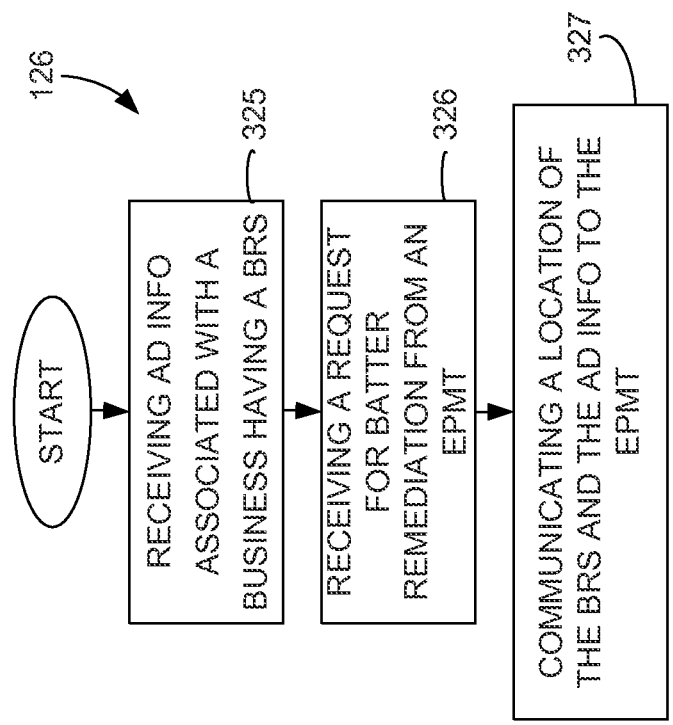
FIG. 25 is a flow chart of a seventh set of embodiments of BRS control software of FIG. 3 associated with the BRS-CS.

In this seventh set, as shown in FIG. 25, the H-CS control software 120 (FIG. 4) includes at least the following program code (or logic): program code 325 for receiving advertisement information (e.g., a restaurant location, restaurant ad, restaurant discount coupon, carwash location, carwash ad, carwash discount coupon, etc.) associated with a business having a BRS 14; program code 326 for receiving a request for battery remediation from an EPMT 12; and program code 326 for communicating a location of the BRS 14 and the advertisement information to the EPMT 12.

The program code 326 can be designed to cause the advertisement information to be displayed on a display associated with the EPMT along with an indication that the BRS resides at or near the business. For example, an image and/or text can be generated and communicated by the H-CS 16 to the EPMT-CS 30, which in turn is displayed by the EPMT-CS 30 on EPMT display 108 (FIG. 3).

K. Methods of Doing Business

1. First Set of Embodiments

The present disclosure provides various methods of doing business. One such method, among others, involves the following steps: tracking information pertaining to a plurality of BRSs 14 and selling access to the information. The tracking is preferably, although not necessarily, performed in an automated manner by tracking, for instance, GPS data received from the BPRs 14 or from another computer system that tracks them, and a computer system that implements the BRS database 40c that can be accessed. The BRS information can be accessed in an automated manner, e.g., computer system to computer system, data pushed, data pulled, etc. or can be accessed manually, e.g., by having a requester make contact (telephone call, text message, email, etc.) with a call center where a call center person accesses the BRS database 40c, communicates the BRS information to the requester, and monetarily charges the requester for the BRS information, etc.

In some embodiments, a party can pay a monetary amount for a subscription that covers a certain time period. In other embodiments, a requester is monetarily charged a predefined amount for each distribution of BRS information. The charge can be levied upon a party or party's financial account associated with the EPMT 12 and/or the BRS 14.

2. Second Set of Embodiments

Another such method, among others, involves the following steps: tracking information pertaining to a plurality of EPMTs 12 and selling access to the information. The tracking is preferably, although not necessarily, performed in a fully automated manner by tracking, for instance, GPS data received from the EPMTs 12 or from another computer system that tracks them, with a computer system that implements the EPMT database 40b that can be accessed. The EPMT information can be accessed in an automated manner, e.g., computer system to computer system, data pushed, data pulled, etc. or can be accessed manually, e.g., by having a requester make contact (telephone call, text message, email, etc.) with a call center where a call center person accesses the EPMT database 40b, communicates the EPMT information to the requester, and monetarily charges the requester for the EPMT information, etc.

In some embodiments, a party can pay a monetary amount for a subscription that covers a certain time period. In other embodiments, a requester is monetarily charged a predefined amount for each distribution of EPMT information. The charge can be levied upon a party or party's financial account associated with the EPMT 12 and/or the BRS 14.

L. Vehicle Navigation System

Figure 26:
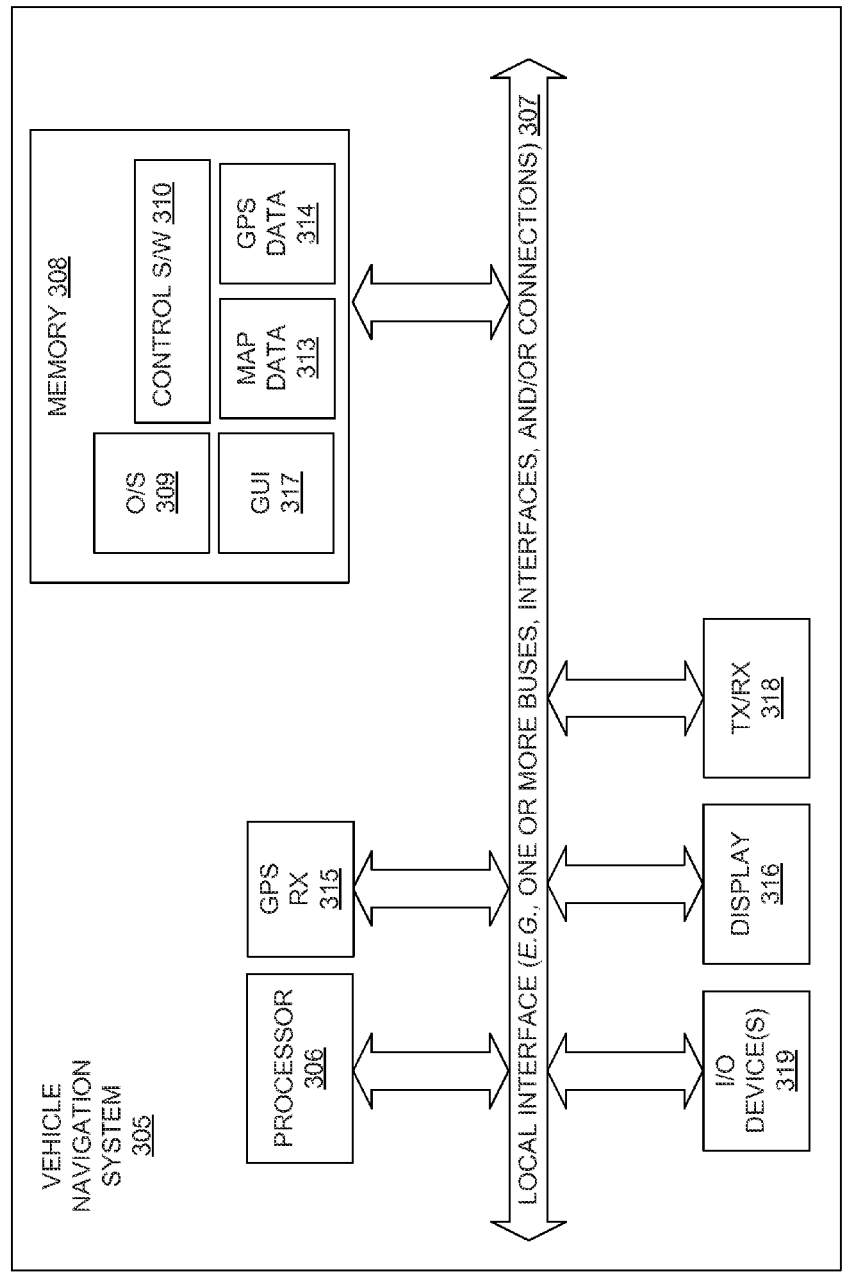
FIG. 26 is a block diagram of a vehicle navigation system that can incorporate one or more embodiments of the present disclosure.
Figure 26A:
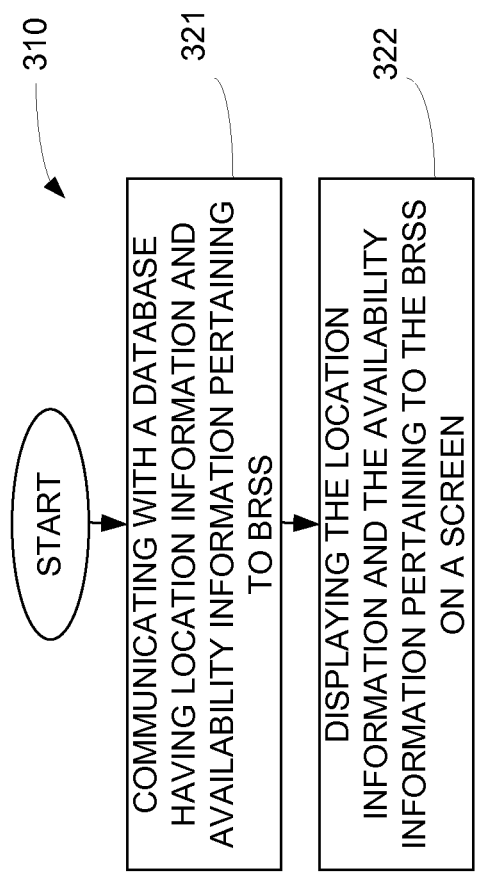
FIG. 26A is a flow chart of a first set of embodiments of VNS control software of FIG. 26.

The present disclosure also provides a vehicle navigation system 305 associated with an EPMT 12, as illustrated in FIGS. 26 and 26A. As illustrated in FIG. 26, the VNS 305 has a computer architecture with a processor(s) 306 for executing program code stored in a memory 307 and accessed via a local interface 307. The VNS 305 further comprises a GPS RX 315, a display 316, a TX/RX 318, and other I/O devices 319, which are all communicatively coupled via the local interface 307. The memory 308 stores an O/S 309, control software 310, map data 313, GPS data 314 received or derived from a GPS RX 315, and a GUI 317 for rendering screens for display 316 having map and current location data.

As shown in FIG. 26A, the control software 310 is designed with program code as follows: program code 321 to communicate with the H-CS 16 via TX/RX 318 and to receive location data 162 and availability data 164 pertaining to BRSs 14 and program code 322 to display the location data 162 (and optionally the availability data 164), or a derivative thereof, pertaining to the BRSs 14 on a screen associated with the display 316. In some embodiments, this information may be shown on a map.

In some embodiments, the control software 310 may be designed with program code to highlight one or more of the BRSs 14 on the screen based upon one or more of the following: proximity of the BRS 14 to the EPMT 12, availability or unavailability of a BRS 14, location of a BRS 14 with respect to a predefined travel path associated with the EPMT 12, or location of the EPMT 12 with respect to a predefined travel path associated with the BRS 14.

The VNS 305 may be designed to receive location data and availability data from the BRSs 14 and maintain the database on the EPMT 12. The database may also be situated remotely from the EPMT 12.

In some embodiments, the control software 310 may be designed with program code to indicate on the rendered screens if one or more BRSs 14 carry fuel 58. This information can be communicated by the H-CS 16 to the VNS.

M. Control Methodology and Software for Parking Lot Computer System (PL-CS)

Figure 27:
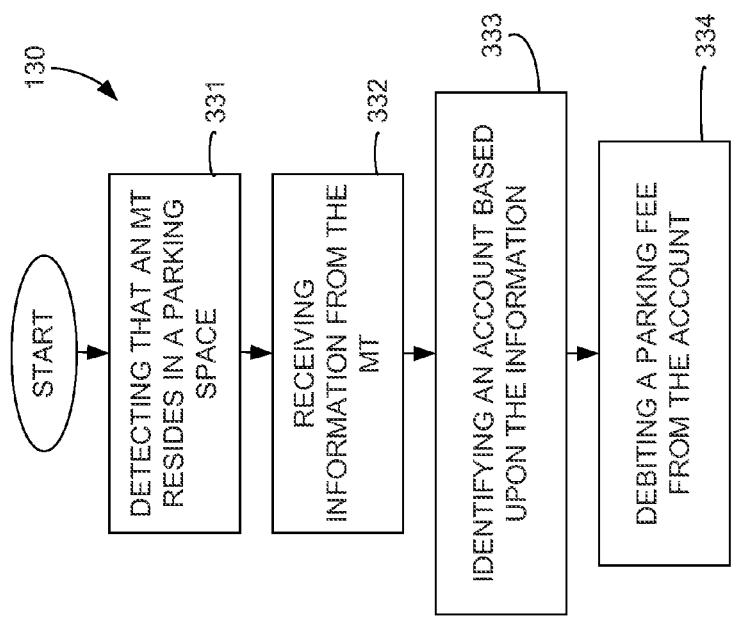
FIG. 27 is a flow chart of a first set of embodiments of PL-CS control software of FIG. 4 associated with the PL-CS.

The present disclosure provides for automated systems and methods for monetarily charging for parking. In this regard, the PL-CS 76 (FIG. 5) is designed to monitor at least one parking space. As shown in FIG. 27, the PL-CS control software 130 (FIG. 5) associated with the PL-CS 76 includes at least the following program code (or logic): program code 331 for detecting that a mobile thing (MT), for example but not limited to, an EPMT 12 or other motor vehicle, resides in a parking space; program code 332 for receiving information from the MT; program code 333 for identifying an account based upon the information; and program code 334 for debiting a parking fee from the account. The following discussion will describe the architecture, functionality, and operation of the PL-CS 76 in connection with an EPMT 12, for simplicity, but the discussion is equally applicable to any MT (e.g., a fuel powered motor vehicle) that can employ comparable PL-CS control software 130 in, for example but not limited to, in a VNS.

In some embodiments, the PL-CS 76 detects that an EPMT 12 resides in a parking space by employing a commercially available laser detection system disposed at or near the parking space. One or more I/O devices 112 in the form of laser devices 112 generate laser beams that are directed at the parking space. When the laser beams are broken by an MT, the electrical output (voltage or current) from the laser devices changes. The laser devices are electrically interfaced with the PL-CS 76. The program code 331 of the PL-CS control software 130 can detect when an MT resides on and departs from the parking space by monitoring the electrical signals from the laser devices.

In other embodiments, one or more I/O devices 112 in the form of commercially available magnetic sensors 112 disposed in, on, or over the pavement to detect whether or not a MT resides in the parking space by measuring the disturbance caused by the MT with respect to the earth's magnetic field. A nonlimiting example of such a magnetic sensor 112 is a Model HMC1021Z magneto resistive sensor that is available for purchase from e-Gizmo Mechatronix Central. See e-Gizmo Magnetic Car Sensor Hardware Manual, Rev 1r0, which is incorporated herein by reference. The PL-CS control software 130 can detect when an MT resides on and departs from the parking space by monitoring the electrical signals from the magnetic sensors 112.

In yet other embodiments, one or more I/O devices 112 in the form of commercially available pressure sensors are disposed on or in the pavement associated with the parking space, and the sensors are electrically connected (wired or wireless) to the PL-CS 76 and provide an electrical output thereto that is indicative of pressure. The PL-CS control software 130 can detect when an MT resides on and departs from the parking space by monitoring the electrical signals from the pressure sensors.

In still other embodiments, the program code 331 detects that an EPMT 12 resides in a parking space by receiving GPS location data from the EPMT-CS 30 via TX/RX 84, network 82, and TX/RX 80 and comparing this GPS location data with known parking lot coordinates associated with the parking space. As an example, the EPMT control software 130 may be designed so that when the EPMT 12 parks in the parking space, the EPMT control software 130 contacts the PL-CS 76 with known contact information, e.g., a telephone number, email address, text message address, etc., and communicates the GPS location data associated with the EPMT 12.

As another example, the EPMT 12 may bear a machine readable code or symbol, for example, a bar code, QR code, or code read from an electronic tag, that communicates EPMT contact information (e.g., a telephone number, email address, text message address, etc.) of the EPMT-CS 30 and/or of a PCD 81 associated with an EPMT party to the PL-CS 76. One or more commercially available bar code readers, QR code readers, and/or electronic tag readers can be disposed at or near the parking space to read such information. The program code 331 of the PL-CS control software 130 may be designed to detect that an EPMT 12 resides in the parking space by reading such information, and furthermore, the information may include EPMT contact data.

The PL-CS control software 130 may be designed to communicate with a party associated with the EPMT 12 and permit the party to select or define one or more parking time purchase options, for instance, one hour, two hours, all day, etc. This can be accomplished by communicatively coupling the PL-CS 76 with a PCD 81 associated with the party or by communicatively coupling PL-CS 76 with the EPMT-CS 30, which in turn, communicates with the party via EPMT display 108 and/or one or more other EPMT I/O devices 112.

The EPMT control software 110 and the PL-CS control software 130 may be designed so that the EPMT control software 110 communicatively pushes or the PL-CS control software 130 communicatively pulls, any of the following information: an identification of the EPMT 12, an identification of a party associated with the EPMT 12, a credit card number associated with a credit card account to be debited, a bank account number associated with a bank account to be debited along with the bank routing number, etc. The PL-CS program code 333 identifies the account based upon the foregoing communication session, and the PL-CS program code 334 debits the parking fee from the financial institution account via TX/RX 73, network 90, and TX/RX 75.

In some embodiments, the information received by program code 332 may be received from a VNS associated with the EPMT 12, which is equipped with suitable software for performing the functions described herein.

The PL-CS control software 130 may be designed to determine the parking fee based upon a location of the EPMT 12. For example, some parking spaces may be more expensive than others. The PL-CS control software 130 can compare the received GPS location information with known parking lot coordinates associated with the parking spaces to determine where the EPMT 12 is parked and can monetarily charge accordingly.

The PL-CS control software 130 may be designed to detect when the EPMT 12 departs from the parking space and to determine the parking fee based upon a duration of parked time. As an example, the EPMT control software 110 may be designed with program code that initiates a notification communication to the PL-CS 76 when the EPMT 12 is departing the parking space. As another example, the PL-CS 76 may detect departure with a bar code reader (absence of readable code), laser detection, and/or electronic tag readers (absence of readable code), the implementation of which has been previously described. Many other implementations are possible for detecting EPMT departure.

The PL-CS control software 130 may be designed to communicate with a PCD 81 via TX/RX 79 when any of the following has occurred: purchased time has expired or is about to expire, or a time limit has been exceeded or is about to be exceeded, etc. In some embodiments, an EPMT party can set user preferences that define whether any of the foregoing occurs (as well as contact information for the PCD 81) in user preference database 115 (FIG. 2) that can be communicated by the EPMT control software 110 to the PL-CS control software 130. In some embodiments, the PL-CS control software 130 may be designed to enable additional parking time to be purchased via one or more inputs from the PCD 81. The inputs can be provided by the user of the PCD 81 with keystrokes or voice commands, as examples, and the PL-CS control software 130 can recognize the inputs via a tone decoder or voice recognition software, respectively, implemented in the PCLS 76.

The PL-CS control software 130 may be designed to communicate with a party associated with the EPMT 12 and permit the party to purchase electric power for the EPMT 12, in addition to purchasing parking time. As an example, a power port for recharging the EPMT 12 may be made available at or near the parking space. The PCLS control software 130 may have program code that enables/disables the power port based upon how much electric power is purchased. The enabling/disabling can be accomplished with simple controllable electrical switches. The amount can be based upon a time period, units of energy, units of power, etc. The program code 334 of the PL-CS control software 130 may be designed to concurrently debit the parking fee and an electric power fee from the account at a financial institution via TX/RX 73, network 90, and TX/RX 75 of the FI-CS 55 (FIG. 1C). Further note that, as an example, the EPMT-CS 30 and the PL-CS 76 may be designed to communicate various information over a communication channel on the power recharging connections. As examples, the communication channel can be designed in accordance with the HomePlug AV or IEEE P1901 standards, both of which are incorporated herein by reference.

In some embodiments where electric power is purchased, the PL-CS control software 130 may be designed to contact an H-CS 16 on behalf of the EPMT 12 and request battery remediation from an MRS 14. In this scenario, the MRS 14 visits the EPMT 12 for implementing batter remediation while the EPMT 12 resides at the parking space.

In some embodiments, the PL-CS control software 130 may be designed to communicate, on behalf of an EPMT 12, a battery remediation request directly to a party associated with a BRS 14 or to the BRS-CS 50 of a BRS 14 so that the BRS 14 visits the EPMT 12 at the parking space.

In some embodiments, an EPMT party can specify in user preferences database 115 what type of battery remediation is to be practiced: recharge, replacement, or repair. These user preferences can be communicated by the EPMT control software 110 to the PL-CS control software 130 during their communication session, and the PL-CS control software 130 can communicate these user preferences to the H-CS 16, the BRS-CS 50, or PCD of a party associated with a BRS 14 when the battery remediation request is made.

N. Control Methodology and Software for Government Computer System (G-CS)

The present disclosure provides systems and methods for taxing by governments (city, county, state, federal, etc.). In essence, the taxing concept involves the taxing of any and all battery remediation activities. As gasoline powered vehicles are replaced with EPMTs 12, the government will suffer a loss in gasoline sales taxes. By taxing battery remediation activities, the government can help offset this loss.

Figure 28:
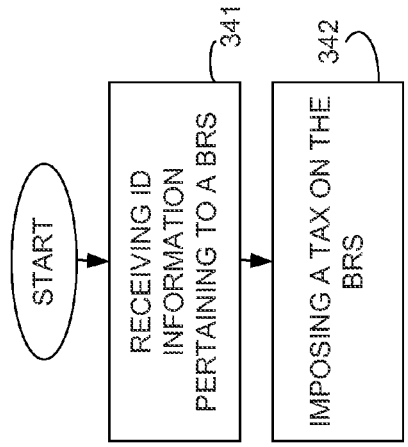
FIG. 28 is a flow chart of a second set of embodiments of PL-CS control software of FIG. 4 associated with the PL-CS.

This type of taxing can be viewed broadly as a method of doing government business. It can be done in a manual manner, without the use of computers. However, in the preferred embodiment, it is implemented in an automated manner with a computer system. In this regard, the G-CS 131 (FIG. 7) is designed to monitor at least one parking space. As shown in FIG. 28, the G-CS control software 132 (FIG. 7) includes at least the following program code (or logic): program code 341 for receiving ID data pertaining to a BRS 14; and program code 342 for imposing a government tax on the BRS 14 (or BRS activities). The tax may be determined based upon at least one of the following: a flat rate, a number of battery remediations accomplished by the BRS 14; an amount of electric power involved in recharges, a sidewalk fee, etc.

The G-CS 131 may be designed with program code to receive account and battery remediation information from the BRS 14 via TX/RX 133, and to debit a monetary account in the amount of the tax based upon this information. The government computer system 131 accesses the FI-CS 55 with TX/RX 133.

The computer system 131 may be designed with program code to receive travel data pertaining to the BRS 14 and debit a monetary account in the amount of the tax based upon the travel data, e.g., distance traveled, etc.

The program code 341 can be designed to receive the ID information pertaining to a BRS 14 from the BRS-CS 50, from the DCS 16, and/or from the PL-CS 76.

O. Control Methodology and Software for Financial Institution Computer System (FI-CS)

One embodiment, among other possible embodiments, of the FI-CS control software 140 (FIG. 6) of the FI-CS 55 (FIG. 1B, 6) is illustrated in FIG. 29. As described previously, any of the following requestors may optionally be designed to interact with the FI-CS 55 in order to debit an account: the H-CS 16, the BRS-CS 50, the PL-CS 76, and the government computer system 131.

As shown in FIG. 29, the FI-CS control software 140 (FIG. 6) includes at least the following program code (or logic): program code 351 for receiving a request to debit a financial account, program code 352 for identifying an account based upon the request, program code 353 for causing funds to be withdrawn from the account, and program code 354 for communicating a confirmation to the requestor that funds have been withdrawn.

In some embodiments, the program code 351 that receives a request to debit a financial account also receives, as part of the request communication session, the amount to be debited as well as the account number in the form of a credit card number or a bank account number with bank routing number. The foregoing information is used by the program code 352 to identify the account in the accounts database 139 (FIG. 6) of the FI-CS 55, and enables the program code 353 to debit the account in the accounts database 139. Furthermore, the confirmation generated by the program code 354 and communicated to the requestor, can take many forms. In a simple example, it is merely an indication that a debit of a particular amount has occurred.

P. Personal Communications Device (PCD)

Figure 30:
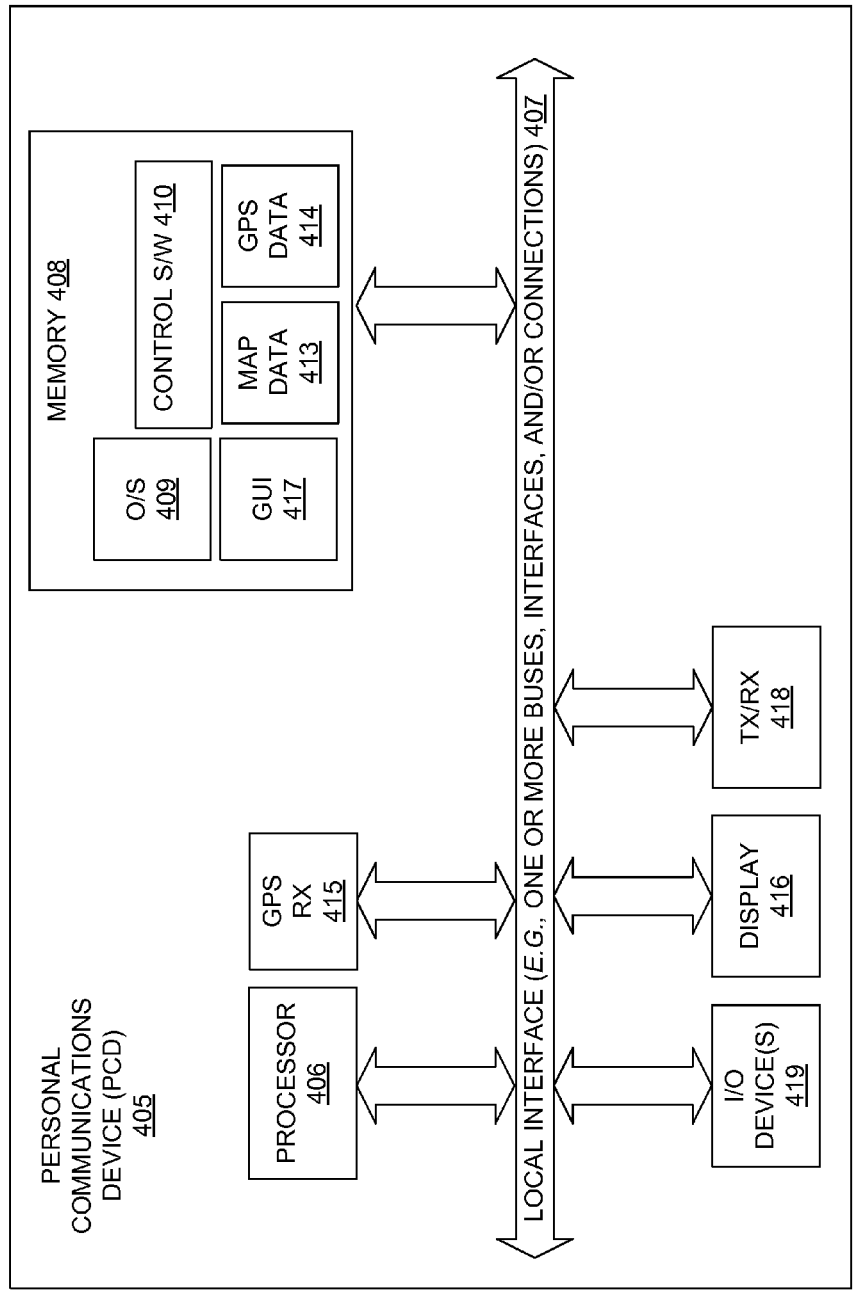
FIG. 30 is a block diagram of a personal communications device (PCD) that can incorporate one or more embodiments of the present disclosure.
Figure 30A:
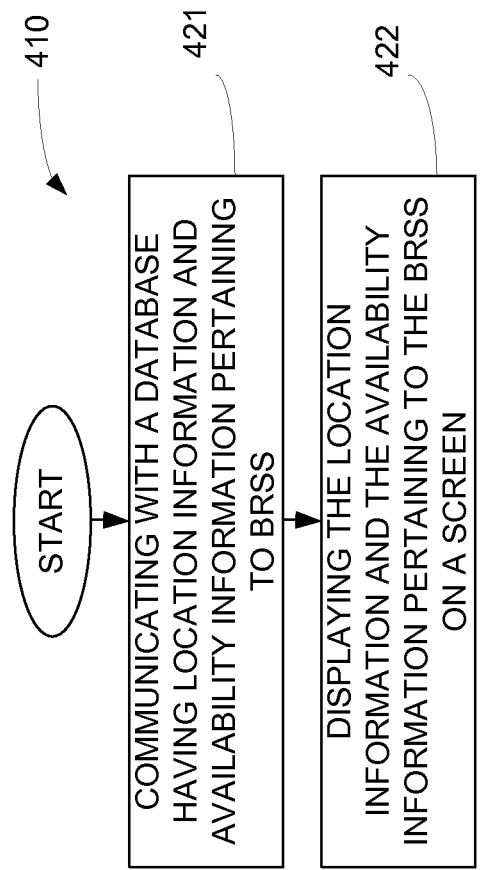
FIG. 30A is a flow chart of a first set of embodiments of PCD control software of FIG. 30.

The present disclosure also provides a PCD 405 that can be carried by a party associated with the EPMT 12, as illustrated in FIGS. 30 and 30A. The PCD 405 has a computer architecture with a processor(s) 406 for executing program code stored in a memory 407 and accessed via a local interface 407. The PCD 405 further comprises a GPS RX 415, a display 416, a TX/RX 418, and other I/O devices 419, which are all communicatively coupled via the local interface 407. The memory 408 stores an O/S 409, control software 410, map data 413, GPS data 414 received or derived from a GPS RX 415, and a GUI 417 for rendering screens for display 416 having map and current location data.

As shown in FIG. 30A, the control software 410 is designed with program code as follows: program code 421 to communicate with the H-CS 16 via TX/RX 418 and to receive location data 162 and availability data 164 pertaining to BRSs 14 and program code 422 to display the location data 162 (and optionally the availability data 164), or a derivative thereof, pertaining to the BRSs 14 on a screen associated with the display 416. In some embodiments, this information may be shown on a map.

In some embodiments, the control software 410 may be designed with program code to highlight one or more of the BRSs 14 on the screen based upon one or more of the following: proximity of the BRS 14 to the EPMT 12, availability or unavailability of a BRS 14, location of a BRS 14 with respect to a predefined travel path associated with the EPMT 12, or location of the EPMT 12 with respect to a predefined travel path associated with the BRS 14.

In some embodiments, the control software 410 may be designed with program code to indicate on the rendered screens if one or more BRSs 14 carry fuel 58. This information can be communicated by the H-CS 16 to the PCD 405.

Q. Other Variations and Modifications

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present inventions.

With respect to variations, note that although not specifically described for simplicity, any combination of the various systems/methods that have been described under headings above may be employed in connection with battery remediation.

At least the following is claimed:

1. A method for a computer based system, comprising the steps of:
monitoring, by the computer based system, travel data associated with one or more battery remediation stations (BRSs);
engaging, by the computer based system, in an electric powered mobile thing (EPMT) communication session with an EPMT using at least one transmitter or receiver;
receiving, by the computer based system, an EPMT battery remediation request relating to the EPMT during the EPMT communication session;
engaging, by the computer based system, in a BRS communication session with a BRS using the at least one transmitter or receiver;
communicating, by the computer based system, a BRS battery remediation request to the BRS during the BRS communication session; and
communicating, by the computer based system, verification information to the EPMT that enables the EPMT to verify that the EPMT has found the BRS by exchanging the verification information between the BRS and the EPMT.

2. The method of claim 1, wherein the verification information includes at least one of a work order number, a link to a web site that provides work order information, or a verification code.

3. A method for a computer based system, comprising the steps of:
monitoring, by the computer based system, travel data associated with one or more battery remediation stations (BRSs);
engaging, by the computer based system, in an electric powered mobile thing (EPMT) communication session with an EPMT using at least one transmitter or receiver;
receiving, by the computer based system, an EPMT battery remediation request relating to the EPMT during the EPMT communication session;
engaging, by the computer based system, in a BRS communication session with a BRS using the at least one transmitter or receiver;
communicating, by the computer based system, a BRS battery remediation request to the BRS during the BRS communication session;
communicating, by the computer based system, verification information to the EPMT that enables a party associated with the EPMT to verify that the BRS was dispatched from an authorized source, prior to battery remediation; and
communicating, by the computer based system, control port and power port information associated with the EPMT to the BRS.

4. The method of claim 3, further comprising the steps of receiving an identification of a type of connection port and selecting the BRS based at least in part upon the type of connection port.

5. The method of claim 3, further comprising the steps of, during the EPMT communication session, receiving credit card information or accessing credit card information in a database and causing a debit to a credit card based upon a recharge request.

6. The method of claim 3, further comprising the steps of:
receiving, by the computer based system, availability information from one or more BRSs;
storing, by the computer based system, the availability information in a database;
accessing, by the computer based system, the database during or after the EPMT communication session; and
selecting, by the computer based system, the BRS based at least in part upon the availability information.

7. The method of claim 3, further comprising the steps of:
receiving, by the computer based system, travel or location information from one or more BRSs;
storing, by the computer based system, the travel or location information in a database;
accessing, by the computer based system, the database during or after the EPMT communication session; and
selecting, by the computer based system, the BRS based at least in part upon the travel or location information.

8. The method of claim 3, further comprising the steps of:
communicating, by the computer based system, with a government computer system that communicates information relating to one or more acceptable battery remediation practices; and
selecting, by the computer based system, a type of battery remediation based upon the information relating to one or more acceptable battery remediation practices.

9. The method of claim 3, further comprising the steps of determining and communicating one or more acceptable battery remediation locations in proximity of the BRS and/or the EPMT.

10. The method of claim 3, further comprising the steps of:
receiving, by the computer based system, a fuel request during the EPMT communication session; and
in response to the fuel request, communicating, by the computer based system, a request for fuel to the BRS.

11. The method of claim 3, further comprising the steps of:
receiving, by the computer based system, location information relating to the EPMT during the EPMT communication session; and
communicating, by the computer based system, location particulars of the EPMT during the BRS communication session, the location particulars of the EPMT being equivalent to or derived from the location information relating to the EPMT.

12. The method of claim 3, wherein the verification information is a link to a website that provides work order information.

13. The method of claim 8, further comprising the steps of:
selecting, by the computer based system, the type of battery remediation from a group comprising replacement, recharge, and repair; and
communicating, by the computer based system, the type of battery remediation to the BRS.

14. The method of claim 3, further comprising the steps of:
storing, by the computer based system, location information and availability information pertaining to the one or more BRSs;
communicating, by the computer based system, the location information and availability information to the EPMT; and
receiving, by the computer based system, a selection of a particular BRS among the one or more BRSs from the computer system associated with the EPMT prior to communicating the BRS battery remediation request to the BRS.

15. The method of claim 3, further comprising the steps of:
selecting, by the computer based system, a type of battery remediation from a group consisting of replacement, recharge, and repair; and
communicating, by the computer based system, the type of battery remediation to the BRS.

16. The method of claim 3, wherein the verification information is an image of the BRS.

17. The method of claim 3, further comprising the steps of:
receiving and storing, by the computer based system, advertisement information associated with a business associated with the BRS; and
communicating, by the computer based system, a location of the BRS and the advertisement information to the EPMT, prior to battery remediation.

18. The method of claim 17, further comprising the step of causing the advertisement information to be displayed on a display associated with the EPMT along with an indication that the BRS resides at or near the business.

19. The method of claim 17, wherein the business is a restaurant.

20. The method of claim 17, wherein the advertisement information includes a discount coupon.

21. A method for a computer based system, comprising the steps of:
monitoring, by the computer based system, travel data associated with one or more battery remediation stations (BRSs);
engaging, by the computer based system, in an electric powered mobile thing (EPMT) communication session with an EPMT using at least one transmitter or receiver;
receiving, by the computer based system, an EPMT battery remediation request relating to the EPMT during the EPMT communication session;
engaging, by the computer based system, in a BRS communication session with a BRS using the at least one transmitter or receiver;
communicating, by the computer based system, a BRS battery remediation request to the BRS during the BRS communication session;
communicating, by the computer based system, verification information to the EPMT that enables a party associated with the EPMT to verify that the BRS was dispatched from an authorized source, prior to battery remediation; and
enabling, by the computer based system, a party to cancel, confirm, or modify the EPMT battery remediation request during a second EPMT communication session.

22. The method of claim 21, further comprising the step of displaying on a display device locations of one or more BRSs or stationary battery remediation stations.

23. The method of claim 22, further comprising the step of providing, by the computer based system, information indicating a level of power needed to travel to at least one of the one or more BRSs or stationary battery remediation stations.

24. A system, comprising:
a memory that stores data associated with one or more battery remediation stations (BRSs); and
a host computer system communicatively coupled with the memory and including a transceiver, the host computer system being configured to:
monitor travel data associated with at least one of the BRSs;
engage in an electric powered mobile thing (EPMT) communication session with a computer system associated with an EPMT using the transceiver;
receive an EPMT battery remediation request relating to the EPMT during the EPMT communication session;
engage in a BRS communication session with a computer system associated with a BRS using the transceiver;
communicate a BRS battery remediation request to the BRS during the BRS communication session;
communicate verification information to the EPMT that enables a party associated with the EPMT to verify that the BRS was dispatched from an authorized source, prior to battery remediation; and
communicate control port and power port information associated with the EPMT to the BRS.

25. The system of claim 24, wherein the verification information is a link to a website that provides work order information.

26. The system of claim 24, wherein the host computer system is further configured to:
select a type of battery remediation from a group comprising replacement, recharge, and repair; and
communicate the type of battery remediation to the computer system associated with the BRS.

27. The system of claim 24, wherein the host computer system is further configured to:
store, in the memory, location and availability information pertaining to the one or more BRSs;
communicate the location information and availability information to the EPMT; and
receive a selection of a particular BRS among the one or more BRSs from the computer system associated with the EPMT prior to communicating the BRS battery remediation request to the BRS.

28. The system of claim 24, wherein the host computer system is further configured to determine one or more acceptable battery remediation locations in proximity of the BRS and/or the EPMT.

* * * * *